Oct. 3, 1967 D. J. BUCHOLTZ ET AL 3,345,613
X-RAY DIFFRACTOMETER CONTROL SYSTEM
Filed Nov. 12, 1964 16 Sheets-Sheet 1
FIG. 1
PLANE OF DIFFRACTION
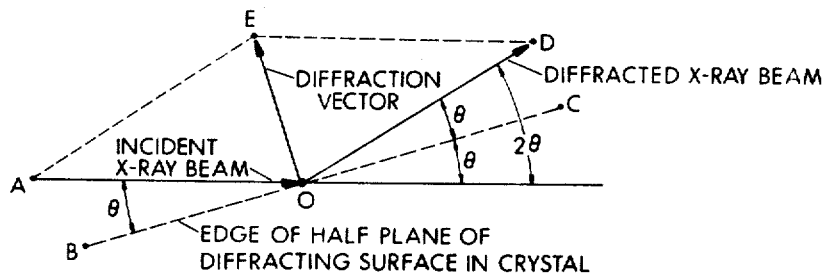
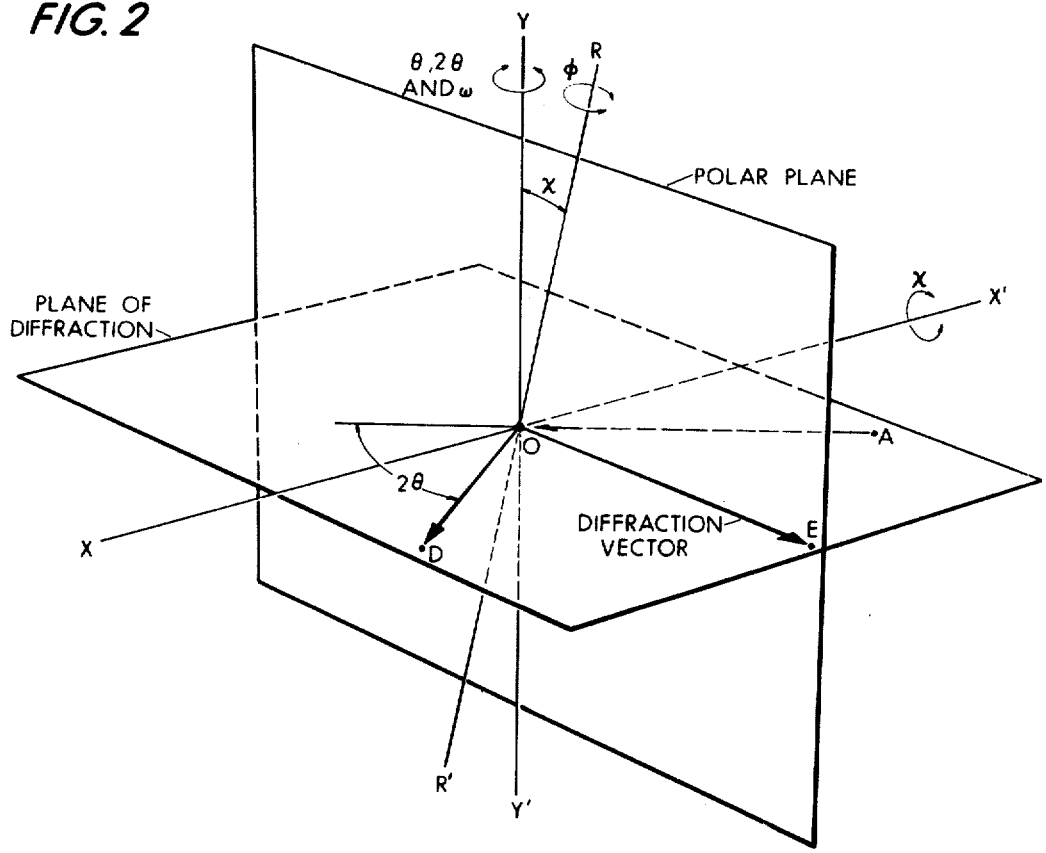
INVENTORS
DANIEL J. BUCHOLTZ
RAYMOND G. HARTMAN
CHESTER S. INGRAHAM
JOHN A. MEYER
MARTIN V. POWERS
BY
ATTORNEY

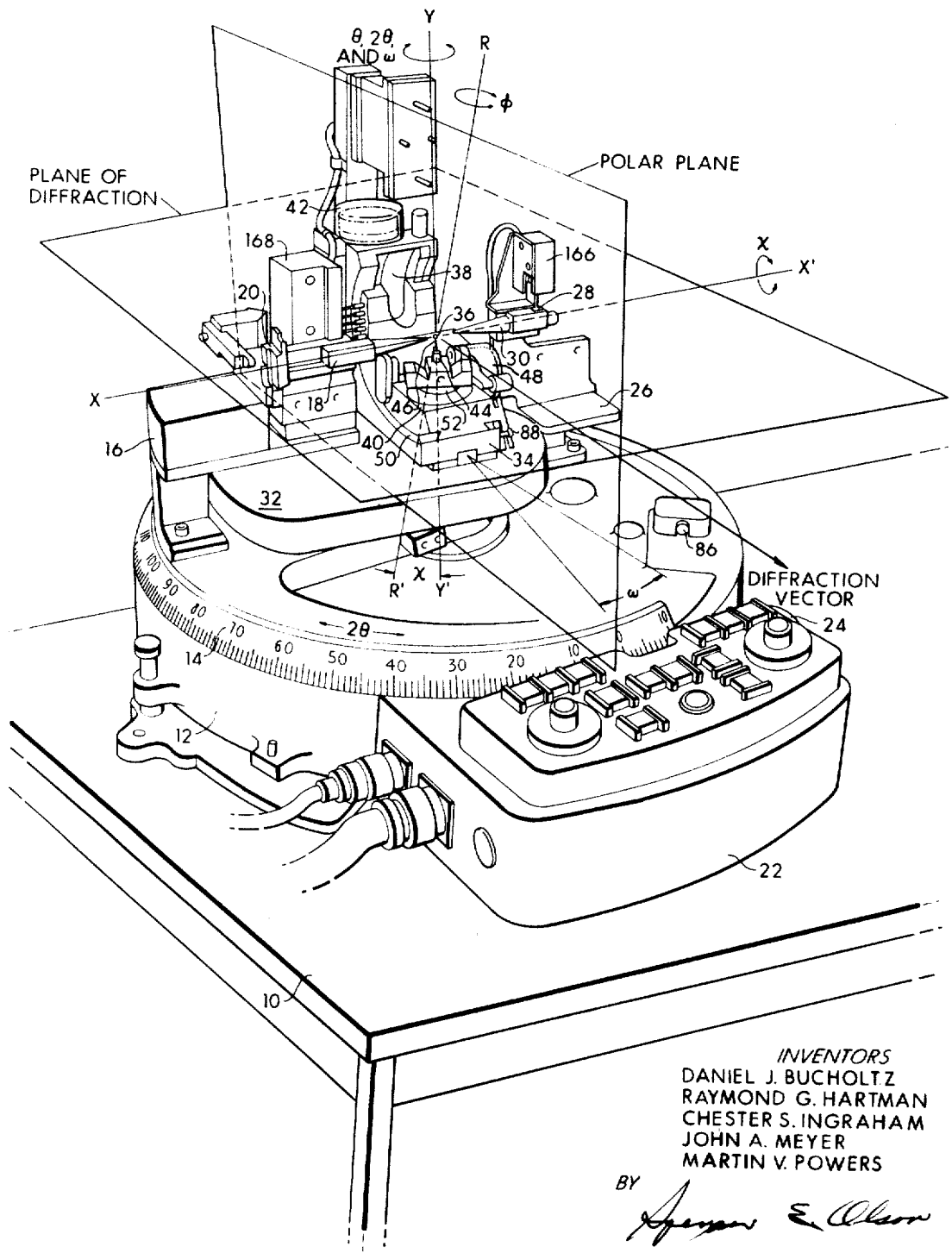

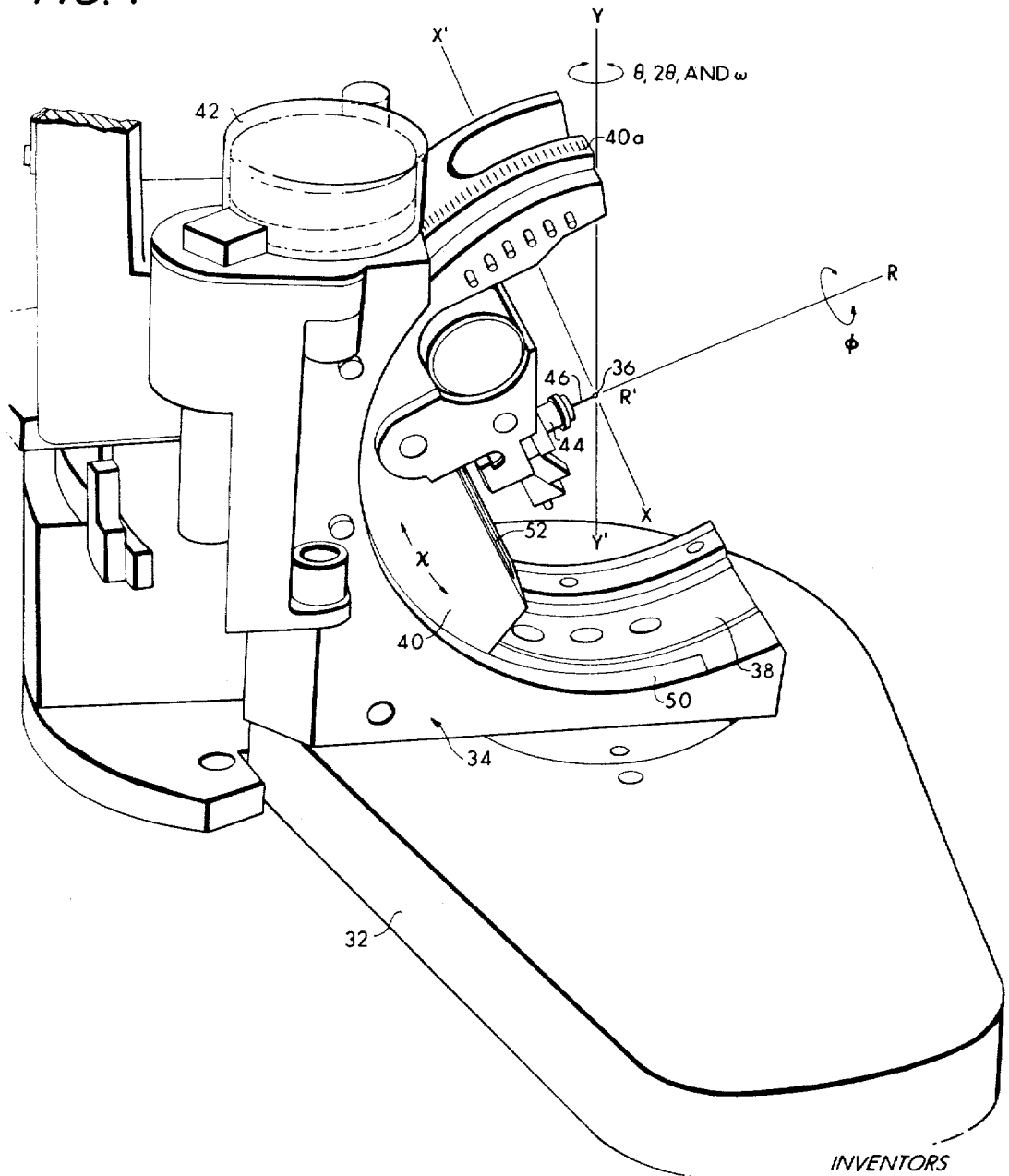

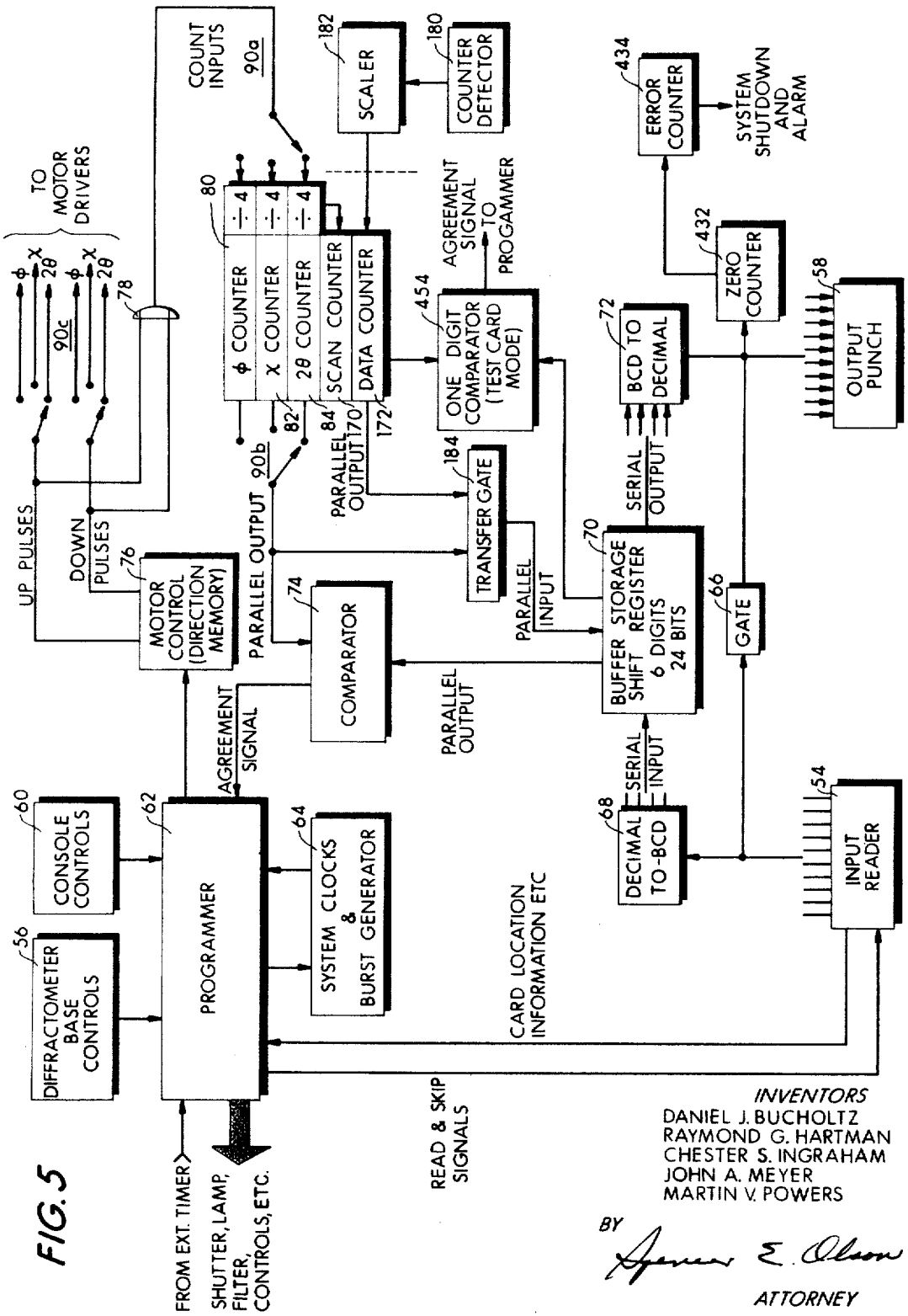

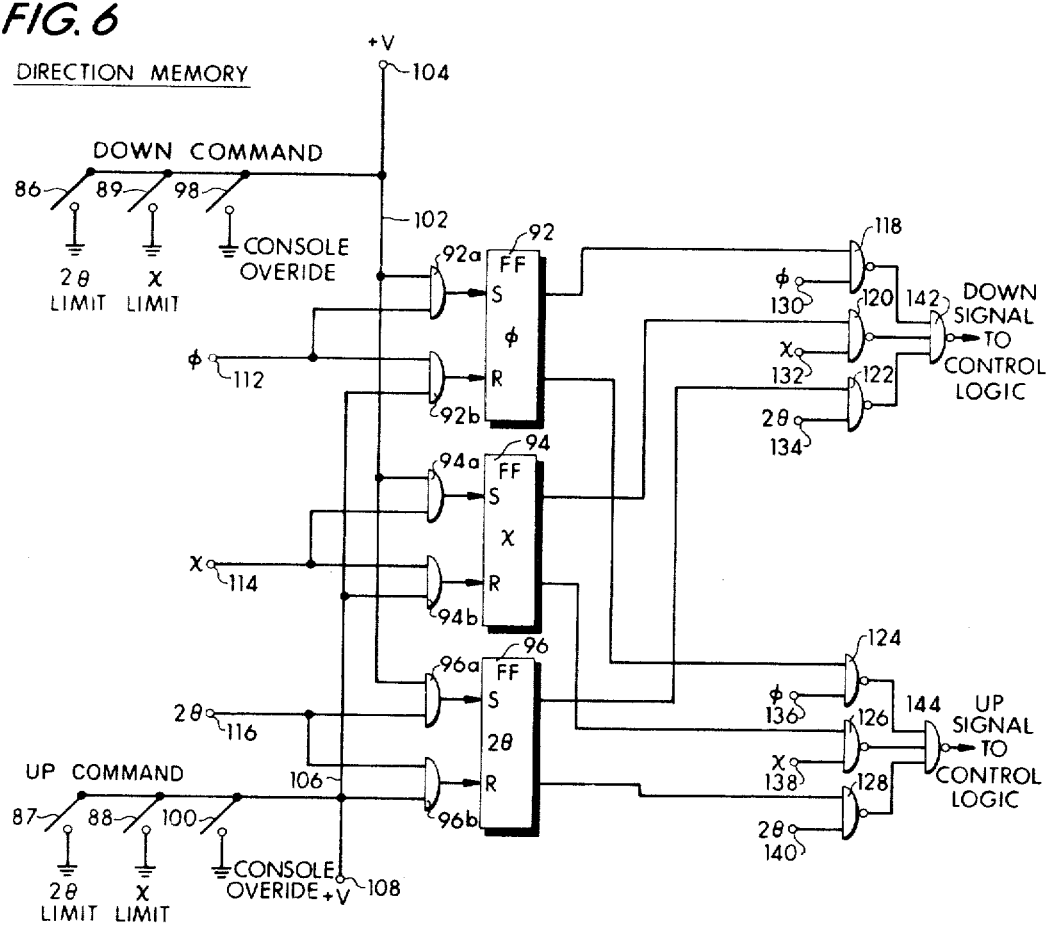
FIG. 6 DIRECTION MEMORY
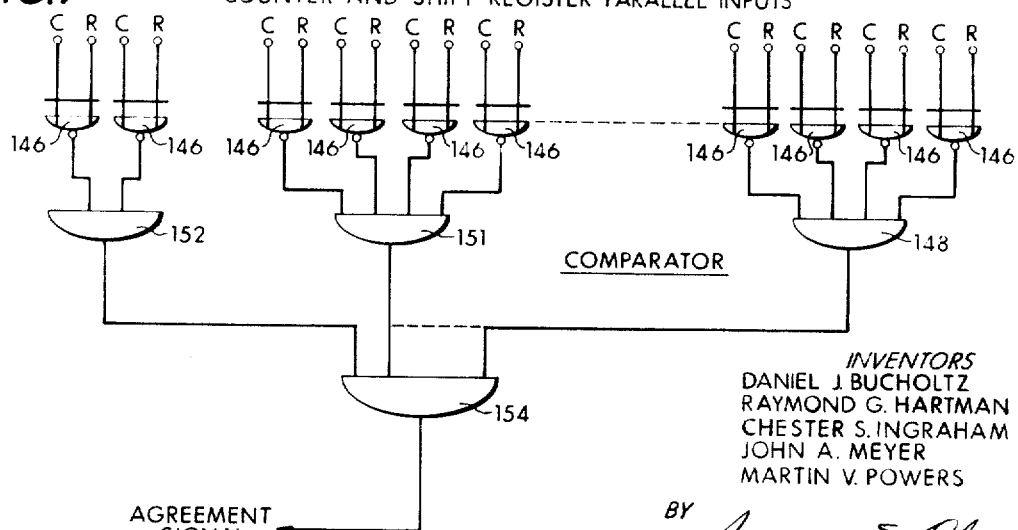
FIG. 7 COUNTER AND SHIFT REGISTER PARALLEL INPUTS
COMPARATOR
AGREEMENT SIGNAL
INVENTORS
DANIEL J. BUCHOLTZ
RAYMOND G. HARTMAN
CHESTER S. INGRAHAM
JOHN A. MEYER
MARTIN V. POWERS
BY
*Spencer E. Olson*
ATTORNEY

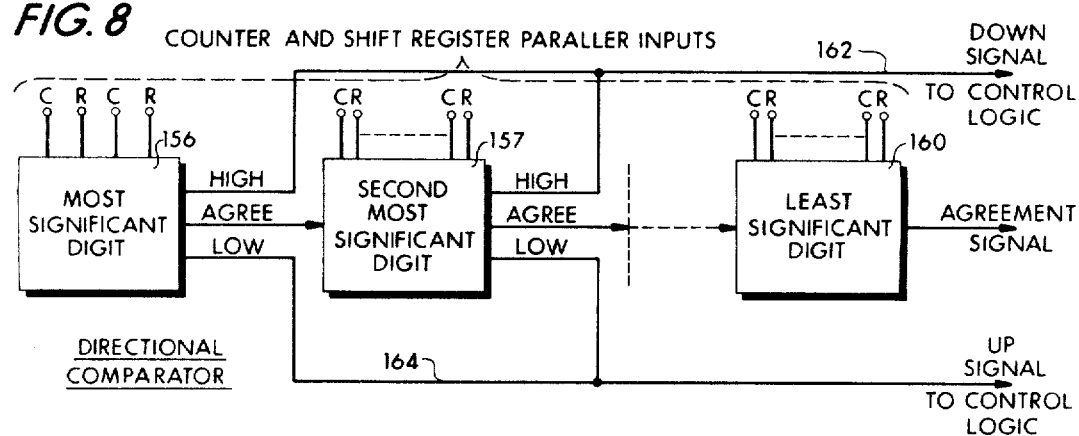
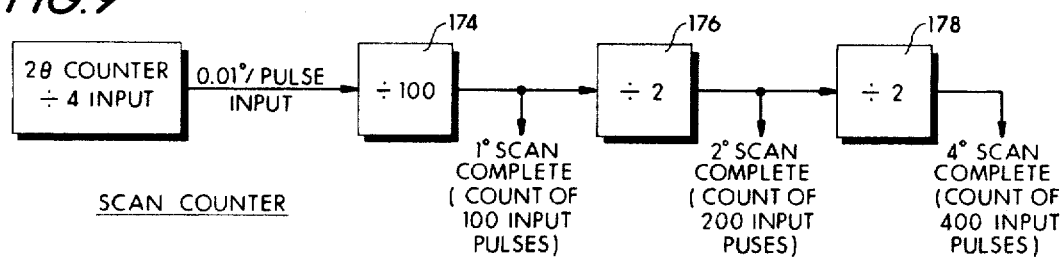
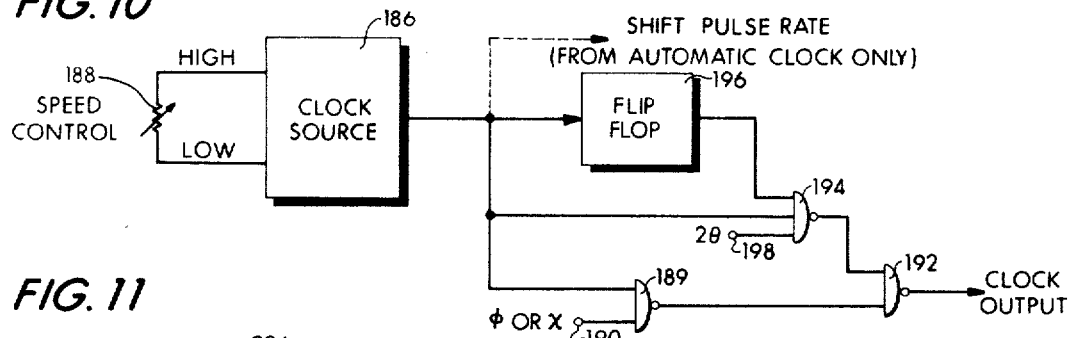
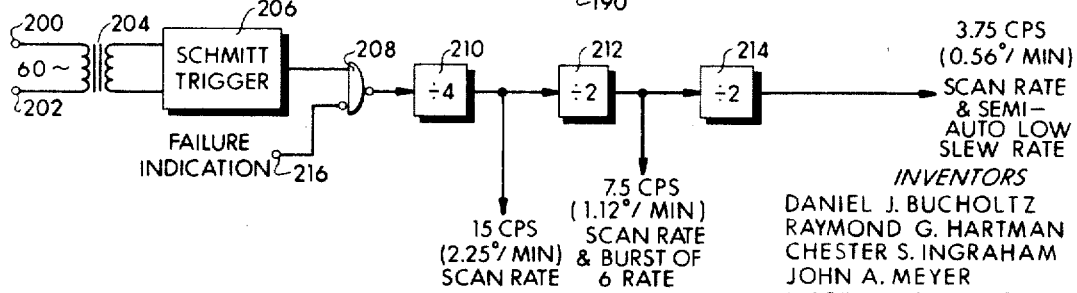

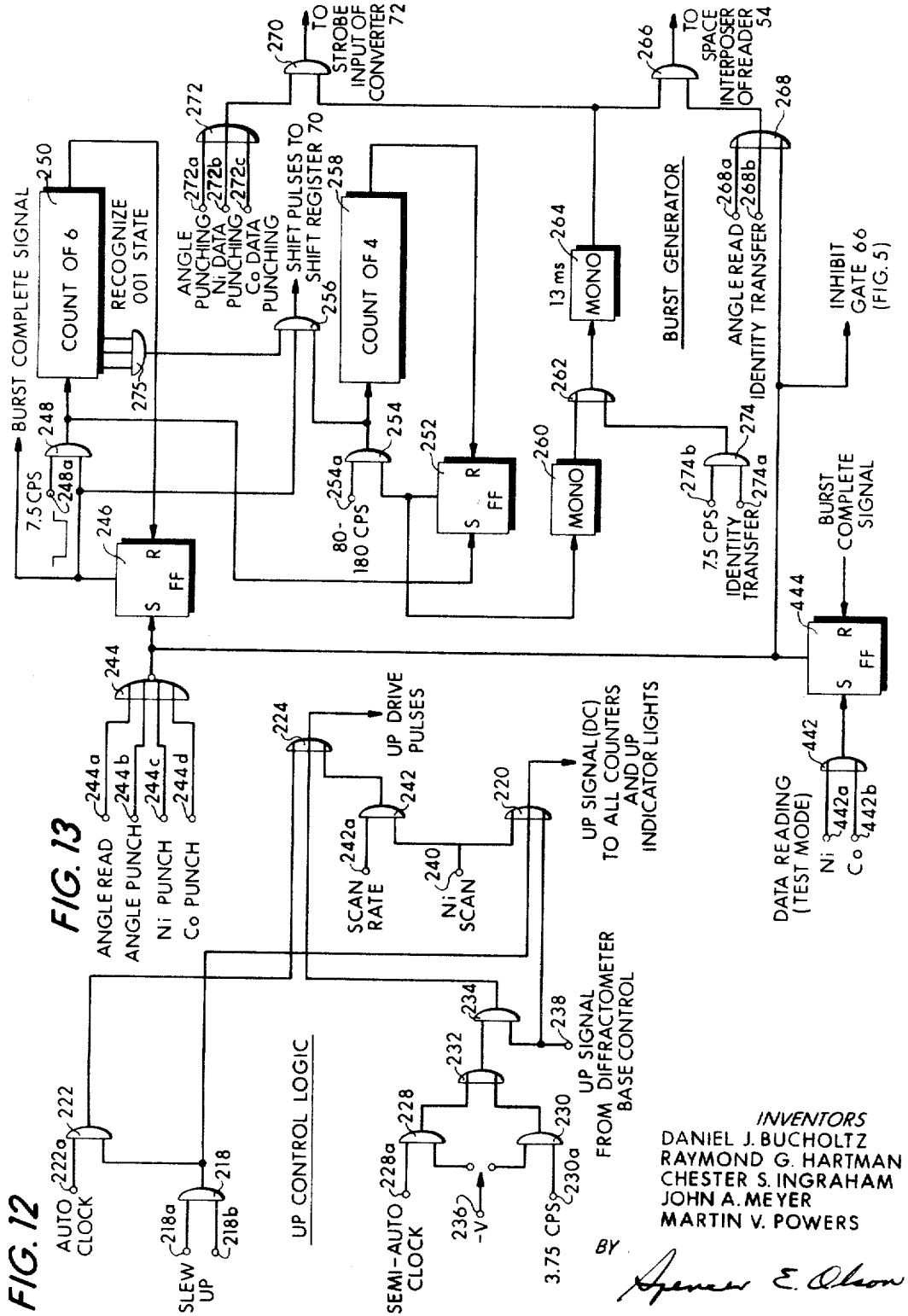

AUTOMATIC READ / SLEW-PROGRAMMER

Oct. 3, 1967     D. J. BUCHOLTZ ET AL     3,345,613
X-RAY DIFFRACTOMETER CONTROL SYSTEM
Filed Nov. 12, 1964     16 Sheets-Sheet 9

*INVENTORS*
DANIEL J. BUCHOLTZ
RAYMOND G. HARTMAN
CHESTER S. INGRAHAM
JOHN A. MEYER
MARTIN V. POWERS

BY Spencer E. Olson

*ATTORNEY*

United States Patent Office 3,345,613
Patented Oct. 3, 1967

3,345,613
X-RAY DIFFRACTOMETER CONTROL SYSTEM
Daniel J. Bucholtz, Buffalo, Raymond G. Hartman, Lockport, Chester S. Ingraham, East Aurora, John A. Meyer, Tonawanda, and Martin V. Powers, Williamsville, N.Y., assignors to Sylvania Electric Products Inc., a corporation of Delaware
Filed Nov. 12, 1964, Ser. No. 410,631
22 Claims. (Cl. 340—172.5)

ABSTRACT OF THE DISCLOSURE

An open loop servo control system employing digital electronics in coaction with pulse driven stepper motors, gearing arrangements and solenoids to provide precise automatic or semi-automatic control of an X-ray diffractometer having a single crystal goniometer. In the automatic mode, the electronic system reads angular information from a key-punched instruction card and coacts with the mechanical system to sequentially slew a crystal specimen in either of two directions in three planes by applying rate variable drive pulses to selected stepper motors, each drive pulse thereby generating a fraction of a degree of angular motion. In lieu of a feedback loop, the system continuously counts the number and controls the direction of applied drive pulses and compares that count with the information read from the instruction card. The system then controls X-ray shutter and filter operations, stationary or moving scan functions, and the permanent recording of intensity data on a key-punched output card. In the semi-automatic mode, an operator can control crystal slewing and the initiation of angle and intensity data taking for each point of examination by means of a pushbutton control panel. Self-test modes are provided for detecting system failures or operational errors and generating an alarm in response thereto.

This invention relates to crystallographic X-ray diffraction apparatus. More particularly the invention relates to a digital system for providing extremely accurate automatic control of the slewing, scanning, and irradiation of a crystal specimen mounted on a single crystal goniometer of an X-ray diffractometer, for controlling the filtering sequence of the crystal deflections, and for permanently recording the detected intensity data accurately correlated with the Bragg angle and crystal position angles for each crystal reflection scanning sequence.

In the science of crystallography, the central problems are crystal identification and crystal structure analysis. As has long been recognized by those skilled in the art, crystals result from the tendency of their component atoms, ions or molecules to arrange themselves in a regular manner so as to form a definite three-dimensional pattern having three coordinate axes, the directions of which are usually considered as defined by the directions of three unit translations $a$, $b$, and $c$, respectively, of the pattern. (See "X-Ray Crystallography" by M. J. Buerger, John Wiley and Sons, Inc., New York, 1942, page 4, FIG. 2A.) Every crystal is therefore characterized by a "unit cell" or unit three-dimensional pattern repeating itself throughout the entire crystal. In general, a particular different unit cell or unit three-dimensional pattern is characteristic of each different crystal species.

By virtue of the regular repetition in three dimensions of the "unit cell," each crystal may usually be assigned any one of an infinite number of three dimensional lattice arrangements comprising three mutually intermeshing and intersecting sets of parallel straight lines. (See Buerger, supra, pages 4–6.) For crystals of cubic or rectangular unit cells, or patterns, by way of elementary examples, each of the three sets of parallel lines can most conveniently be orthogonally related to the other two sets. Intersection points of the three sets of parallel straight lines forming the lattice are selected in any of a number of different ways as corners of the successive unit cells or patterns of the crystal. These corners are usually chosen as points at which atoms, molecules or ions are situated so that for crystals having relatively simple types of "unit cells," the intersections of the lattice usually indicate, at least to a considerable degree, the manner in which the atoms, molecules or ions are distributed throughout the crystal. Many crystals, however, have very complicated arrangements of their constituent atoms, ions, or molecules within their respective "unit cells" and therefore present much more difficult problems in connection with the complete determination of their cell structures.

Each three-dimensional lattice can obviously be considered as a plurality of plane or two-dimensional lattices which are mutually parallel and spaced uniformly in the third dimension. Each two dimensional lattice normally represents the plane surface over which the atoms, ions, or molecules are distributed according to a regular pattern, the particular pattern being determined according to the substance and particular crystalline structure involved. Any such two-dimensional plane array would reflect energy rays of appropriate wavelengths over a large range of incident angles. For the majority of crystals, energy rays within the wave-lengths usually characterized by the designation "X-rays" will be found to be suitable. Since the crystalline structure comprises a large number of these plane arrays parallel to each other and regularly spaced in a third dimension, interference effects will normally restrict reflection from the crystal to a relatively few specific angles only. A knowledge of these angles and the integrated intensity of each reflection enables one skilled in the art of crystallography to deduce much pertinent information relative to the structure of the specimen crystal.

For some substances, as mentioned above, the arrangement of atoms, ions or molecules within the unit cell are relatively simple and can be readily determined from a modest quantity and quality of data. For other substances, however, the arrangements of the atoms, ions or molecules within the unit cell may be extremely complicated (see, for example, "Chemical Crystallography" by C. W. Bunn, Oxford Press, London, 1945, FIG. 189, page 309, and FIG. 192, page 312) and a large amount of accurate data may be required to determine with any certainty the arrangement in plan and elevation, within the unit cell, of the atoms, ions and/or molecules of which the cell is constituted. For resolving such problems it is very often essential that highly accurate integrated intensity data for each and every reflection be obtained. The apparatus of the present invention is particularly well adapted to provide such accurate data in suitably correlated form for convenient use.

Conventional methods of X-ray analysis of crystal materials include crushing the material into a fine powder for examination and photographic single crystal methods. The powder method is inadequate for many areas of study; e.g., the characterization of new antibiotics and most organic chemicals, the examination of silicates, and the sutdy of biological materials in cancer and medical research. The photographic single crystal method determines the intensity, or amplitude, of the observed reflections by visual estimation of the actual and relative amplitudes and intensities as represented solely by numerous spots of varying densities on photographic films. The photographic method has proved arduous, time-consuming and frequently leaves much to be desired as far as accuracy and completeness is concerned.

The present trend in single crystal analysis is toward methods employing X-ray detectors, such as the Geiger counter, the proportional counter, or a scintillation counter to detect the intensities of the diffracted radiations. The counter detector has an output circuit in which pulses are produced at rates varying with the intensities of the radiations received thereby, the pulses produced by a Geiger counter usually having a uniform amplitude while the pulses from a proportional counter or a scintillation counter have an amplitude which varies with the energy of radiation. By use of a counter to detect the intensities of crystal reflections, both accuracy and precision are improved. A counter is considerably more sensitive to X-rays than photographic film, allowing smaller specimens to be examined or the use of higher resolving powers. Since the uniformly sensitive area of a counter is very large, integrated intensity measurements do not require special oscillatory motions. The more important properties of a counter, however, are that it responds instantaneously to changes in intensity and this response can be simultaneously recorded and measured.

By mounting the crystal and counter detector on a goniometer, the angles of the diffracted radiation may readily be measured. The three principal techniques employed for the measurement of integrated intensities with such apparatus are stationary crystal-stationary counter, moving crystal-stationary counter, and moving crystal-moving counter. The arrangement of the last-mentioned technique may be described by referring to the geometrical presentation of X-ray diffraction shown in FIG. 1, wherein points A, O and D represent the X-ray source, the center of the crystal, and the detector, respectively. A collimated X-ray beam of wavelength $\lambda$ from the source traverses the crystal in the direction of a vector AO. As previously discussed, the lattice planes of the crystal will reflect such beams in specific directions depending upon the orientation of the crystal and the spacings of the lattice planes in the crystal. In FIG. 1 the lattice planes are perpendicular to the drawing and parallel to line BC, which intersects the center of the crystal O. The X-ray beam is diffracted in the direction of vector OD toward the detector if the spacing $d$ of the lattice planes satisfies the Bragg Law $\eta\lambda = 2d \sin \theta$, where $\eta$ is the order number of the diffraction from that set of planes and $\theta$ is the incident angle of the X-ray beam with the lattice planes (which, of course, is equal to the angle of reflection with the lattice planes and is also equal to one-half the total diffraction angle $2\theta$ measured as shown in FIG. 1). The incident and diffracted X-ray beam vectors AO and OD define a plane which is called the plane of diffraction. If these vectors are both chosen to have a length $1/\lambda$, the vector difference OE, often called the diffraction vector, lies in the plane of diffraction and has a length of $$2 \sin \theta / \lambda$$

A powerful tool for assisting in the determination of crystal structure is the "reciprocal lattice," which comprises a periodic three-dimensional array of points which extends out into space around the crystal. A reciprocal lattice can be derived for each crystal, as discussed, for example, in Chapter 6 of the text by Buerger mentioned above, starting at page 107. The reciprocal lattice always has a definite orientation with respect to the crystal, and may be considered as being attached to the crystal with the origin of the reciprocal lattice coincident with the center of the crystal. Hence, as the crystal is moved in any manner, the reciprocal lattice undergoes the same motions, so that it maintains the same orientation with respect to the crystal itself. The radial line from the origin to any reciprocal lattice point is called the reciprocal lattice vector for that point. If a reciprocal lattice vector coincides in both direction and length with the diffraction vector, a strong diffracted X-ray beam will result in the direction of vector OD (FIG. 1).

In order to scan the crystal for reflections in the plane of diffraction by the moving crystal-moving detector technique, therefore, both the crystal and detector are simultaneously rotated about a common axis perpendicular, to the drawing at point O, with the X-ray source remaining fixed. However, since the angle of reflection is equal to the angle of incidence, the detector must rotate at $2\theta$, while the crystal rotates at $\theta$, in order to continually intercept the reflected X-ray beam. Also, it is evident from FIG. 1 that as the diffraction angle $2\theta$ is changed, the diffraction vector OE also changes in direction, but by only one-half as much. That is, the diffraction vector OE rotates at $\theta$, while the diffracted beam OD rotates at $2\theta$ about the point O in the plane of diffraction. Now, if the crystal mounting base and detector are interconnected such that the detector rotates at twice the speed of the crystal mounting base (a conventional goniometer arrangement), the diffraction vector will maintain a constant direction with respect to the crystal mounting base during rotation, although the length of the vector will vary. In this manner, the end point E of the difffraction vector may be swept along the line of the diffraction vector; when point E coincides with a reciprocal lattice point, a strong diffraction of X-rays will be observed with the counter detector. The intensity of the reflection is measured by the response of the counter, and the angle of the diffracted radiation $2\theta$ is measured in the plane of diffraction.

The next problem is to provide a goniometer arrangement whereby any reciprocal lattice point may be brought onto the line of the diffraction vector (which is contained in the horizontal plane of diffraction). A suitable geometry and apparatus for solving this problem is described in the General Electric "Single Crystal Orienter Instruction Manual," prepared by Dr. Thomas C. Furnas, Jr., X-ray Department of General Electric Company, Milwaukee, Wis., 1957, Chapters I and II. Briefly, referring to FIG. 2, where the horizontal plane of diffraction of FIG. 1 is shown in perspective, this geometry comprises inclination of the crystal about a horizontal axis XX' and rotation of the crystal about a polar axis RR'. Axis XX' is a line contained in the plane of diffraction and perpendicular to the diffraction vector line OE at point O, the center of the crystal (which is the origin of the reciprocal lattice). Polar axis RR' passes through point O and is contained in a vertical polar plane which is perpendicular to the plane of diffraction through point O; also the inclination-rotation goniometer means is adjusted so that the line of intersection of the polar plane and the plane of diffraction contains the diffraction vector OE. The $\theta$ and $2\theta$ rotations take place about the axis YY', which is contained in the polar plane and is perpendicular to the plane of diffraction at point O. Hence, the axis XX', RR' and YY' all intersect at the center of the cystal (the origin of the reciprocal lattice).

By combining rotation of the crystal about the axis RR' and inclination of the crystal about the axis XX', any reciprocal lattice point may be brought onto the diffraction vector. For example, the crystal may be rotated about the polar axis through an angle $\phi$ to bring the desired point into the polar plane, then the crystal may be inclined through an angle $\chi$ to bring the desired point into the horizontal plane of diffraction, thereby placing the point on the diffraction vector. The $2\theta$, $\theta$ rotation of the detector and crystal, respectively, may then be employed to scan the diffraction vector line OE for reciprocal lattice points. The strong diffraction which is detected when E coincides with a reciprocal lattice point also indicates that the length of the diffraction vector OE equals the length of a reciprocal lattice vector which lies along the line OE; i.e., strong diffraction occurs only when the length of a reciprocal lattice vector equal $$\frac{2 \sin \theta}{\lambda}$$

The mathematical equivalence of this quantity to $\eta/d$ (referring to Bragg's Law) is readily derived and may be used in converting direct measurements of the reciprocal lattice into the corresponding relationships of the real lattice, as described in Chapter VI of the above-mentioned General Electric manual.

The above-described geometry, therefore, provides for angular positioning of the crystal specimen in three planes. The $2\theta$ angle (and hence the $\theta$ angle of the crystal) is measured in the plane of diffraction; the $\chi$ angle is measured in the polar plane; and, the $\phi$ angle is measured in the basal plane of the crystal (or reciprocal lattice). An X-ray diffraction apparatus embodying the above-described three-plane goniometer geometry for studying the reciprocal lattice of a single crystal is thoroughly described in the aforementioned General Electric manual. Such an apparatus provides an extremely versatile research tool and improvement over the prior art. Control of the diffractometer, however, is almost completely manual, as will be described. Manual control of a diffractometer has several practical disadvantages as will be seen hereinafter. In order to significantly improve the capabilities of this vital research instrument, applicants have provided an automatic digital control system for an X-ray diffractometer of the type described in the above-mentioned General Electric manual; of course, any diffractometer of similar geometry and operation could be used for the purpose. The portion of this apparatus controlled by the digital system of the present invention is shown in FIG. 3 and will now briefly be described to enable a better understanding of the purpose and function of the invention.

Referring to FIG. 3, the apparatus is shown mounted on a suitable support, such as table 10, and consists generally of a base 12 having a protractor 14 suitably mounted and geared thereon to permit rotation about a vertical axis YY'. More specifically, protractor 14 is a cantilever arm pinned to the vertical shaft of a horizontal worm wheel enclosed within base 12, the vertical shaft being concentric with axis YY'. Mounted on scale 14 is a support base 16 for a counter type radiation detector (not shown), a beam tunnel 18 through which the reflected beam of X-rays passes to the detector, and a filter assembly 20 for monochromatizing this beam of X-rays. A control box 22, which is a part of the base 12, encloses means for driving the horizontal worm wheel to rotate scale 14 and the detector assembly mounted thereon about axis YY'.

The control panel of housing 22 of the prior art apparatus contained controls for the scale and detector drive mechanism consisting generally of an on-off switch, a manual or automatic control, and a speed control. The automatic control arrangement included a synchronous motor and gear box for driving a worm engaging the horizontal worm wheel. The manual control arrangement comprises a micrometer head 24 attached to the shaft of the worm driving the horizontal worm wheel; one complete revolution of the crank 24 moved the protractor scale 14 one degree, and the micrometer head was divided into 100 parts to permit hundreds of a degree (0.01°) to be read directly from it at its fiducial mark. The total range of scale 14 is from 0 to 160 degrees. It is to be understood that the control panel illustrated in FIG. 3 incorporates several additional controls incident to the modications according to the present invention.

Mounted in fixed position on base 12 is a support base 26 for an X-ray tube (not shown), a shutter 28, and a beam collimator 30. A specimen table 32 is interconnected with respect to scale 14 by means of an angle bisecting mechanism whereby table 32 is rotated about the YY' axis at one-half the angular motion of scale 14 and the horizontal worm wheel in base 12. Bisecting mechanisms for imparting such relative rotational motions are described in U.S. Patents 2,805,341 Lang, 3,005,098 Buschmann et al., and 3,073,952 Rose. A dual-plane goniometer, illustrated generally by numeral 34, is suitably secured to table 32, and a crystal specimen 36 is mounted on the goniometer such that the center of the crystal and the axes of rotation of the goniometer 34 and table 32 are coincident with the YY' axis. Further, means is provided to enable the goniometer 34 to be independently rotated on table 32, when such adjustment is necessary; this motion is illustrated as $\omega$ in FIG. 3.

During initial set up of the apparatus, the center of the counter tube window, the center of the aperture or detector slit, the axis of beam tunnel 18, the center of the crystal specimen 36 to be examined, the axis of beam collimator 30, and the center of the X-ray tube target are arranged to be contained in a single horizontal plane, the plane of diffraction. Also, the X-ray source, the detector assembly, and the center of the crystal are respectively aligned so that the crystal is properly illuminated and the X-ray reflection is properly detected; a suitable procedure for such alignment is described, for example, in Chapter IV of the above-mentioned General Electric manual. Optical alignment of the crystal is facilitated by a viewing microscope which may be mounted on the goniometer. It is apparent, therefore, that the diffractometer of FIG. 3 embodies the geometry of FIG. 1, and the $2\theta$ angular setting of scan of the detector is accomplished by rotating scale 14, which simultaneously rotates crystal 36 at $\theta$ in line with the beam from the fixed X-ray source, thereby enabling sweeping of a point of examination, E (FIG. 1), along the diffraction vector, which is both in the plane of diffraction and fixed with respect to table 32. The $\chi$ angle inclination of the crystal in the polar plane and the $\phi$ angle rotation of the crystal about the polar axis, as illustrated in FIG. 2, are embodied in the dual-plane goniometer 34. The vertical or polar plane of the goniometer 34 is oriented to contain the diffraction vector, during initial set-up, by the independent turning motion designated $\omega$.

Referring to FIG. 3, and the perspective side view of FIG. 4, goniometer 34 comprises a vertically curved dovetail structure 38 in which a movable carriage 40 is mounted for inclination about the horizontal axis XX'. As was shown in FIG. 2, this horizontal axis intersects the vertical axis YY', lies in the plane of diffraction, and is perpendicular to the polar plane of the goniometer. The periphery of the movable carriage is a segment of a 360-tooth worm wheel, some teeth 40a of which are visible in FIG. 4. In the unmodified prior art apparatus, inclination of the carriage 40 through a range of about 100° is manually adjustable by a micrometer head 42 attached to the top end of the shaft of a vertically oriented single thread worm which is enclosed and supported in structure 38 to engage the teeth 40a.

The movable carriage 40 contains a worm and basal worm wheel arrangement for 360° rotation of a goniometer head and specimen holder 44 attached to the top of the basal worm wheel. Crystal 36, which may be only a few microns in size, is supported on a fiber or capillary 46 which is, in turn, mounted on top of the specimen holder. Crystal 36, the goniometer head and specimen holder 44, and the basal worm wheel are concentrically arranged such that their respective polar axes coincide in the axis RR'. The axis RR' lies in the polar plane of goniometer 34 and intersects the vertical axis YY' at the same point that the horizontal axis XX' intersects it. Rotation of the goniometer head about the axis RR' is manually adjustable, in the unmodified apparatus, by a micrometer head 48 mounted on the side of carriage 40 and attached to the shaft of the worm enclosed in the movable carriage 40.

The $\chi$ inclination and $\phi$ rotational slewing of the position of crystal 36, which is preadjusted to remain centered at the intersection of the XX', YY' and RR' axes, is therefore readily attainable by proper adjustment of micrometers 42 and 48, respectively. The $\chi$ angle is measured about the XX' axis and is the angle of inclination of the polar axis RR' with respect to the vertical axis YY' in the polar plane. A scale 50, graduated in degrees and indicating $\chi$ values, is attached to the curved structure 38 and is read from a marker attached to movable carriage 40. The zero degree reference mark on the scale corresponds to the position of the carriage for which the RR' axis coincides with the YY' axis. Hundredths of a degree (0.01°) can be read from the $\chi$ micrometer head 42, one turn of which moves carriage 40 one degree.

The $\phi$ angle of the goniometer head and crystal is measured about the RR' axis and is the angle of polar rotation in the basal plane. A 360° protractor scale 52 is attached to the top of the basal worm wheel in carriage 40 to enable measurement of $\phi$ values. Fractions of a degree can be read from the $\phi$ micrometer 48. In this case, one-half turn of the micrometer rotates the goniometer head one degree; hence, the 100 graduations on the dial represent 0.02° each. A lever and cam arrangement is also included in the movable carriage 40 to enable disengagement of the worm from the basal worm wheel to allow rapid manual rotation of the goniometer head when desired. A similar declutching feature is also included in both the $\chi$ and $2\theta$ gear drives.

After making initial adjustments, orientation and centering of the crystal, and alignment of the X-ray source and detector, operation of this prior art diffractometer generally comprises manual slewing of the $\phi$, $\chi$, and $2\theta$ angles (respectively the goniometer head rotation, its inclination, and the diffraction angle) by means of micrometers 48, 42, and 24, respectively, to locate reciprocal lattice points of the crystal specimen on the diffraction vector, as previously described with respect to FIG. 2. The exact sequence of operations depends upon the object of the measurements, which may, for example, be crystal identification, analysis of crystal structure (stationary or moving crystal intensity data), textures, partial and preferred orientation, pole figures, or fiber diagrams. For purposes of discussion, however, a typical case will be considered in which it is desired to obtain a series of intensity measurements using a predetermined set of reciprocal lattice point coordinates. In this case the $\phi$, $\chi$, and $2\theta$ angular settings are changed between each intensity measurement to bring the next desired spot into the reflecting position in the plane of diffraction.

As a first operational step, the angles are manually adjusted as previously described, using the respective scales and dials for reference. Shutter 28 is then manually opened to irradiate the crystal specimen for a given period of time and then closed. At the same time the shutter is opened, one of the filters of filter assembly 20 is manually inserted in the path of the reflected X-ray beams to the detector. The response of the counter detector to the intensity of the reflection is displayed in digital form on the panel of an electronic scaler connected to the output of the counter. The operator records the intensity data on a sheet of paper and repeats this irradiation procedure using a different filter. The operator then adjusts the angular settings for the next desired spot.

During irradiation the operator has the choice of a stationary detector-stationary crystal measurement or an automatic $2\theta$ angular scan, by operation of the synchronous motor in control box 22.

The successive disposition of filters in the path of the diffracted beam is employed for purposes of improving the monochromaticity of the detected radiation, thereby controlling determination of the wavelength $\lambda$ for use in the previously discussed Bragg equation $\eta\lambda = 2d \sin \theta$. A pair of balanced filters, consisting of different materials and proportioned in thickness so they transmit or absorb equal amounts of radiation over a wide wavelength band are used. Because of the difference in materials, however, each filter has a different and distinctive absorption edge or cut-off point beyond which transmission changes abruptly on respective sides of the wavelength band under surveillance. Since the predetermined absorption edges of the filter pair are different, pronounced, and well defined, the limits of the radiation wavelengths being detected may be established with great precision.

The monochromator system employed on this diffractometer is similar in concept to that described by Dr. David Harker in U.S. Patent No. 3,030,512, especially FIG. 3 thereof. The patent also discusses the advantages of the balanced filter monochromator system over crystal monochromators and direct reading detector methods. The above mentioned General Electric manual includes a further discussion of this subject in Chapter VII, section C and presents a table which lists balanced filter materials suitable for use with various standard X-ray diffraction tube target metals. Nickel and cobalt are examples of materials employed in a balanced filter pair.

The solution of crystal structures by the use of X-ray diffraction apparatus, such as that illustrated in FIG. 3, requires the efforts of highly skilled operators and scientists for periods of hours, weeks, months or even years, depending upon the number and arrangement of independent atoms in the structure. Certain structures contain such a large number of atoms that most X-ray diffraction methods fail. Protein crystals, for example, contain from 1,000 to 100,000 atoms, and extensive efforts in protein crystallography have resulted in the solution to date of the crystal structures of only two proteins, myoglobin and hemoglobin. X-ray crystallographic analysis of the protein ribonuclease was begun in 1950 and is presently at an advanced stage. Intensity data gathered from X-ray diffraction analysis of this protein is being used to prepare three-dimensional electron density maps with a resolution of 4 angstroms. The ribonuclease molecule is known to have about 1,000 non-hydrogen atoms and a diameter of approximately 30 angstroms. Intensity data collection and analyses of this nature, using primarily manually controlled X-ray diffraction apparatus of the type described, obviously involves long periods of laborious and rountine efforts on the part of skilled operators and scientists. Such analyses put a great strain on the operator and are subject to inaccuracies resulting from human error, particularly during times when the operator is suffering from fatigue. This time and effort required can be reduced, and the accuracy improved, by use of automatic control means.

Some diffractometer controllers are available, but they are either prohibitively high in cost or rather limited in capability and flexibility. For example, one notable automatic control system on the market utilizes a large computer on a demand time-share basis. This system has the inherent problem of requiring approximately 40% of the time of the computer to operate a single diffractometer. As for the diffractometer described with reference to FIG. 3, the unique geometrical arrangement of the associated goniometer raises even further problems of automation. Specificially, the imaginary nature of the XX' axis renders it rather difficult to employ conventional shaft encoder techniques to feed back inclination shaft position data to enable closed servo loop operation. Hence, a significant advance in the art of crystallography can be achieved by providing a relatively inexpensive and flexible control system for the versatile diffractometer illustrated in FIG. 3 that will accept angular information, accurately position the crystal in three planes, control X-ray shutter and filter operation in the desired sequence, and record data taken by the machine. To ensure accuracy and conservation of time, a self test capability is also desirable.

With an appreciation of the disadvantages of manually controlled X-ray diffractometers and the problems attendant the automation of such apparatus, applicants have as a primary object of this invention to provide an automatic X-ray diffractometer control system of moderate cost and flexible operational capability to enable the systematic collection of accurate crystallographic data with a minimum of time and effort.

A further principal object of the invention is to provide an automatic control system for X-ray diffraction apparatus which operates in response to a set of input instructions to accurately position a crystal specimen according to a predetermined geometry and collect and permanently record intensity data accurately correlated with the diffraction and crystal position angles, as measured from determined references.

A further object of the invention is to provide a digital control system for an X-ray diffractometer which operates in response to a set of input instructions to accurately position a crystal specimen in three planes, control irradiation of the crystal and monochromatization of the reflection therefrom, and permanently record the detected intensity data accurately correlated with the diffraction and crystal position angles, as measured from predetermined references.

Another object of the invention is to provide an X-ray diffractometer digital control system for slewing a crystal specimen, mounted on a goniometer associated therewith, in three planes, one of which has an imaginary slew axis.

Another object of the invention is to provide an X-ray diffractometer digital control system having a convenient self-test capability.

Another object of the invention is to provide an automatic digital control system for an X-ray diffractometer which does not require a computer for operation, but produces permanent, positively correlated, accurate records of angle and integrated intensity data, for each reflection obtained from a specimen crystal, in a form compatible for direct input to a computer for further processing.

An additional object of the invention is to provide an X-ray diffractometer digital control system having an automatic mode of operation responsive to a set of input instructions to position a crystal specimen in three planes, take intensity data for a given reciprocal lattice point of the crystal, and move on for each of a successive set of given lattice point position settings, and also having a semi-automatic mode of operation to enable an operator to search for reciprocal lattice points with a minimum of time and effort.

Briefly, the foregoing objects are achieved by a unique open loop servo control system employing digital electronics in coaction with pulse driven stepper motors, selected gearing arrangements, and solenoids to attain extremely precise automatic control of an X-ray diffractometer having a single crystal goniometer. Capability is provided for both fully automatic and semi-automatic modes of operation. In the fully automatic mode, the electronic system reads angular information from a keypunched instruction card and coacts with the mechanical system to sequentially slew the crystal specimen in either of two directions in three planes by means of rate variable drive pulses, each of which generates a fraction of a degree in angular motion, thereby enabling precise positioning of the crystal and other operational advantages. The system then controls the X-ray shuter and filter operation, the stationary or $2\theta$ moving angle scan of the detector, and the permanent recording of intensity data. The system obviates the need for a real feedback loop by continuously counting the number and controlling direction of the slewing steps in each plane and employing a mechanical system having its inherent inertia and spring constant designed such that after taking data for a given crystal position, the system accurately and precisely steps to the next crystal position in automatic response to the next instruction card. The output of the system is a key-punched card including identity, angle, and intensity data; the data card is fully compatible for computer use in plotting Fourier maps, etc. In the semi-automatic mode, an operator can control crystal positon setting and the initiation of intensity data taking for each point of examination by means of a push-button control panel. The system also includes two self-test modes which may be used for detecting system failures or operational errors and generating an alarm in response thereto.

Other objects, features and advantages of the invention, and a better understanding of its construction and operation will be apparent from the following description taken in connection with the accompanying drawings, in which:

FIG. 1 is a diagram showing the geometry of the plane of diffraction of an X-ray diffractometer to which previous reference has been made;

FIG. 2 is a diagram showing the three-diemensional geometry of the goniometer controlled by the servo system of the present invention to which previous reference has been made;

FIG. 3 is a perspective view of the diffractometer apparatus to which previous reference has been made, and with which the digital system of the present invention is applicable;

FIG. 4 is a perspective side view of the dual-plane goniometer of the diffractometer, also referred to earlier;

FIG. 5 is a block diagram of a digital electronic control system in accordance with the invention;

FIG. 6 is a block diagram of a direction memory circuit useful in the system of FIG. 5;

FIG. 7 is a block diagram of a comparator circuit useful in the system of FIG. 5;

FIG. 8 is a simplified block diagram of an alternate comparator circuit useful in the system of FIG. 5;

FIG. 9 is a block diagram of a scan counter useful in the system of FIG. 5;

FIG. 10 is a block diagram of a system clock circuit configuration useful in the system of FIG. 5;

FIG. 11 is a block diagram of a line derived multiple frequency source useful in the system of FIG. 5;

FIG. 12 is a block diagram of an up control logic circuit useful in the system of FIG. 5;

FIG. 13 is a block diagram of a burst generator useful in the system of FIG. 5;

Figure 14:
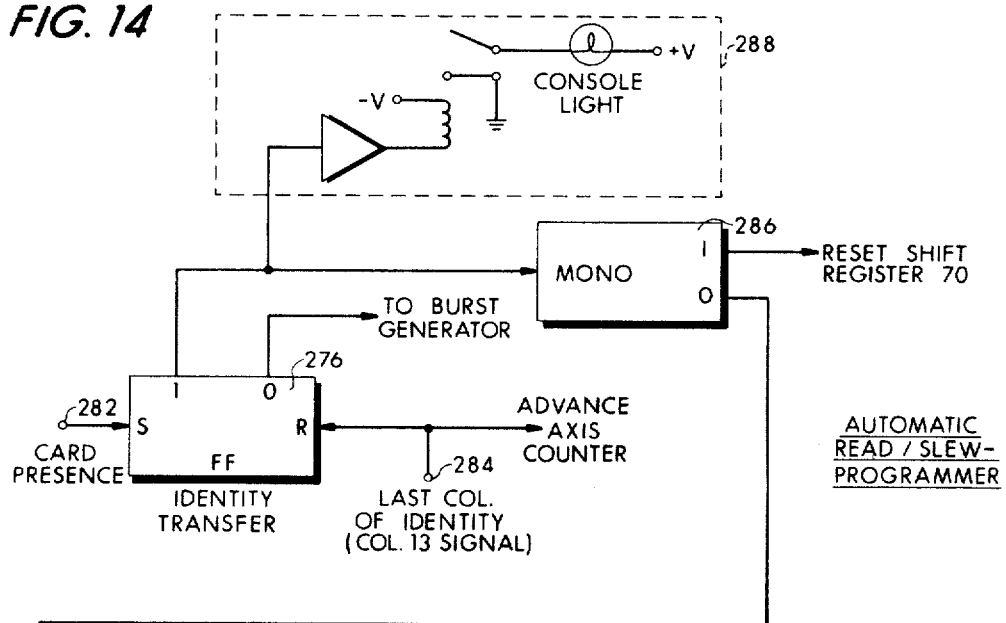
FIG. 14 is a block diagram of the automatic mode "read and slew" section of the progammer employed in the system of FIG. 5.

The digital control system of the invention will now be described in a preferred embodiment for controlling the X-ray diffractometer illustrated in FIG. 3. A functional and detailed description of system construction, including such brief discussion of operational steps as necessary for a clear understanding of the structure, will first be presented, followed by a detailed description of the full operational cycles. The total system comprises a cooperative combination of electronic digital processing cicuitry, digital-to-analog converters, and associated mechanisms. Referring to the block diagram of FIG. 5, the electronic system includes an input reader 54, for receiving instructions from key-punched program cards in the fully automatic mode of operation, and a set of diffractometer base controls 56, for receiving pushbutton instructions in the semi-automatic mode of operation. The base controls 56 are mounted on the face panel of control box 22 (FIG. 3) and are described in greater detail hereinafter. Reader 54 may comprise any suitable digital card key-punch machine; e.g., an IBM 526 Summary Punch. An identical key-punch machine is employed as an output punch 58 for converting the decimal output information signals from the control system into key-punched output cards compatible for use in computers, such as the IBM 1620, for further processing, if desired.

A set of console controls 60, also to be described in more detail later, are utilized for both automatic and semi-automatic operation and are connected as inputs to a programmer 62, as are the diffractometer base controls 56 and the input reader 54. The programmer, which will be described in detail hereinafter, is the heart of the control system in that it controls nearly all elements of the system. Cooperating with programmer 62 in controlling the time and sequence of all operations are a set of system clock sources and a burst generator, illustrated as block 64.

The program cards used with the reader and output punch contain a large number of columns, each corresponding to a digit of numerical information when punched. Each column has ten punch positions corresponding to the numerals 0 through 9. The reader and output punch have ten output lines and ten input lines, respectively, each line corresponding to a numerical position in a column of the card. A positive pulse on a given output or input line signals the reading or punching of the corresponding numerical position on the card. A normally open gate 66 controlled by the programmer connects the reader output lines to the punch 58 input lines. Before each angle slewing sequence, identity information is transferred directly from input to output card via gate 66 without further action on the part of the system. The ten output lines of reader 54 are also connected to a decimal-to-binary coded decimal converter 68, the four output lines of which are connected to input connections of a buffer storage shift register 70; a binary coded decimal-to-decimal converter 72 is similarly connected between output punch 58 and output connections of shift register 70.

Converter 68 may comprise a matrix of diode gates arranged to convert the decimal digit from the reader 54, represented by a positive pulse on one of the output lines, to a conventional four bit binary coded decimal digit for application to the first four bit stages (first numerical digit stage) of shift register 70. For example, if a positive pulse is generated on the reader output line corresponding to the decimal digit 1, the output of the converter will be 0001 (a binary one); if a positive pulse is generated on the output line corresponding to the decimal digit 2, the converter output will be 0010 (a binary two); if a positive pulse is generated on the decimal digit 3 output line, the converter output will be 0011 (a binary three), etc. Converter 72 comprises a similar diode matrix connected to operate conversely to converter 68; the four bit binary coded decimal input to converter 72 is taken from the last four bit stages (last numerical digit stage) of shift register 70.

The digit sets or numbers processed by the reader, buffer storage, and output punch are the $\phi$, $\chi$ and $2\theta$ angles and the intensity data count; identity information bypasses buffer storage. It had been established that a set size of six digits provides ample capacity for these requirements. Shift register 70, therefore, has twenty-four bit stages which provide a capacity for six numerical digits; i.e., six sets of four bit binary coded decimal numbers. In the process of reading, burst generator 64 produces the pulses for loading and shifting the register 70. More specifically, a set of six digits on the program card are read by driving the reader 54 with a burst of six pulses. Inserted in time between each pair of drive pulses is a set of four shift pulses. Hence, the total output of the burst generator for each digit set is a burst of six drive pulses interlaced in time with five sets of shift pulses. The first drive pulse advances the reader by one column (digit) and generates a decimal output (single pulse on one of ten lines) which is converted to a four bit binary coded decimal digit and loaded into the first set of four bit stages on the shift register. The four shift pulses then shift this information in the register by four stages, or equivalently, one numerical digit. The second drive pulse advances the reader and generates a decimal corresponding to the second digit of the set of six. This number is also loaded into the first set of shift register stages and shifted by four bit stages. This process continues until the sixth, or last, digit is loaded into the first four stages of the buffer storage register; there being no need to shift this number, a sixth set of shift pulses is unnecessary. A complete digit set has now been read and stored in the shift register 70 by means of a transfer process that may in general terms be described as a serial input to the shift register, but is more accurately a bit parallel-character serial input; i.e., the four bits that make up the binary coded decimal digit are loaded into the register in parallel, but the digits are transferred serially in the order read off the card. The serial output of the buffer storage 70 is operated in a nearly converse fashion, upon receipt of a burst generator command of identical pulse content, to sequentially transfer and shift digits from the last set of four stages of the shift register onto a key-punched output card. There are, however, some differences in the reading and recording operations with respect to transfer of information into and out of the buffer storage. Specifically, during reading, the burst of six drive pulses is applied to the space interposer of the input reader 54; this mechanism actuates the reader to advance the card and read it, but not to punch any holes. During recording, the burst of six drive pulses is applied to a gate in BCD-decimal converter 72 for strobing or sampling the output of the last four bit stages of the shift register. Each sampling pulse generates a pulse on one of the ten input lines to output punch 58 (depending upon the digit in the last four stages of the shift register) which triggers an amplifier to advance the card a column and punch a hole in that particular numeral row of the card.

As briefly discussed above, the control system, in the automatic mode, reads angular information from the keyed-punched instruction card and coacts with a step servomechanism to sequentially slew the crystal specimen in three planes by means of rate variable drive pulses, each of which generates a fraction of a degree of angular motion. The prime angular motions controlled by the present system are the $\phi$, $\chi$ and $2\theta$ described in connection with FIG. 3, the $\phi$ and $\chi$ angles being polar rotation and inclination slewing of the crystal, respectively, and the $2\theta$ angle being rotation of the radiation detectors and $2\theta$ scale, which mutually generates, by bisecting means, horizontal rotation slewing of the crystal at $\theta$. This automatic slewing operation is accomplished as follows: After each reading of an angle (a set of six digits) the content of a respective angle counter ($\phi$, $\chi$ or $2\theta$) is compared in a comparator circuit 74 with the contents of the buffer storage unit 70. If there is a disagreement, the programmer sends instructions and clock pulses to a motor control circuit 76. The latter includes a direction memory circuit operative in response to the instruction and clock pulses to apply up or down drive pulses to a respective motor driver to generate incremental slewing to the angle read from the instruction card and contained in the shift register. The output pulses of the motor control circuit, whether up or down, are coupled through an OR gate 78 to the respective angle counter. In this instance, each drive pulse from the motor control circuit as a result of the step servomechanism generates a 0.0025° increment of angular movement (either $\phi$, $\chi$ or $2\theta$), whereas a precision of only 0.01° is required. More particularly, the angle reading measurement and count are to a precision of 0.01°, but the granularity of the system motion is of an even finer accuracy in that it takes four drive pulses to generate 0.01° of angular movement. Consequently, each angle counter includes a divide-by-four input coupling circuit whereby each pulse counted represents 0.01°. In addition to drive pulses, the motor control circuit applies a direction signal to the respective counter so that the counter will count up for up-motion pulses and down for down-motion pulses, these directions correlating with the actual physical motions. The motor drive pulse rate is controlled by a slew knob on the console 60 for the automatic mode of operation. Comparator 74 continues to monitor the contents of the respective counter and buffer storage, and when the numbers in each agree, it sends an agreement signal to the programmer 62 which stops action for that respective angle and initiates the next step in the programmed sequence.

It has been mentioned above that the precision of measurement is coarser than the precision of movement (drive pulses) by a factor of four. Theoretically, therefore, this allows adaptation of the system for greater measurement accuracies, when required, by expansion of the comparator, angle counters, and buffer storage. The real reason for the finer increments of motion, however, is to gain at least two significant system advantages: (1) The finer increments of motion allow lower torque requirements, thereby minimizing motor size and enabling more compact and economical packaging of the step servomechanisms; and (2), more importantly, the use of minute slewing steps reduces undesirable vibration of the crystal, especially during $2\theta$, $\theta$ scan; $\theta$ slew of the crystal is made in even finer increments, specifically 0.00125°, or one-half of the 0.0025° steps of the $2\theta$ movement of the detector scale, due to the bisecting mechanism coupling therebetween.

As mentioned previously, the system includes three angle counters, each including a divide-by-four input circuit: a $\phi$ angle counter 80, a $\chi$ angle counter 82, and a $2\theta$ angle counter 84. Each of these units are up-down (forward-backward) binary coded decimal counters; i.e., whereas a conventional binary counter counts from 0 to $2^{n-1}$, where $n$ is the number of stages, BCD counters include feedback connections such that each set of four stages, which represents a numerical digit, counts only from 0 to 9 in binary form. Direction of count in each is controlled by application of an appropriate direct current (D.C.) signal to one of two buses in each counter; this D.C. signal is generated by the motor control circuitry and indicates whether the angles are being swept in the forward or backward direction. By suitable gating, each numerical digit set of four stages counts from 0 to 9 if an up command is applied to the forward bus line, and if a down command is applied to the backward bus line, the count will be in the reverse direction from 9 to 0. For example, assume the least significant set of four counter stages is at zero (0000) and one input pulse is applied to the counter with an up command present; the new state of these four stages will then be 0001 (a binary 1). If a down command were present upon receipt of the single input pulse, the state would be 1001 (a binary 9), and continuing applicating of input pulses would cause a further count down. This bi-directional count capability enables the counters to function as continuous storage units for the instant position of respective slew axes (to the aforementioned precision). The motors employed for generating angular motion are exclusively operated and controlled by the pulse output of motor control circuit 76; hence, use of these counters provides a continuous monitor of the positions of the three axes and obviates the need for a real servo feedback loop.

In this embodiment, $\phi$ counter 80 includes eighteen bit stages since it is required to count from 0 to 359.99°; $\chi$ counter 82 has sixteen stages to allow a count from 0 to 99.99°; and $2\theta$ counter 84 has seventeen stages allowing a count from 0 to 159.99°. The $\chi$ and $2\theta$ counters are similar, except for capacity, each being arranged as a conventional non-circulating forward-backward counter capable of counting numbers from zero to maximum count and back down again. This corresponds with the mechanical arrangement for the $2\theta$ and $\chi$ scales or carriages, each of which are limited in either direction by a pair limit stops in the form of microswitches. If movement of a carriage causes it to strike a limit stop, a signal is applied to the motor control circuit to reverse direction. One $2\theta$ limit stop 86 is visible in FIG. 3, being mounted on base 12, and one $\chi$ limit stop 88 is visible on the curved structure 38 of goniometer 34. The $\phi$ axis, however, has no limit stops inasmuch as it rotates through a complete circle; consequently, the $\phi$ counter 80 differs from the other angle counters in that it is a continuous counter. More specifically, the $\phi$ axis does not have to reverse during an up or down count; therefore, in counting up to 359.99, another pulse in the presence of an up command will register a zero in the counter, and, if the counter is at zero, a single input pulse in the presence of a down command will cause a backward count to 359.99.

Selection of the proper angle counter and slew motor driver for system processing in response to a particular angle reading is accomplished by a relay matrix 90 controlled by a programmer logic circuit. This relay matrix may be thought of as including three sets of switches; a switch set 90a connected between OR gate 78 and the divide-by-four input circuits of angle counters 80, 82 and 84 to enable selection of the $\phi$, $\chi$ or $2\theta$ counter input line; a switch set 90b connected between parallel output lines of each of angle counters 80, 82 and 84 and parallel input lines of comparator 74 to enable selection of the $\phi$, $\chi$ or $2\theta$ count output number; and, a switch set 90c connected between the output drive pulse lines of motor control circuit 76 and the motor drivers to enable selective connection of the up or down pulse lines to the $\phi$, $\chi$ or $2\theta$ motor driver. In addition to this selector switch function, the relay matrix also provides suitable output signals to a number of system components indicating the slew axis in process at the time. The details of the relay matrix logic control will be described hereinafter along with other details of the programmer 62.

Referring now to FIG. 6, the direction memory of motor control circuit 76 comprises three gated flip-flop circuits 92, 94 and 96 functioning as direction memory units for the three slew axes $\phi$, $\chi$ and $2\theta$, respectively. Flip-flop 92 includes a set terminal input AND gate 92a and a reset terminal AND gate 92b, and $\chi$ flip-flop 94 and $2\theta$ flip-flop 96 have analogous input AND gates 94a and 94b, and 96a and 96b, respectively. The direction memory flip-flops are controlled by a set of down command switches comprising the $2\theta$ high limit stop 86, a $\chi$ high limit stop 89, and a console override switch 98, and a set of up command switches comprising a $2\theta$ low limit stop 87, the $\chi$ low limit stop 88, and a console override switch 100. The down command switches are connected from ground via 102 to a source of positive voltage represented by terminal 104, the line being connected in parallel to the set terminal AND gates 92a, 94a and 96a. The up command switches are connected from ground via line 106 to a positive voltage source, represented by terminal 108, and connected in parallel to the reset terminal AND gates 92b, 94b and 96b. Terminals 112, 114 and 116 have $\phi$, $\chi$ and $2\theta$ control signals, respectively, applied thereto which are derived from relay matrix 90; these signals are applied to both input AND gates of flip-flop circuits 92, 94 and 96, respectively. The "set" output terminals of flip-flops 92, 94 and 96 are connected to one input terminal of NAND gates 118, 120 and 122, respectively, and the "reset" output terminals of the flip-flops are connected to one input terminal of NAND gates 124, 126 and 128, respectively. A respective output axis control signal derived from the relay matrix 90 is applied to the other input terminal of each of these NAND gates. Specifically, terminals 130, 132 and 134, representing $\phi$, $\chi$ and $2\theta$ signal sources, are connected to NAND gates 118, 120 and 122 respectively, and terminals 136, 138 and 140, representing $\phi$, $\chi$ and $2\theta$ signal sources of a different character, are connected to NAND gates 124, 126 and 128, respectively. The outputs of NAND gates 118, 120 and 122 are connected to the input terminals of an output NAND gate 142, and the outputs of NAND gates 124, 126 and 128 are connected to an output NAND gate 144.

A down command signal, caused by the closing of either of the switches in line 102 to ground, will trigger to the set condition only the flip-flop corresponding to the axis being slewed, as determined by the presence of a control signal at one of the terminals 112–116. The resulting down signal at the "set" terminal of the triggered flip-flop is coupled via a respective NAND gate of the set 118–122 and output NAND gate 142 to logic circuitry in motor control circuit 76. For example, if the $\chi$ axis is being slewed and the high limit stop 89 is stuck, thereby closing the switch, a control signal will be present only on $\chi$ terminal 114 whereby only AND gate 94a of the $\chi$ flip-flop 94 will allow the down command signal to be applied to the set terminal. The "set" output signal of flip-flop 94 is then allowed through NAND gate 120 (because of the presence of a control signal at $\chi$ terminal 132) and NAND gate 142 (which functions as an OR gate in the configuration) to provide a down signal to subsequent control logic.

The up command switches initiate a similar operation except that the respective flip-flop is triggered to the reset condition, and the resulting up signal at the "reset" terminal of the triggered flip-flop is coupled via a respective NAND gate of the set 124–128 and output NAND gate 144 to subsequent motor control logic circuitry. Hence, the state of the direction memory may be changed by the $2\theta$ or $\chi$ limit switches on the goniometer apparatus, or by the console override switch. Also, a system reset button on the console (not shown in FIG. 6) is available for resetting all flip-flops to thereby establish that the count is going to be up scale. When all command switches are in the normally open position, each flip-flop is in the state to which it had been last individually triggered. Hence, each flip-flop constitutes a memory of the last direction of motion of its corresponding slew axis; for example, if the $\phi$ axis is about to be slewed, the presence of a control signal on terminals 130 and 136 enables the motor control logic to have access to the memory state of $\phi$ flip-flop 92. The resulting up or down signal output will cause the $\phi$ axis to be driven in the same direction as it was last moving in its previous slew cycle, unless the state of the flip-flop had been interrupted in the interim.

By employment of the above-described direction memory concept, comparator 74 may consist of a simple arrangement of logic gates for comparing the parallel outputs of buffer storage 70 and of a selected angle counter and generating a signal in response to bit for bit agreement of the two numbers. More specifically, with reference to FIG. 7, comparator 74 may comprise a tree of eighteen inverted exclusive OR circuits 146, one inverted exclusive OR circuit for each bit stage in the largest angle counter ($\phi$ counter 80). The parallel outputs from shift register 70 and the selected angle counter (80, 82 or 84), corresponding to the bit stages in each, are applied as parallel inputs to this arrangement of inverted exclusive OR circuits. A mating set of counter and shift register output signals, represented by C and R respectively, are applied to each inverted exclusive OR circuit 146, whereby each circuit 146 constitutes a one bit comparator. If the C and R inputs to an inverted exclusive OR are both 0 or both 1, the output will be a true indication; if C and R are not alike, a false indication will result.

The outputs of circuit 146 are grouped by fours, each set of four corresponding to a numerical digit, and applied as parallel inputs to a corresponding one of a plurality of AND gates, two of which are shown at 148 and 151. For the case of eighteen inverted exclusive OR circuits, there are four 4-input terminal AND gates and one 2-input terminal AND gate 152, corresponding to the two bit stages of the most significant digit place in $\phi$ counter 80. Each of the AND gates 148–152, therefore, constitutes a digit for digit comparator. The outputs from the digit comparator AND gates are connected in parallel to an AND gate 154, which allows an agreement signal output upon number for number agreement of the counter and shift register inputs.

While this direction memory and comparator implementation approach offers significant economics in cost and design complexity, it has the inherent disadvantage of relatively slow operating time. More specifically, it will be recalled from the description of the direction memory that a slew axis normally will be driven in the direction in which it was last moving in its previous slew cycle; hence, when an instruction card angle reading calls for a reversal of direction, the system will not take the shortest slew path to the desired angle. For example, if the last angle reading for a selected axis was 90°, and the direction of slew for that axis was up, the system will slew as follows to obtain comparator agreement for a new angle reading of 89°; if the $\phi$ slew is the axis in question, the system will step through the complete circle from 90° up to 359.99°, then to 0° and up to 89°; if $\chi$ slew, the system will step from 90° up to 99.99°, hit the high limit stop, then reverse direction and step down to 89°; and, if $2\theta$ slew, the system will step from 90° up to 159.99°, hit the high limit stop, then reverse direction and step down to 89°.

To circumvent this disadvantage, the operator may manually employ the console direction override switch 98 or 100 (FIG. 6), but this defeats the automaticity of the system. Another technique is to sort the stack of instruction cards to be mounted on the reader for maximum economy of slewing time. Yet another approach is to employ a combination of sorting techniques and various system "fixes." For example, based on predetermined lattice point location and Miller indices, etc., the instruction cards may be sorted for constantly increasing $\phi$, and further arranged such that $\chi$ and $2\theta$ run up and down scale together. Along with this sorting technique the system includes auxiliary logic means such that every time $\chi$ arrives at 0°, the $2\theta$ memory unit will be reset to the up scale condition, if it is not already in that state. Further, a C clamp is attached to the $2\theta$ scale to limit the swing of its slewing arc prior to hitting a limit stop.

A complete solution to this slewing direction problem is provided by removing the direction memory circuit (FIG. 6) from motor control circuit 76 and employing a directional comparator for block 74 of FIG. 5 in lieu of the comparator of FIG. 7. Such a design might prove more costly component-wise, but it provides the significant advantages of generating all slewing steps via the shortest route to the desired angle, thereby markedly increasing the number of angle readings per unit time and obviating the need for special card sorting and special system "fixes" to speed up reading time. The directional comparator may comprise, as before, an arrangement of inverted exclusive OR circuits grouped by stages, wherein each stage corresponds to a numerical digit. In this instance, however, as illustrated by the simplified block diagram of FIG. 8, the logic of each stage is arranged to provide three outputs, indicating whether the respective counter digit is high with respect to the corresponding shift register digit, the counter digit is low, or the digits are in agreement. The agreement output line of each stage is connected to the adjacent less significant digit stage, with the agreement signal output line of the least significant digit stage 160 being connected to the programmer as the final agreement signal line of comparator 74 (FIG. 5). The high signal output line of each stage is connected to a down signal bus 162, which is connected to control logic in motor control circuit 76 in lieu of the output of AND gate 142 of the now removed direction memory (FIG. 6). The low signal output line of each stage is connected to an up signal bus 164 connected to motor control circuit logic in lieu of the output of direction memory AND gate 144 (FIG. 6).

In operation, considering the $\phi$ counter by way of example, signals indicative of the contents of the two most significant bit stages of the $\phi$ counter are applied as parallel inputs to the most significant bit stage 156, along with signals indicative of the contents of the mating bit stages of shift register 70. Simultaneously, signals indicative of the contents of the four second most significant bit stages of the counter are applied to the second most significant bit stage 157, along with signals indicative of the contents of the mating shift register bit stages, and so on down the line to the least significant bit stage 160. The inputs to the most significant digit stage are compared first. If the counter digit is higher or lower than the shift register digit, a corresponding high or low signal output will override the balance of the comparator stages and be applied as a down or up signal, respectively, to motor control logic. If the counter and shift register digits agree, however, an agreement signal output will shift the comparison function to the second most significant digit stage 157. This comparison process continues down to the least significant digit stage 160, whereupon the agreement signal output indicates to the programmer 62 that the entire number contained in the counter agrees with the number contained in the buffer storage shift register 70. Thus, the directional comparator technique insures that the direction of slow motion and count are controlled in direct response to the immediate relationship of the counter number with respect to the instruction card angle in the shift register, rather than by memory of the last direction of motion. A console direction override switch may be employed, if desired, but the $2\theta$ and $\chi$ limit stops obviously are rendered unnecessary by the directional comparator, except in cases where a redundant backup is desired.

Upon completion of the reading and slewing of the $\phi$, $\chi$ and $2\theta$ angles, the programmer initiates the specimen irradiation and intensity data accumulation phase of the automatic operation cycle, according to the mode of radiation detection initially set up on the console control 60 (FIG. 5). Referring again to FIG. 3, the system components employed in this phase include a shutter control unit 166, comprising a solenoid for opening and closing shutter 28, and a filter control unit 168. The filter control comprises two opposing solenoids, so arranged that when selectively energized they pull the filter mechanism 20 up or down to select the proper filter. More specifically, when unit 168 is in its normally de-energized state, a clear opening is provided for the X-ray reflection; when the solenoids are energized to pull mechanism 20 up, a nickel filter is inserted in the reflection path; and when the solenoids are energized to pull mechanism 20 down, a cobalt filter is inserted in the reflection path. Additional components employed in this phase include, with reference to FIG. 5, a scan counter 170 and a data counter 172. The data counter is a conventional binary coded decimal counter, with no forward-backward provisions. The scan counter comprises a series of pulse divider circuits with appropriate taps. More particularly, referring to FIG. 9, scan counter 170 comprises a pulse divide-by-100 circuit section 174, a divide-by-2 circuit 176, and a divide-by-2 circuit 178, cascade-connected in that order. The input terminal of the scan counter ($\div 100$ section) is connected to the output terminal of the $2\theta$ counter divide-by-4 input coupling circuit; hence, each pulse applied to the scan counter represents 0.01°. The reason for tapping off the $2\theta$ input is that the function of the scan counter is to count the steps of angular movement of the $2\theta$ axis during the intensity scan phase of operation, $2\theta$ being the only axis employed for intensity scan. Console controls enable the selection of three different scan range taps on the scan counter. The tap after division by 100 provides a pulse indicating the completion of a 1° arc of angular scan movement; i.e., a count of 100 input pulses representing 0.01° each. The tap from the divide-by-2 circuit 176 provides a pulse indicating completion of a 2° scan (a count of 200 input pulses), and the top from divide-by-2 circuit 178 provides a pulse indicating completion of a 4° scan (a count of 400 input pulses).

If a nickel-cobalt scan is selected as the mode of radiation detection, the operation proceeds as follows. First the programmer initiates the nickel scan phase of operation by executing the following functions simultaneously: (a) A nickel scan indicator light on the front panel of the console is turned on; (b) solenoid 166 (FIG. 3) is energized to open X-ray shutter 28; (c) the nickel filter is selected via solenoid control; (d) appropriate diffractometer base control indicator lights are turned on to indicate that the shutter is open; (e) an elapsed time indicator mounted on the console is turned on to provide a visual display of the amount of time the specimen has been exposed to the X-ray source; (f) a blanking signal holding the scan and data counter in the reset or off condition is removed to allow these counters to operate; and, (g) the motor control circuit 76 is signalled to step the $2\theta$ axis in the up direction. The $2\theta$, scan and data counters concurrently operate to continually monitor $2\theta$ axis position, count the scan arc steps taken (the rate of the steps being controlled by a preset push button on the console) and accumulate radiation intensity data, respectively.

A counter detector 180 and scaler 182 (FIG. 5), two units external to the present control system, provide the input pulses to the data counter 172. Counter detector 180, preferably a scintillation counter, is mounted on support base 16 of $2\theta$ scale 14 (FIG. 3), and is arranged to measure the intensity of the radiation reflected by the crystal specimen after it has passed through the nickel filter. The intensity measurement of the counter detector is expressed in terms of the output pulse rate, the pulse rate increasing as intensity increases. The pulse output of the counter is applied to the scaler 182, which includes a preamplifier and pulse height discriminator to reduce background noise. The scaler divides the director output pulse rate by 10, since the last digit is considered of no significance, and displays a count of this pulse output (i.e., after divide by 10) on the front panel of the scaler. The detector output pulse rate, after division by 10 in the scaler, is the signal applied to data counter 172.

The system continues to accumulate the scan and intensity data count until 100, 200, or 400 scan steps have been counted, whereupon the scan counter 170 generates a scan complete signal (a pulse) indicating conclusion of the 1°, 2° or 4° nickel scan phase, respectively. Immediately after scan completion, referring again to FIG. 5, the programmer signals a set of diode gates, illustrated as transfer gate 184, to allow the contents of the data counter to be transferred to the buffer storage shift register 70 after having previously reset shift register 70, to remove any information that might be contained therein. The data counter has twenty-four bit stages (i.e., six complete numerical digit stages) providing a maximum count capability of 999999. The outputs of these twenty-four bit stages are transferred in parallel to the twenty-four stages of shift register 70 via transfer gate 184; the time required for transfer is about 10 microseconds.

The programmer 62 next initiates the nickel data recording or punching phase of operation. A burst of six strobe pulses, interlaced in time with five sets of four shift pulses each, from burst generator 64 is applied to BCD-decimal converter 72 to sequentially sample and shift digits from the last set of four stages of shift register 70 onto a key-punched output card in punch 58, as previously described. A burst complete signal from the burst generator signals the end of nickel data punching and initiates the cobalt scan phase of operation.

The cobalt scan operation is similar to the nickel scan operation with the following exceptions: (a) The cobalt filter is selected instead of the nickel filter; (b) the appropriate set of indicator lights are turned on; and (c) the programmer signals the motor control circuit 76 to set the $2\theta$ axis in the down direction, thereby returning the $2\theta$ axis and $2\theta$ counter 84 to the same angular position at which they were located at the beginning of the nickel-cobalt scan cycle. The burst complete signal from the burst generator signals the end of the cobalt data punching; this is also the conclusion of one complete automatic operational cycle of the diffractometer.

If a stationary mode of radiation detection is selected, instead of the $2\theta$ scan, the operation proceeds as follows. The programmer concurrently executes the following functions: (a) Solenoid 166 (FIG. 3) is energized to open X-ray shutter 28; (b) the nickel filter is selected, (c) appropriate diffractometer base control indicator lights are turned on; (d) the elapsed time indicator is turned on; and, (e) a blanking signal holding the data counter and timer in the reset or off condition is removed to allow it to accumulate intensity data. A preset push button on the console effectively selects no scan counter tap and, in lieu of the scan counter, connects the system to an external timer. Hence, the data counter accumulates data by strictly a time scan, with the $2\theta$ axis stationary, and the duration of the open shutter condition controlled by the external timer. The system continues to accumulate the intensity data count until a "scan" complete signal (a pulse) is generated by the external timer. The operation of transferring the number from the data counter to the punched card is the same as that described for the case of the nickel scan mode. The above sequence is then repeated using a cobalt filter.

There are three basic sources of frequency information in the system: (1) A system clock for controlling slewing speed in the automatic mode; (2) a system clock for controlling slewing speed in the semi-automatic mode; and, (3) a multiple frequency source derived from the 60 cycle line voltage for providing a selection of three scanning rates. Other pulse rates are also derived from these system clocks, as will be described. Referring to FIG. 10, a block diagram representative of both the automatic and semi-automatic clocks is shown as comprising a clock source 186, such as an astable multivibrator, having a pulse rate control potentiometer 188. Potentiometer 188 is actually a slewing speed control, and in the case of the automatic mode clock is mounted on the console; the slewing potentiometer for the semi-automatic clock is mounted on the diffractometer base control panel. The pulse output from clock source 186 is variable over the range of 80–180 p.p.s. for the automatic mode clock and 40–180 p.p.s. for the semi-automatic clock. The pulse rate generated from the clock source 186 is used directly for driving the $\phi$ and $\chi$ axes, and, since $2\theta$ has a greater inertial load, the rate is divided by 2 before application to drive $2\theta$. Hence, the output line of the clock is connected to a NAND gate 189, along with a $\phi$ or $\chi$ signal source, represented by terminal 190, derived from the relay matrix and indicative of either $\phi$ or $\chi$ axis slew. The output of NAND gate 189 is connected to a NAND gate 192, which acts as an OR gate in this configuration. The output line of clock source 186 is also connected directly to a NAND gate 194 and to the trigger input terminal of a flip-flop circuit 196. The flip-flop generates a square wave in response to the clock pulses, which is also applied to NAND gate 194. Connected to another input terminal of NAND gate 194 is a $2\theta$ signal source, represented by terminal 198, derived from the relay matrix and indicative of slewing of the $2\theta$ axis. Hence, NAND gate 194 functions to divide the clock rate by 2 in the presence of a $2\theta$ slew signal. The output of NAND gate 194 is also connected to NAND gate 192, the clock output of which is applied to other circuitry in a manner to be described. Finally, the output of clock source 186, in the automatic mode circuit only, is also connected (as represented by the dashed line) to the burst generator circuitry for providing a source of shift pulses.

Referring now to FIG. 11, the line-derived multiple frequency source is shown as comprising a source of 60 cycle line voltage, represented by terminals 200 and 202, connected through a filament transformer 204 to the input of a Schmitt trigger circuit 206. The Schmitt trigger converts the sinusoidal line voltage to a square wave which is coupled through a NAND gate 208 to a divide-by-4 circuit 210. The output of the divide-by-4 provides a 15 c.p.s. square wave source, and is subsequently divided by two in circuit 212 to provide a 7.5 c.p.s. source, which is further divided by two in circuit 214 to provide a 3.75 c.p.s. frequency source. A console switch is initially set to select one of these frequency sources to provide the nickel-cobalt scan rate. In addition, the 7.5 c.p.s. output is connected to the burst generator to provide a pulse rate source for the burst of six reader drive and converter strobe pulse sets. The 3.75 c.p.s. source is also employed to provide a special low slew rate selectable on the diffractometer base controls in the semi-automatic mode. Use of the 60 cycle line in this manner provides a basic frequency source of known accuracy for controlling the scan, burst of 6, and low slew pulse rates. Coupled with the self-test mode to be described, the frequency source may be turned off in event of failure by application of a failure indication signal at terminal 216 to inhibit NAND gate 208.

The control logic circuitry of motor control circuit 76, which employs the aforementioned slew and scan rates in providing up or down drive pulses to the motor drivers and counters, will now be described with reference to FIG. 12. The block diagram shown is representative of the up pulse section of the total control logic, the down pulse section being identical except that down input and output signals apply in lieu of the up signals denoted in FIG. 12, and the cobalt scan signal is applied instead of the nickel scan signal. The circuit comprises an automatic mode AND gate 218 having input terminals 218a and 218b respectively connected to a start slew signal source in the programmer and the up signal output of the direction memory of FIG. 6 (or the directional comparator of FIG. 8). The output of AND gate 218 is connected to one input terminal of an OR gate 220 and to one input terminal of another AND gate 222; the automatic mode clock output is connected to the other input 222a of AND gate 222. The output of AND gate 222 is connected to one input of an OR gate 224, the output of which is the up pulse output line of motor control circuit 76 (FIG. 5) which is connected to the motor drivers via relay matrix 90c and the angle counters via OR gate 78 and relay matrix 90a.

The semi-automatic control logic comprises a pair of AND gates 228 and 230 the outputs of which are coupled through an OR gate 232 to one input of another AND gate 234. A voltage source switch is connected to enable either of AND gates 228 and 230; the other input of AND gate 228 is the semi-automatic mode clock output, represented by terminal 228a, and the other input of AND gate 230 is the 3.75 c.p.s. frequency source of FIG. 11, represented by terminal 230a. The other input of AND gate 234 is an up signal source from the diffractometer base control, represented by terminal 238. This up signal is also connected to the input of OR gate 220. The output of AND gate 234 is connected to an input of OR gate 224.

A programmer "start nickel scan" signal source, represented by terminal 40, is connected to the remaining input terminal of OR gate 220 and to an input terminal of an AND gate 242. The other input terminal 242a of this AND gate is connected to a preselected one of the scan rate sources (FIG. 11). The output of AND gate 242 is connected to the remaining input terminal of OR gate 224.

In the automatic mode of operation, application of both a start slew signal and a direction memory up signal to AND gate 218 generates an output from the AND gate which is applied to enable AND gate 222 to allow automatic mode clock pulses to be coupled through OR gate 224 to drive a respective motor driver and counter in the up direction. The output of AND gate 218 is also coupled through OR gate 220 to apply a DC up command signal to all angle counters (80, 82 and 84) and to turn on the console and diffractometer "up" indicator lights.

In the semi-automatic mode of operation, the diffractometer slew control includes a switch 236 capable of enabling either AND gate 228, to allow the potentiometer variable semi-automatic clock pulses to pass, or AND gate 230 to allow the 3.75 c.p.s. special slew rate to pass. The selected rate is coupled through OR gate 232 to AND gate 234 which can be enabled to pass the clock rate by an "up" push button on the diffractometer. The "up" push button signal also is coupled through OR gate 220 to turn on indictaor lights and signal the up direction to all angle counters. The clock rate passed by AND gate 234 is coupled through OR gate 224 to provide up drive pulses.

If the programmer applies a start nickel scan signal to terminal 240, AND gate 242 is enabled to allow the selected scan rate (FIG. 11) to be coupled through the AND gate and OR gate 224 to provide up drive pulses. The nickel scan signal is also coupled through OR gate 220 to provide an up signal to all angle counters and to turn on the "up" indicator lights.

The burst generator included in block 64 (FIG. 5) will now be described with reference to FIG. 13. The circuit includes an inverted OR gate 244 having input terminals 244a, 244b, 244c and 244d respectively connected to angle read, angle punch, nickel punch, and cobalt punch programmer signal sources. The output of this OR gate is connected to the set terminal of a flip-flop 246, the output terminal of which is connected to one input terminal of an AND gate 248. The other input terminal 248a of this AND gate is connected to the 7.5 c.p.s. frequency source (FIG. 11). The output of AND gate 248 is connected to the input drive terminal of a scale-of-six counter 250 and also to the set terminal of a flip-flop 252. The output of the scale-of-six counter is connected to the reset terminal of flip-flop 246. The circuit configuration described thus far operates as follows. Receipt of a signal from the programmer indicating start of one of the angle reading or punching processes, or the nickel or cobalt intensity data punching process, triggers flip-flop 246 to the set condition. The resulting output signal level from the flip-flop enables AND gate 248 to allow the 7.5 c.p.s. pulse source to drive scale-of-six counter 250. Upon a count of six pulses, flip-flop 246 is reset and AND gate 248 is disabled. The output of flip-flop 246, therefore, is a square wave of sufficient pulse width to allow the generation of the required six pulse set for the burst generator. The trailing edge of the square wave is used as the burst complete signal for the programmer and is also employed to inhibit the generation of shift pulses, as will be described shortly.

Each of the six pulses passed by AND gate 248 triggers flip-flop 252 to the set condition. The resulting flip-flop output signal for each set pulse is applied to enable an AND gate 254. The other input terminal 254a of this AND gate is connected to the 80–180 c.p.s. output of automatic clock 186, a source of shift pulse rates. The shift pulses from enabled AND gate 254 are coupled to shift register 70 via an AND gate 256, and are also applied as drive pulses to a scale-of-four counter 258, the output of which is connected to the reset terminal of flip-flop 252.

Hence, a count of four shift pulses resets flip-flop 252 thereby disabling AND gate 254 and stopping the transfer of shift pulses. The just-described portion of the circuit, therefore, functions to genertae four 80–180 c.p.s. shift pulses in response to each 7.5 c.p.s. pulse.

The set condition output of flip-flop 252 is also applied via a delay circuit, represented by monostable 260 and OR gate 262, to trigger a 13 ms. monostable 264. The width of the output pulse of monostable 264 is sufficient to drive card reader 54 and is connected to the space interposer of the card reader via an AND gate 266. AND gate 266 is enabled to apply the burst of six pulses to drive the reader space interposer by application of a programmer angle read signal (represented by terminal 268a) or a test mode signal, to be discussed later, via OR gate 268. The output of monostable 264 is also connected to one terminal of an AND gate 270, which is enabled by application via OR gate 272 of one of the programmer signals indicating start of angle punching, or nickel or cobalt data punching, to apply the burst of six drive pulses to the strobing gate in BCD-decimal converter 72. The angle punching, nickel data punching and cobalt data punching signals are represented by terminals 272a, 272b and 272c, respectively.

Monostable 260 delays the triggering of each of the burst of six drive pulses from monostable 264 for a time sufficient to allow prior application of the set of four shift pulses to shift register 70. Consequently, each set of 7.5 c.p.s. pulses generated from AND gate 248 triggers a burst of six drive pulses from AND gate 266 or gate 270 and six sets of four shift pulses each from AND gate 254, each set of four shift pulses preceding in time each drive pulse. As previously discussed, however, the first set of shift pulses is unnecessary; hence, an AND gate 275 is connected to recognize the 001 state of scale of six counter 250 (i.e., the count of the first 7.5 c.p.s. pulse) and apply in response thereto an inhibit signal to AND gate 256. Also, to ensure no shift pulses are generated after the sixth drive pulse, an inhibit signal is also applied to gate 256 in response to the trailing edge of the set square wave output of flip-flop 246.

Transfer of identity information (reading and punching), which may comprise up to thirteen digits, does not involve shift register operation and requires the application of thirteen drive pulses to the space interposer of reader 54. Hence, a programmer generated identity transfer signal is applied to input terminal 274a of an AND gate 274 to enable the AND gate thereby allowing the 7.5 c.p.s. pulse source at the other input 274b of the AND gate to be coupled through OR gate 262 to trigger monostable 264. These pulses are allowed through AND gate 266 by a programmer identity transfer signal (represented by terminal 268b) applied to the AND gate via OR gate 268. The balance of the circuitry in FIG. 13 relates to a Test Mode data reading operation which will be described hereinafter.

As previously mentioned, the primary function of the programmer 62 is to control the proper sequencing of the operational states of the system. The operational states of a typical automatic mode cycle are listed below in Table 1:

TABLE 1

| State No. | State | Event Terminating State |
|---|---|---|
| 1 | Identity Transfer | Last Column of Identity Field. |
| 2 | Read $\phi$ Angle | End of $\phi$ Field. |
| 3 | Slew $\phi$ Axis | Agreement of $\phi$ Axis and Angle on Card. |
| 4 | Read $\chi$ Angle | End of $\chi$ Field. |
| 5 | Slew $\chi$ Axis | Agreement of $\chi$ Axis and Angle on Card. |
| 6 | Read $2\theta$ Angle | End of $2\theta$ Field. |
| 7 | Slew $2\theta$ Axis | Agreement of $2\theta$ Axis and Angle on Card. |
| 8 | Nickel Scan | Scan Complete. |
| 9 | Record Data | Punching of 6th Digit of Nickel Data. |
| 10 | Cobalt Scan | Scan Complete. |
| 11 | Record Data | Punching of 6th Digit of Cobalt Data. |

Each state can be regarded as represented by a bistable storage element (flip-flop) which is switched "on" by "turn-off" of the preceding stage and is itself "turned-off" by a signal coincident with the event described in the last column. The programmer circuitry for controlling the sequence of states shown in Table 1 will now be described by dividing the total unit into functional sections. A "read/slew" circuit section controls the sequencing of states #1 through #7. An "axis counter" section controls the sequencing of relay matrix 90 in proper order of selection of slew axis (ref. states #3, 5 and 7). A "start scan" NAND gate recognizes the end of 2θ slewing and initiates the "scan" and data recording phase, starting with state #8. A "scan and data recording" circuit section controls nickel scan and data recording and cobalt scan and data recording.

Referring to FIG. 14, the automatic mode "read/ slew" circuit basically comprises three bistable control elements: an identity transfer flip-flop 276 for signaling the transfer of identity information from the instruction card to the output card and switching to angle reading upon completion of identity transfer; an angle read flip-flop 278 for signaling application of the burst of six pulses to the space interposer of the card reader and switching to slewing upon burst complete; and, a slew flip-flop 280 for signaling the start of angle slew and stopping slew upon receipt of an agreement signal (i.e., agreement between the angle on the card and the actual angle of the respective axis of the goniometer apparatus).

The set input terminal of flip-flop 276 is connected to a signal source in the output punch 58 (FIG. 5), represented by terminal 282, which indicates presence of a card under the punch head; that is an available output of the IBM 526 Summary Punch and indicates the machine is ready to punch. The reset input terminal of flip-flop 276 is connected to a given column output signal of the reader 54 (another available signal source in the IBM 526) represented by terminal 284, which indicates the end of the identity field; in this instance column thirteen was chosen to terminate identity transfer. The output terminals of each of the flip-flop circuits are labeled "1" and "0." In the initial reset condition, the "1" output is at a positive level with respect to the "0" output. A set trigger input causes a negative transition at the "1" terminal and a positive transition at the "0" terminal. The bistable remains in this state until application of a reset trigger input, which causes a positive "1" output transition and a negative "0" output transition. Each of the flip-flop units have AC-coupled input circuits including differentiating means, and set and reset are triggered by positive transitions of the input signals. The "1" output of the identity transfer flip-flop 276 is connected to the trigger input of a monostable 286 and to a console indicator light circuit 288. Circuit 288 may comprise a relay for closing the appropriate console light circuit in response to a flip-flop signal applied through an amplifier; the circuit is typical for the identity transfer, angle read, and slew flip-flops. The "1" output of monostable 286 is connected to the reset terminal of shift register 70, and the "0" output is connected through an OR gate 289 to the set input terminal of the angle read flip-flop 278.

Figure 15:
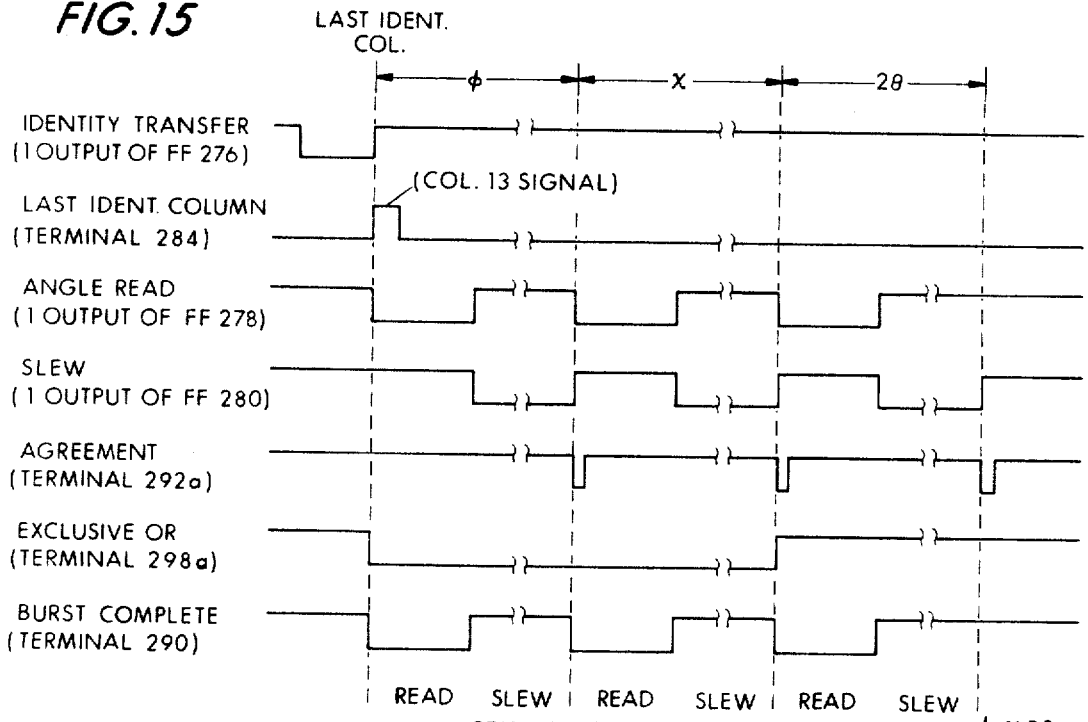
FIG. 15 is a timing diagram of waveforms at various points in the block diagram of FIG. 14.

Referring to the wave forms in FIG. 15, along with the circuit of FIG. 14, identity transfer flip-flop 276 initially rests in the reset condition with the "1" output at a relatively positive level. Arrival of a card under the punch head trips a switch on the IBM punch to cause a positive transition at terminal 282 which triggers flip-flop 276 to the set condition. The resulting negative output level from the "1" terminal lights the console identity transfer indicator, and the positive output level at the "0" terminal is applied to terminals 274a and 268b of the burst generator (FIG. 13) to enable AND gates and allow the generation of space interposer drive pulses. When the instruction card has been advanced by the reader to column thirteen, the resulting positive transition at terminal 284 is applied to advance the axis counter and trigger flip-flop 276 to the reset condition. This event disables the burst generator drive pulse source, and the positive transition of the "1" output triggers monostable 286. The positive square wave from the "0" terminal of the monostable is applied to reset the buffer storage shift register and the positive transition at the "1" terminal, when the monostable returns to its quiescent state, is coupled through OR gate 289 to set the angle read flip-flop.

Upon being triggered to the set condition in response to completion of identity transfer, the negative transition at the "1" output terminal of flip-flop 278 is applied to input terminal 244a of the burst generator to trigger generation of the burst of six drive pulses and shift pulses. The negative output level of this flip-flop is also applied to terminal 268a of the burst generator, to allow the burst of six drive pulses to be applied to the space interposer. The negative output is also applied to light "reader auto," "coordinate read" and "coordinate punch" indicators on the console (angle reading and punching occur simultaneously in the automatic mode). The "1" terminal of the angle read flip-flop is also connected to the set input terminal of slew flip-flop 280. The reset terminal of flip-flop 278 is connected to the burst complete signal source in the burst generator (output of flip-flop 246 in FIG. 13), represented by terminal 290. The positive transition of the burst complete waveform resets the angle read flip-flop, and the resulting positive transition of the "1" output sets slew flip-flop 280 and turns off the read and punch console lights.

In the set condition, the negative output level of the "1" terminal of flip-flop 280 is applied to light the "slew" indicator on the console and to terminal 218a in both the up and down control logic circuits (FIG. 12) to enable generation of up or down drive pulses for the axis motor drivers and counter selected by the axis counter and relay matrix. In the automatic mode, the φ axis is chosen for the first slewing operation. The "1" terminal of the slew flip-flop is also connected to enable a NAND gate 292, the output of which is connected via a monostable 294, to the reset input terminal of the slew flip-flop. The other input 292a of NAND gate 292 is connected to the agreement signal source in comparator 74 (FIG. 5). The slew flip-flop remains in the set state and continues to allow slewing of the φ axis until an agreement signal pulse is applied via NAND gate 292 to trigger monostable 294 and thereby reset flip-flop 280. This event terminates slewing of the φ axis. The output of monostable 294 is also applied via monostable 296 to to advance the axis counter to the χ axis. The reset positive transition at terminal "1" of flip-flop 280 is coupled via AND gate 298 and OR gate 289 to set the angle read flip-flop 278, thereby initiating χ axis read and slew. AND gate 298 is enabled during the φ and χ and read/slew periods by a negative output signal from an exclusive OR gate in the axis counter, represented by terminal 298a. Reset of the shift register is not required between the φ–χ and χ–2θ reading operations since the first digit stage of the six digit stage shift register will always be zero for angle readings, which have a maximum of five digits.

χ axis read and slew operation for FIG. 14 circuitry is identical to that described for the φ axis. Upon occurrence of the χ axis agreement signal, the axis counter is advanced to the 2θ axis and reset of the slew flip-flop initiates 2θ axis read and slew. The operation for the 2θ axis is similar to the for the φ and χ axes except AND gate 298 is disabled to prevent initiation of another read/slew cycle by reset of flip-flop 280; i.e., the read/slew programmer is shut off after the 2θ slew and agreement. The "0" output terminal of flip-flop 280 is connected as one of the inputs to a "start scan" gate, to be described hereinafter.

Figure 16:
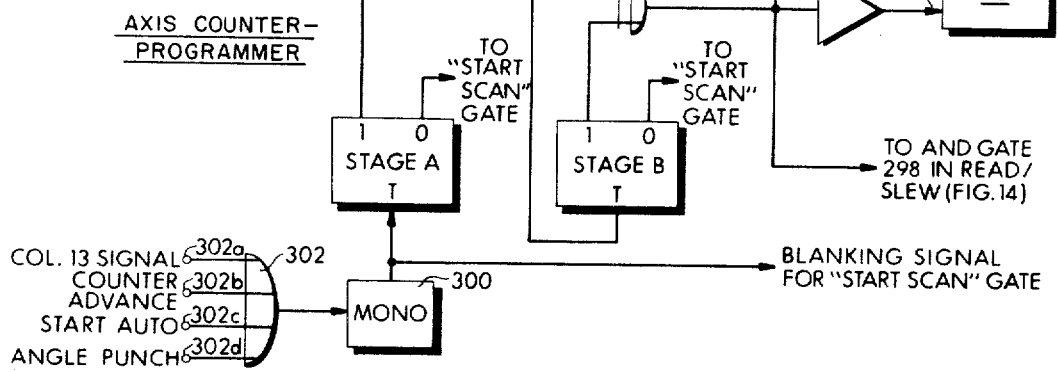
FIG. 16 is a block diagram of the "axis counter" section of the programmer employed in the system of FIG. 5.

Referring to FIG. 16, the programmer "axis counter" circuit comprises a two stage scale of four counter which counts in standard binary form. The toggle input of flip-flop stage A of the counter is connected to the output of a monostable 300. Four input signal sources are coupled to the trigger input of this monostable through an OR gate 302. Input terminal 302a is connected to the column thirteen signal source in the reader (represented by terminal 284 in FIG. 14); input terminal 302b is connected to the counter advance signal source at the output of monostable 296 in the "read/slew" section (FIG. 14); input terminal 302c is connected to a "start automatic operation" signal source in the semi-automatic mode section of the programmer, to be described hereinafter; and, input terminal 302d is connected to an "angle punch" signal source in the semi-automatic mode section.

The "1" output terminal of counter stage A is connected to the toggle input of counter stage B, and the "1" outputs of both counters are connected to an exclusive OR gate 304, the output of which is connected through an amplifier 306 to bus #1 of the relay matrix 90. The "1" output of stage A is also connected directly through an amplifier 308 to bus #2 of the relay matrix. The "0" outputs of the two counters are connected as inputs to the "start scan" gate of the programmer.

Figure 17:
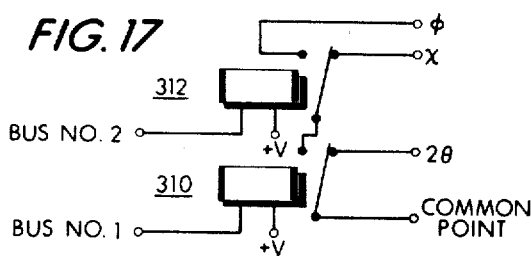
FIG. 17 is a circuit diagram of a typical relay "switch" of the relay matrix employed in the system of FIG. 5.

Relay matrix 90 comprises a number of relay "switches," a typical one of which is shown in FIG. 17. Each "switch" comprises a pair of relays, denoted as 310 and 312 in the circuit diagram. Each relay 310 winding is connected between a source of positive potential and bus #1, and each relay 312 winding is connected between the source of positive potential and bus #2. When relay 310 is de-energized, the common point is closed to the contact connected to a terminal labeled $2\theta$. When relay 310 is energized, the common point is closed to the contact connected to the common point of relay 312. Relay 312 operates in a similar fashion, the normally closed contact being connected to a $\chi$ terminal and the normally open contact being connected to a $\phi$ terminal. Hence, the relay pair shown in FIG. 17 functions as a three contact switch to connect the common point to $\phi$, $\chi$ or $2\theta$. For example, if relay 310 is de-energized, $2\theta$ will be connected to the common point; if relays 310 and 312 are energized $\phi$ will be connected to the common point; and, if relay 310 is energized and relay 312 is de-energized, $\chi$ will be connected to the common point.

Referring again to FIG. 5, switch set 90a of the relay matrix comprises one relay "switch" of the type shown in FIG. 17, the common point being connected to the output of OR gate 78 and the $\phi$, $\chi$, and $2\theta$ terminals being connected to the respective angle counters. Switch set 90b comprises eighteen relay "switches," the $\phi$, $\chi$ and $2\theta$ terminals of each being connected to corresponding bit stages in the $\phi$, $\chi$ and $2\theta$ counters, respectively, and the common point of each being connected as a correspoinding parallel bit input to the comparator 74 and the transfer gate 184. Switch set 90c comprises two relay "switches," the common points being respectively connected to the up and down drive pulse lines; the $\phi$, $\chi$ and $2\theta$ terminals of the up pulse switch are connected to the "clockwise" input terminals of the $\phi$, $\chi$ and $2\theta$ motor drivers, respectively, and the $\phi$, $\chi$, and $2\theta$ terminals of the down pulse switch are connected to the "counter-clockwise" input terminals of the respective motor drivers.

The operation of the axis counter and each of the relay "switches" will now be described with reference to FIGS. 16 and 17 and Table 2 below:

TABLE 2

| Counter Stage A | Counter Stage B | Bus #1 | Bus #2 | Axis |
|---|---|---|---|---|
| 0 | 0 | 0 | 0 | $2\theta$ |
| 1 | 0 | 1 | 1 | $\phi$ |
| 0 | 1 | 1 | 0 | $\chi$ |
| 1 | 1 | 0 | 1 | $2\theta$ |

The occurrence of a pulse on any one of the input terminals of OR gate 302 causes the axis counter to advance one count. Specifically, the leading edge of each input pulse triggers monostable 300, the leading edge of the square pulse output of which toggles counter stage A. The positive pulse level of the monostable is also applied as a blanking signal to inhibit the "start scan" gate during count transfer. Initially, counter stages A and B are in the reset condition; i.e., a 00 output combination from the "1" output terminals. A "0" signal level on a bus indicates the relay windings connected thereto are de-energized, and a "1" signal level on a bus indicates the connected relays are energized. The "0" level from stage A is connected directly from stage A to bus #2 and results in relay 312 being de-energized. The 00 combination applied to gate 304 does not satisfy the exclusive OR logic and results in relay 310 also being de-energized. With both relays de-energized, the common point is connected to the $2\theta$ axis.

An automatic mode cycle will now be considered. In this mode, the column thirteen signal is the first pulse applied to the counter and advances the counter to the 10 state. This satisfies the exclusive OR by saying that one is true but not both. Hence, relay 310 is energized via bus #1, and the "1" level from stage A energizes relay 312 via bus #2. Energization of both relays connects the system (common point) to the $\phi$ axis. The $\phi$ agreement signal triggers the next advance pulse at terminal 302b. In response thereto, the counter transfers to the 01 state, which still satisfies the exclusive OR circuit. Consequently, relay 310 remains energized via bus #1, and the "0" output level of stage A de-energizes relay 312 via bus #2. The system transfers from the $\phi$ to $\chi$ axis $\chi$ agreement advances the counter to a 11 combination, a state which no longer satisfies the exclusive OR. Consequently relay 310 is de-energized via bus #1, and the system transfers from the $\chi$ to $2\theta$ axis. Relay 312 is energized via bus #2, but this has little significance in view of the open circuit between the common points of relays 310 and 312. $2\theta$ slew agreement returns the counter to the 00 state and retains system connection to the $2\theta$ axis for the scanning phase of operation. Hence, the "axis counter" logic switches 3 axes in four steps, the fourth step being somewhat artificial in view of the use of the $2\theta$ axis for scan.

The output of exclusive OR gate 304 is also connected to terminal 298a of an AND gate in the "read/slew" section (FIG. 14) to enable that AND gate during $\phi$ and $\chi$ reading and slewing; it will be noted by referring to Table 2, that a "1" signal level occurs on bus #1 (the output of the exclusive OR) only for the $\phi$ and $\chi$ axis connections. Bus lines #1 and #2 of the relay matrix may also be controlled by diffractometer base controls, represented by input terminals 314, during the semi-automatic mode of operation. Output taps are connected to the $\phi$, $\chi$ and $2\theta$ terminals in the relay matrix to provide signals for lighting respective indicator lamps on the console and enabling respective AND gates in the direction memory (FIG. 6) and clocks (FIG. 10) during system connection to the corresponding axis.

Figure 18:
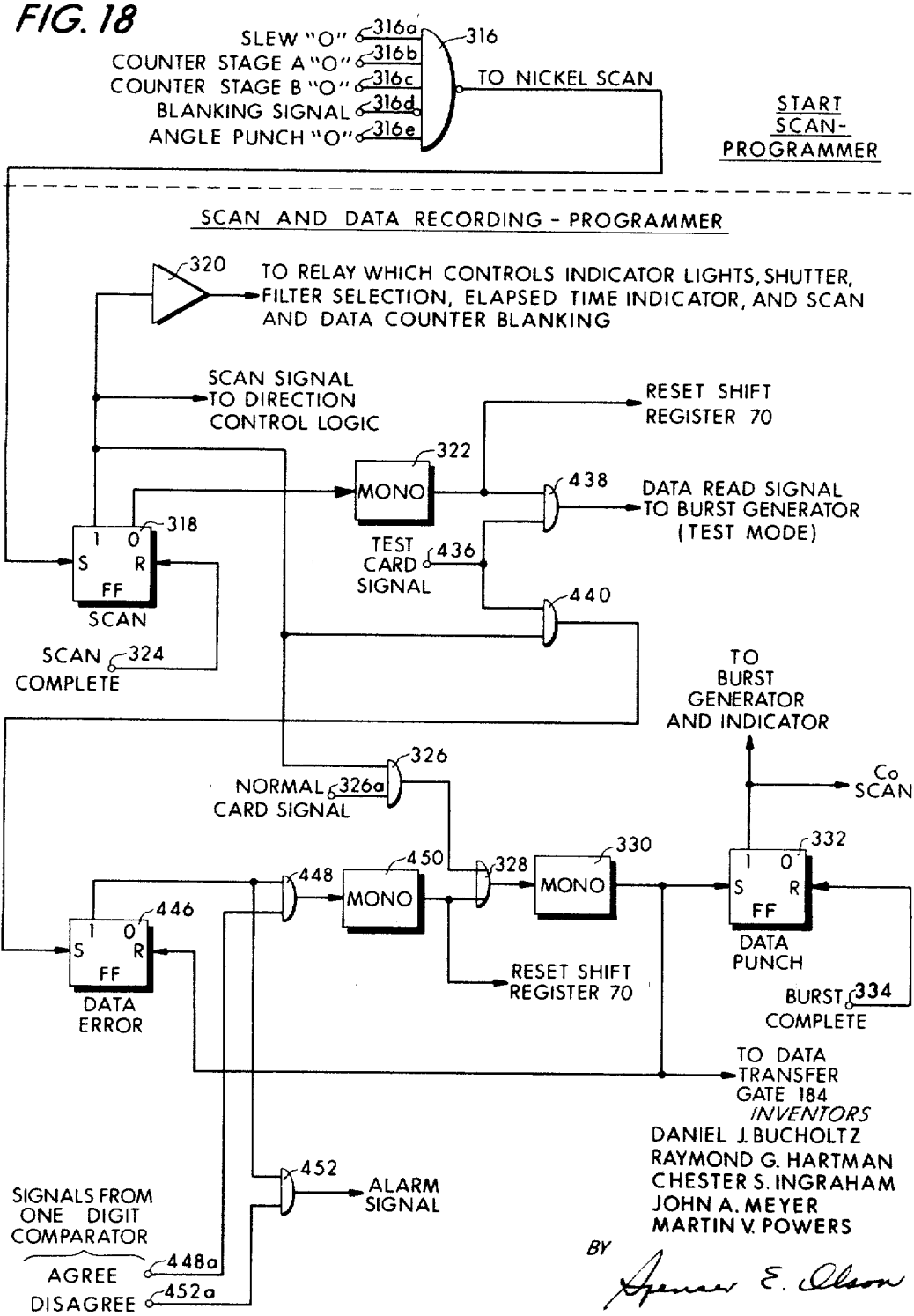
FIG. 18 is a block diagram of the "start scan" NAND gate and the "scan and data recording" section of the programmer employed in the system of FIG. 5.

FIG. 18 shows the "start scan" NAND gate 316, above the dashed line, and the "scan and data recording" circuit section of the programmer, below the dashed line. The input terminals of the NAND gate are connected as follows: terminals 316a, 316b, 316c, and 316e are respectively connected to the "0" output terminals of slew flip-flop 280, counter stage A, counter stage B, and an angle punch flip-flop in the semiautomatic mode; and, terminal 316d is connected to the blanking signal source from monostable 300 of the "axis counter" section (FIG. 16). The output of NAND gate 316 is connected to the set input terminal of the nickel scan flip-flop 318. At the conclusion of the $2\theta$ axis slew (i.e., upon receipt of an agreement signal after $2\theta$ slew), the stage A, stage B, and angle punch flip-flops are in the reset condition and the blanking signal is absent; hence the positive transition from the slew flip-flop is allowed to trigger the nickel scan flip-flop to the set condition. As previously mentioned, occurrence of the blanking signal at terminal 316d inhibits gate 316 during the count transfer operation of the "axis counter."

By setting flip-flop 318, which is normally reset, gate 316 initiates the nickel scan operation. The resulting negative output level from the "1" terminal of the nickel scan flip-flop is applied to terminal 140 of the up control logic circuit (FIG. 12) to enable an AND gate and allow the generation of up drive pulses for 2θ scan. This negative signal level from the "1" terminal is also coupled through an amplifier 320 to a relay which: (a) lights the nickel scan indicator on the console; (b) energizes the shutter control solenoid in unit 166 to open shutter 28 (FIG. 3); (c) energizes the solenoid in the filter control unit 168 (FIG. 3) which selects the nickel filter; (d) lights the nickel filter, shutter open, up and 2θ indicators on the diffractometer base control panel; (e) starts an elapsed time indicator; and (f) removes a blanking signal which normally holds the scan and data counters in the reset or off condition. The positive transition at the "0" terminal of scan flip-flop 318, when triggered to the set condition, is applied to trigger a monostable 322, the output of which is connected to reset shift register 70. The system continues to scan in the up direction with the 2θ axis until a scan complete signal from a selected scan counter tap (FIG. 9) appears at terminal 324 to reset the scan flip-flop.

Reset of the scan flip-flop results in a positive transition of the "1" terminal which reverses all the scan operations initiated by the previous negative signal level and is coupled through an AND gate 326, enabled by a normal card signal at terminal 326a, and an OR gate 328 to trigger a monostable 330. The resulting square wave output pulse from monostable 330 is applied to data transfer gate 184 (FIG. 5) to allow the contents of the data counter to be transferred to the buffer storage shift register. The positive going trailing edge of the monostable output is applied to the set input terminal of the nickel-data punch flip-flop 332 to trigger this unit to the set condition. The resulting negative transition at the "1" terminal is applied to input terminal 244c of the burst generator (FIG. 13) to initiate the generation of a burst of six drive pulses, with time interlaced shift pulses, and the negative signal level at terminal 1 is applied to light the "punch auto" console indicator and to terminal 272b of the burst generator to enable an AND gate to allow the application of the burst of six strobe drive pulses to converter 72. The positive transition of the burst complete signal from the burst generator at terminal 334 resets flip-flop 332 to stop nickel data punching. The balance of the circuitry shown in FIG. 18 is employed in the Test Mode only, which will be described hereinafter.

Upon reset of the nickel data punch flip-flop, the positive transition at the "1" output terminal triggers the cobalt scan flip-flop (analagous to 318) to the set condition. That is, the programmer includes a cobalt scan and data recording section identical to the nickel scan and data recording section shown below the dashed line in FIG. 18 with the following exceptions: (a) it is triggered by the nickel data punch rather than NAND gate 316; (b) the cobalt filter is selected instead of the nickel filter; (c) the negative output level from the "1" terminal of the cobalt scan flip-flop is applied to terminal 140 of the down control logic circuit to allow generation of down drive pulses for 2θ scan rather than up pulses; (d) the cobalt scan, cobalt filter, and down indicators are lit; (e) the output of the cobalt data punch flip-flop "1" terminal is connected to terminals 244d and 272c of the burst generator; and, (f) reset of the cobalt data punch flip-flop by the burst complete signal concludes one complete automatic mode operational cycle.

If a stationary or time scan mode of radiation detection is desired, the "time" and "no scan" switches on the console are set before operating the system. Under these conditions, the "scan and data recording" section of FIG. 18 functions as follows: Triggering of the scan flip-flop to the set condition turns on "time" and "no scan" indicator lights on the console, opens the X-ray shutter, selects the nickel filter, lights the "nickel filter" and "shutter open" indicators on the diffractometer control panel, turns on the elapsed time indicator, and removes the data counter blanking signal. The direction control logic is not enabled. Instead, the system is connected to an external timer. Shift register 70 is reset. The scan complete signal at terminal 324 is generated by the external timer. The balance of the operation (data punching) is identical to that for the nickel scan mode. The sequence is then repeated using a cobalt filter.

The operational states of the typical automatic mode cycle illustrated in Table 1 may now be listed as shown in Table 3 below (it will be noted that the number of state changing signals has been narrowed to four):

TABLE 3

| State Number | State | Signal Which Resets Bistable |
| --- | --- | --- |
| 1 | Identity Transfer | Column 13 signal. |
| 2 | Read φ Angle | Burst Complete. |
| 3 | Slew φ Axis | Agreement from Comparator. |
| 4 | Read χ Angle | Burst Complete. |
| 5 | Slew χ Axis | Agreement from Comparator. |
| 6 | Read 2θ Angle | Burst Complete. |
| 7 | Slew 2θ Axis | Agreement from Comparator. |
| 8 | Nickel Scan | Scan Complete. |
| 9 | Punch Nickel Data | Burst Complete. |
| 10 | Cobalt Scan | Scan Complete. |
| 11 | Punch Cobalt Data | Burst Complete. |

The arrangement of the motor drivers, stepper motors, and gear linkages with which the electronic system coacts to accurately move and position the φ, χ, and 2θ axes will now be described with reference to FIGS. 19, 20 and 21, respectively. It has already been mentioned that the up and down pulse train outputs of the motor control circuit 76 (FIG. 5) are selectively connected via switch section 90c of the relay matrix to the clockwise and counter-clockwise terminals, respectively, of a set of motor drivers. There is a respective motor driver and stepper motor combination for each of the three axes of motion. This combination functions to convert the control signals, which occur as pulse trains, into discrete angular motions of essentially uniform magnitude. More particularly, the motor driver is an electronic logic controller circuit coupled to the stepper motor windings and responsive to the application of up and down pulse inputs to cause rotation of the motor output shaft by a definite angle and clockwise (CW) or counter-clockwise (CCW) direction per pulse.

Stepper motors and related logic controllers are discussed in some detail in an article, "Stepper Motors," by Sidney A. Davis, Electromechanical Design magazine, "System Designer's Handbook," July 1964, pp. 109–119. In the instant embodiment of the present invention, a four-phase permanent magnet type stepper motor is employed, similar to that illustrated in FIG. 4 of the aforementioned Davis article. A four-phase logic similar to that shown in FIG. 10(a) of the article is used as the motor driver which controls the four stator windings of the motor in accordance with excitation technique A of FIG. 5 of the article. Each pulse applied to a stator winding by the logic circuit results in 90° motion of the permanent magnet rotor. The logic energizes one stator winding at a time, and the sequence in which the coils are energized determines the direction of rotation. Hence, the motor driver (logic) causes clockwise or counter-clockwise stepping of the rotor in 90° increments in response to application of pulses to the CW or CCW terminals of the motor driver. In the present system, each motor also includes a gearhead for providing a 100:1 reduction; hence each drive pulse causes the motor output shaft to rotate by 0.9°.

The size of each motor, the spring constants and inertial loads reflected back to the rotor by the system of gear linkages being driven, and the drive pulse range are carefully designed such that angular motion of the physical load will follow the servo drive pulses precisely, thereby requiring no error signal feedback. The inertial load determines the desired motor torque characteristics. Each gear linkage system is designed such that the rotor lags the axis of the magnetic field under load by a power angle of 10° at the maximum drive pulse rate. The range of drive pulse rates is selected to be less than the maximum response of the system but greater than the minimum pulsing frequency necessary to maintain the desired power angle range. Also, the inertia of the load is designed to be less than 10% of the inertia of the rotor. Consequently, the pulse driven mechanical system is capable of providing non-ambiguous open loop servo operation.

Figure 19:
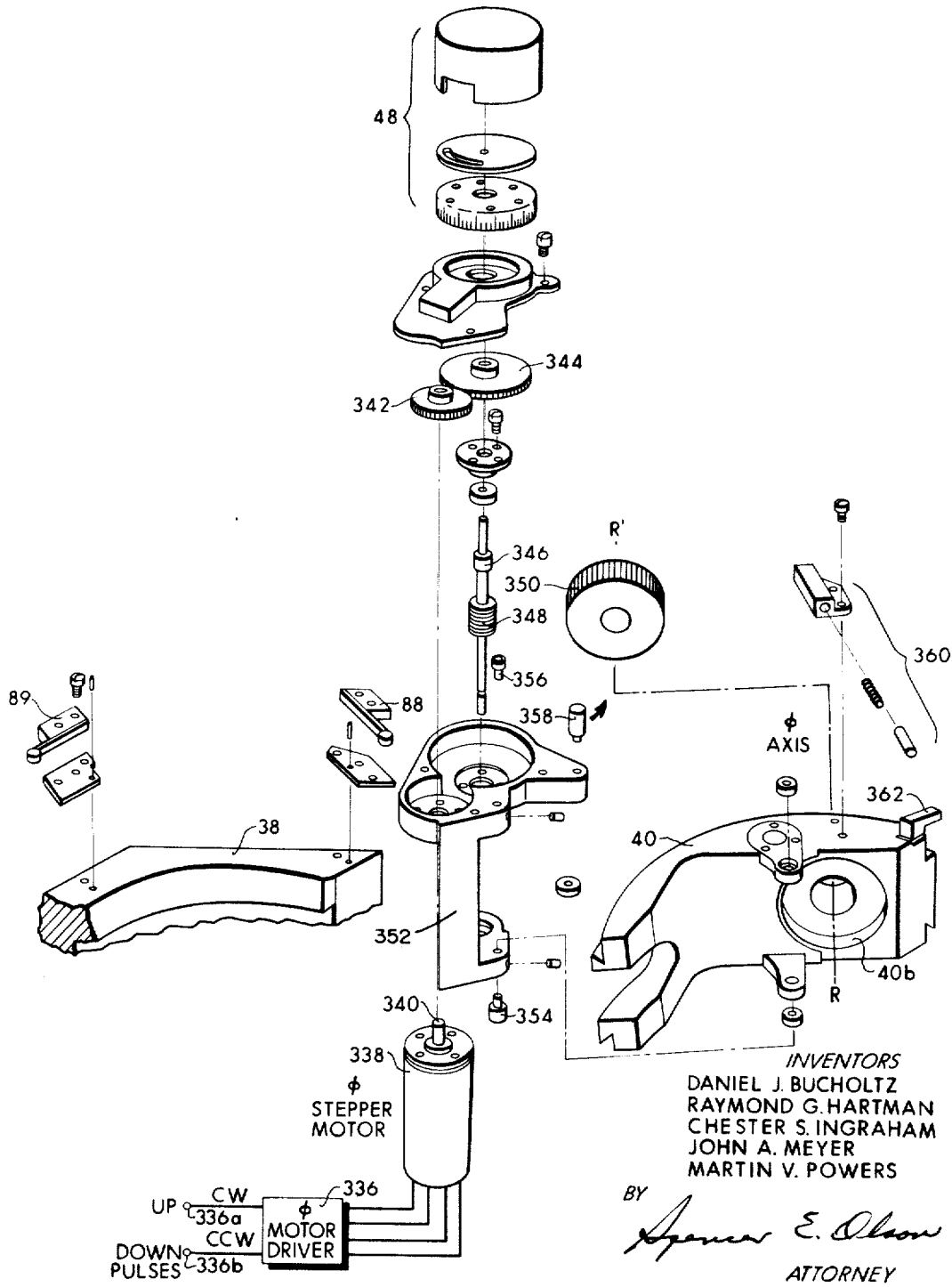
FIG. 19 is an exploded perspective view of the $\phi$-axis mechanical operating structure.

Referring to the exploded view of the $\phi$ axis mechanical operating structure shown in FIG. 19, the up $\phi$ and down $\phi$ terminals of relay matrix 90c are respectively connected to the CW and CCW terminals 336a and 336b, respectively, of the $\phi$ motor driver 336. The output lines of the $\phi$ motor driver are connected to control the sequencing of the stator windings of the $\phi$ stepper motor 338. The motor output shaft 340 drives a gear 342 which meshes with a spring loaded anti-backlash gear 344 to drive shaft 346. A worm 348 on shaft 346 meshes with the $\phi$ worm wheel 350. Gear combination 342 and 344 provides a 2:1 gear reduction, and the worm and $\phi$ worm wheel provide a 180:1 gear reduction; hence, the 0.9°/pulse increments of the motor output shaft are translated to 0.0025 degree or 9 second increments at the $\phi$ worm wheel. Consequently, each drive pulse from the motor control circuit that is switched to the $\phi$ axis mechanical system generates a 0.0025° (9″) increment of angular movement of the $\phi$ axis.

This gearing arrangement enables the $\phi$ motor and gear system to be compactly packaged in a housing 352, adapted to swivel about pivot bearing pins 354 and 356. The basal worm wheel 350 is mounted concentric with the $\phi$ axis RR′ in a suitable recess 40b in carriage 40. By pushing down on handle 358 of housing 352, in the direction of the arrow, the worm is declutched from the basal worm wheel to enable rapid manual rotation of the $\phi$ axis (goniometer head) when desired.

The declutching design on the manual goniometer comprised mounting the worm shaft in cantilever fashion whereby it was pivoted at one end to enable disengagement of the worm from the basal worm wheel. Such an arrangement, if applied to the present stepper motor driven goniometer, would require declutching of the split-gear 344, which would be quite unsatisfactory. Consequently, the declutching scheme of the present invention comprises swiveling the entire motor and gear drive assembly (housing 352) about an axis separate from and parallel to the drive shaft axes. The swivel housing 352 is spring loaded by a spring and pin assembly 360 to normally keep the worm and basal worm wheel engaged in event of operation of the step motor. An additional and very significant advantage of the present declutching design is that it provides improved mechanical support at the digital pulsing rates, whereas the cantilever structure might well become resonant under such drive pulsing.

A micrometer assembly 48 is attached to the end of worm shaft 346, in lieu of the crank and dial of the manual goniometer, thereby providing a mechanical indicator to supplement the scaler display, which responds only to operation of the electronic system.

As previously described, movable carriage 40 essentially is the $\chi$ worm wheel (actually the periphery of the carriage is a segment of a 360 tooth worm wheel). Carriage 40 is slidably mounted in the vertically curved dovetail structure 38, to which is attached the up and down command microswitches 88 and 89, respectively. An actuating cam 362 is attached to the carriage 40 for tripping limit switches 88 and 89.

Figure 20:
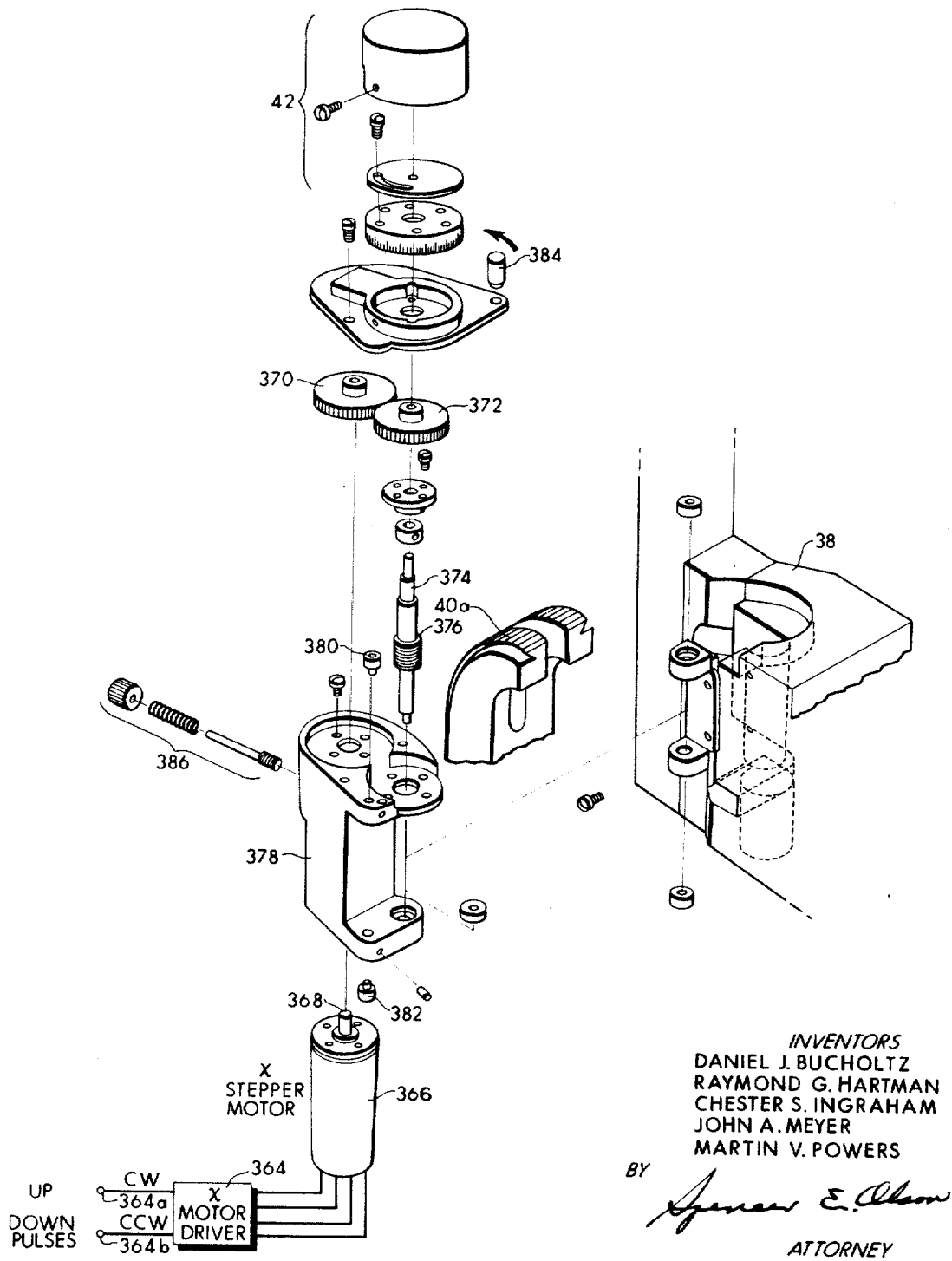
FIG. 20 is an exploded perspective view of the $\chi$-axis mechanical operating structure.

The $\chi$ axis mechanical operating structure is attached to structure 38 as shown in the exploded view of FIG. 20. The up $\chi$ and down $\chi$ terminals of relay matrix 90c are respectively connected to the CW and CCW terminals of the $\chi$ motor driver 364, represented by terminals 364a and 364b, respectively. The driver 364 controls the $\chi$ stepper motor 366, the output shaft 368 of which drives a gear 370 which meshes with a spring loaded anti-backlash gear 372 to drive a shaft 374. A worm 376 on shaft 374 meshes with the teeth 40a of the carriage worm wheel segment. Gear combinations 370 and 372 provides a 1:1 gear reduction, and the worm and $\chi$ carriage worm wheel segment provide a 360:1 gear reduction. Again, therefore, the drive pulse actuated 0.9° increments of the motor output shaft are translated to 0.0025° increments of angular movement of the $\chi$ axis.

It will be noted that the $\chi$ drive system employs the same compact gearing arrangement (other than for ratios) as that described for the $\phi$ motor and gear system. Also in similar manner to the $\phi$ axis, the $\chi$ gearing arrangement is adapted to be swiveled about pivot bearing pins 380 and 382, for declutching purposes, by pushing handle 384 in the direction of the arrow. Swivel housing 378 is also spring loaded by a pin and spring assembly 386. The aforementioned $\chi$ declutching design includes the above-mentioned improvements over the cantilever worm shaft approach of the manual goniometer. Micrometer assembly 42 replaces the crank and dial of the manual equipment.

Figure 21:
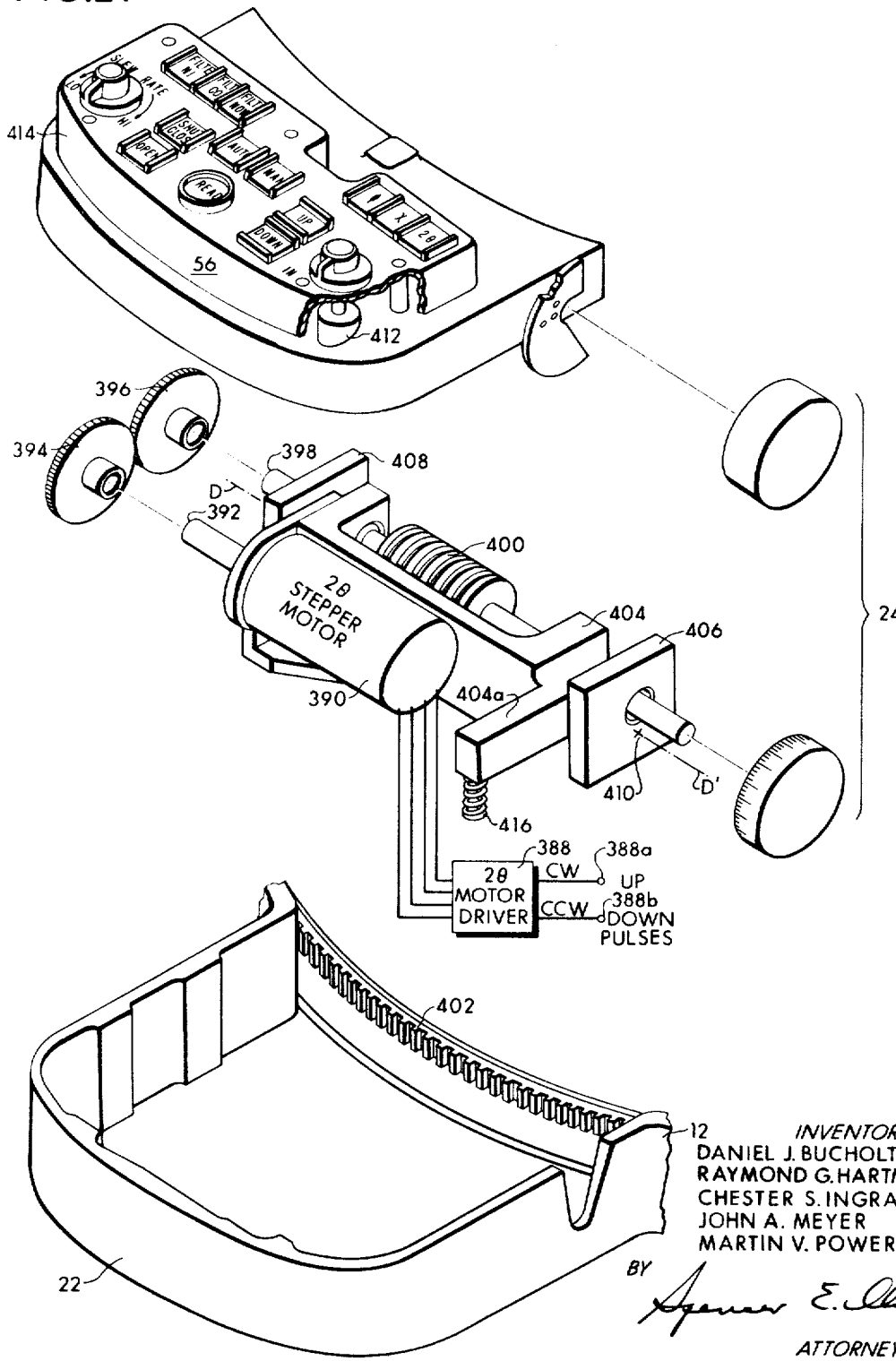
FIG. 21 is an exploded perspective view of the $2\theta$-axis mechanical operating structure.

The $2\theta$ axis mechanical operating structure is enclosed in control box 22 and base 12 as shown in the exploded view of FIG. 21. The up $2\theta$ and down $2\theta$ terminals of relay matrix 90c are respectively connected to the CW and CCW terminals of the $2\theta$ motor driver 388, represented by terminals 388a and 388b, respectively. The motor driver 388 controls the $2\theta$ stepper motor 390, the output shaft 392 of which drives gear 394 which meshes with a spring loaded anti-backlash gear 396 to drive a shaft 398. A worm 400 on shaft 398 meshes with the $2\theta$ horizontal worm wheel 402. Gear combination 394 and 396 provides a 1:1 gear reduction, and the worm and horizontal worm wheel provide a 360:1 gear reduction. Consequently, as with the other gear drives, each drive pulse is translated to a 0.0025° increment of angular movement of the $2\theta$ axis (horizontal worm wheel 402).

The compact $2\theta$ motor and gear system is mounted in a support structure 404 which is swivel mounted to brackets 406 and 408 at pivot points 410 and 411 (only pivot point 410 is indicated in FIG. 21). Rotation of a declutching cam 412 mounted on the diffractometer control panel 414 forces downward motion of cam follower 404a (an integral extension of support structure 404), thereby rotating the support structure about axis DD′ and declutching the worm from the horizontal worm wheel. The cam follower 404a is spring loaded, as in the case of $\phi$ and $\chi$ declutching, by a pin and spring assembly 416. The described $2\theta$ declutching design, therefore, also includes the previously mentioned advantages over the cantilevered worm shaft approach of the manual goniometer. Micrometer assembly 24 replaces the crank and dial of the manual $2\theta$ drive.

Figure 22:
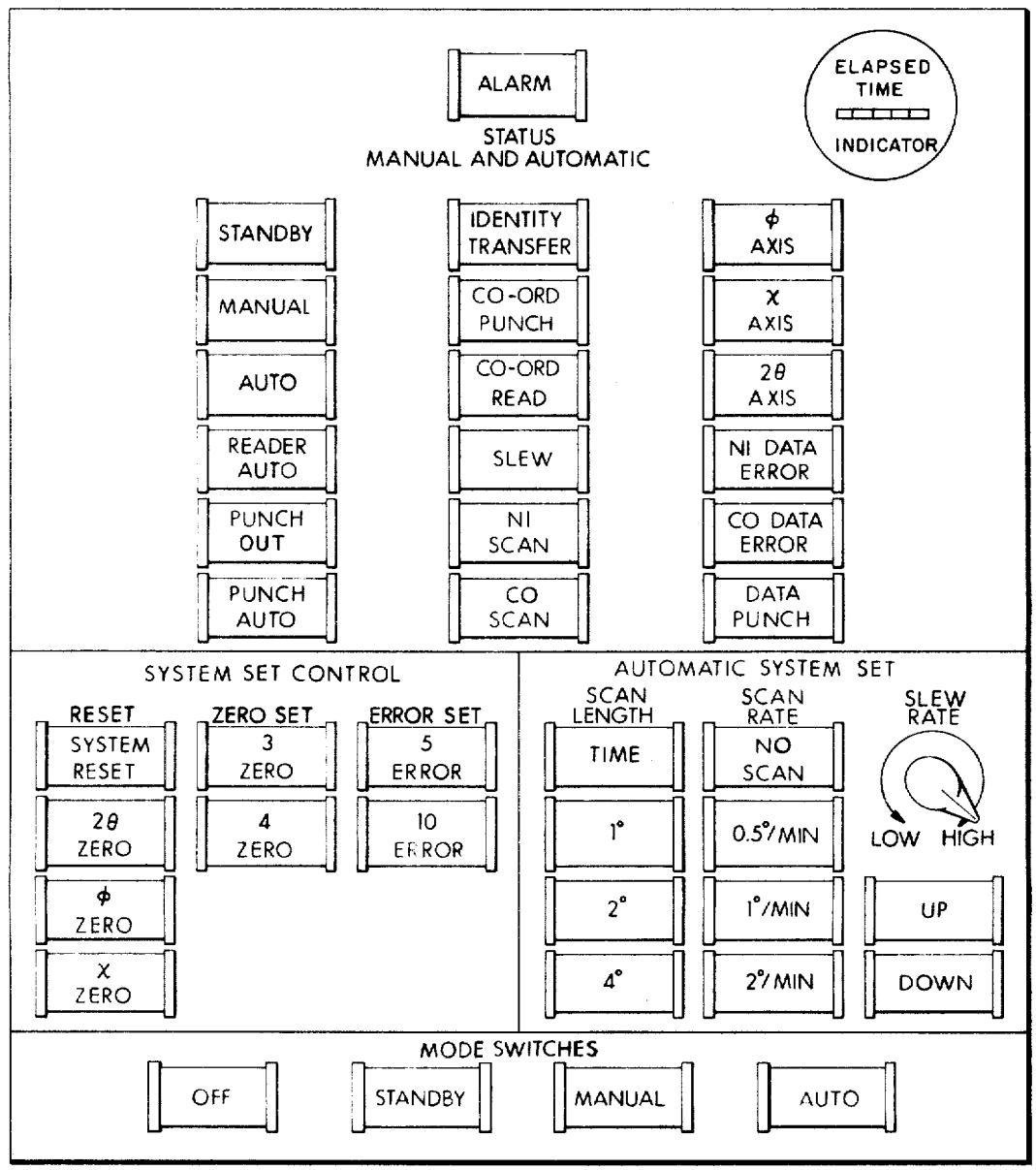
FIG. 22 is a pictorial illustration of the console control panel of the system of FIG. 5.

Summarizing, the push-button switch-indicators and other controls of the unit previously referred to as diffractometer base controls 56 are shown in FIG. 21 as they are arranged on the top panel 414 of the control box 22. Also for summary purposes, the arrangement of the push-button switches, indicators and other controls previously referred to as console controls 60 is shown in FIG. 22. Across the bottom of the console control panel are located four mode control switches for respectively shutting off system power, energizing the system to the "standby" mode, selecting the semi-automatic mode of operation (labeled "manual" on the control panel), or selecting the automatic mode of operation. Above the mode switches and to the left side of the console are the system set controls. The top switch of the left-hand column resets the programmer and therefore can be used to immediately stop any reading, punching, slewing or scanning operation. The other three switches of this column reset the three forward-backward counters used to store the angular position of each axis. These switches can be used to define the zero coordinates of the $\phi$, $\chi$, and $2\theta$ axes by physically moving the axis to the desired zero, then depressing the appropriate axis zero button. The four switches labeled "zero set" and "error set" are used in one of the test modes and will be discussed hereinafter.

On the right side of the control panel shown in FIG. 22 are the automatic system set controls. The "Scan Length" column of switches have already been discussed with reference to the stationary time scan mode and the operation of the scan counter shown in FIG. 9. The "Scan Rate" switches have been discussed with reference to multiple frequency source shown in FIG. 11; it will be noted that the actual scan rates of 0.56°/min., 1.12°/min. and 2.25°/min. have been simplified for labeling purposes to 0.5°/min., 1°/min., and 2°/min. The "Slew Rate" knob is the speed control potentiometer 188 (FIG. 10) of the automatic mode clock. The "up" and "down" switches are the console override switches 100 and 98, respectively, discussed with reference to the direction memory shown in FIG. 6; these switches also serve as indicators of the direction of motor travel of any axis.

The "Status" display indicators on the top central portion of the console panel are intended to give the operator information as to the operation being performed at any given time. The "Standby," "Manual," and "Automatic" indicators operate with the matching mode switches. The "Punch Out" lamp is lit only in the automatic mode. The "Alarm," "Ni Data Error," "Co Data Error" and "Data Punch" indicators are used in the test mode, to be discussed later. The balance of the status indicators have been discussed hereinabove with reference to operation of the programmer. The elapsed time indicator is located at the very top of the console panel.

For the particular embodiment of the invention being described, all cards used as inputs to or outputs from the system have the same format:

| Column(s) | Field |
|---|---|
| 1–12 | Identity Data. |
| 13 | Test/Normal Column. |
| 14–19 | $\phi$ Angle. |
| 20–25 | $\chi$ Angle. |
| 26–31 | $2\theta$ Angle. |
| 32–37 | Ni Data. |
| 38–43 | Co Data. |

All columns 1–43 of the output card have a numerical position punched in them. The identity field may contain alphanumeric information or any collection of multiple punches. A normal card is signified by a "zero" in column 13 while a test card has a "one" in column 13. Since the system reads in six digit groups (other than for identity transfer), an angle of 34.26° would be punched 003426. The portion of the standard digital program card which includes columns 44–80 may be used for any purpose or left blank.

*Automatic mode operation*

In setting up the automatic mode of operation, referring to FIG. 5, the operator loads a stack of cards containing instructions into reader 54 and a stack of blank cards into the output punch 58. By means of axis pushbuttons (input 314 of FIG. 16) and the slew rate knob and up or down pushbuttons (semi-auto inputs, FIG. 12) of the diffractometer base controls 56 (FIG. 21), the operator semi-automatically moves each of the three axes to the desired zero positions (not necessarily mechanical zero on the scales). The $2\theta$ axis is selected last to assure that relays 310 and 312 (FIG. 17) of matrix 90 are de-energized for the start of the operation. The operator then depresses the $2\theta$, $\phi$ and $\chi$ "zero" buttons of the console controls (FIG. 22) to reset the corresponding axes counters to zero. Next the desired scan length (or "time"), scan rate (or "no scan"), and slew rate are selected from the console automatic system set controls. The operator may also wish to select a "zero set" and "error set" test mode buttons.

The machine having been in the "standby" mode, the operator now sets it in the automatic mode by console pushbutton and releases a card from the first stack of cards on the output punch machine. The arrival of a card under the punch head triggers the automatic sequence by tripping a microswitch in the punch machine which causes a "card presence" signal to be generated to set the identity transfer flip-flop of the programmer (FIG. 14). This signal results in activation of the burst generator (FIG. 13) to apply drive pulses to the space interposer of reader 54. In response, the first instruction card is automatically advanced column by column in the reader to transfer information from the identity field on the input card to corresponding positions on the output card, via gate 66 and output punch 58. The automatic reading and punching operation starts in column 1 of both the input and output cards. Hence, both cards are locked together columnwise and, by driving the reader space interposer, the information contained on the input card is duplicated on the output card, the two cards being moved in synchronism across the field.

The identity field contains information such as Miller indices, etc. which is not pertinent to the operation of the digital system. Hence, transfer of this field of data affect no other operation of the system; it merely involves duplication of data from the instruction card to the output card. When the cards are advanced to column 13 (in this particular example), a signal from the reader resets the identity transfer flip-flop and advances the axis counter (FIG. 16) to switch the relay matrix to the $\theta$ axis (FIG. 17). A "zero" in column 13 will result in a normal card signal to gate 326 of the scan and data recording section of the programmer (FIG. 18) and a "one" in column 13 will result in a test card signal, which will be defined later.

Upon termination of identity transfer (reset of flip-flop 276, FIG. 14), the programmer shuts off the space interposer drive pulse source, resets the buffer storage shift register 70 to clear it for angle reading, and sets the angle read flip-flop (FIG. 14). In response, an angle read signal is applied to the burst generator (FIG. 13) to trigger generation of a burst of six pulses to drive the reader 54 and five sets of time interspersed shift pulses for application to shift register 70. This action reads the $\phi$ angle from columns 14–19 of the instruction card into the buffer storage and simultaneously punches out the $\phi$ angle onto columns 14–19 of the output card. The burst complete signal then resets the angle read flip-flop (FIG. 14). The contents of the buffer storage are compared with the contents of the $\phi$ counter; if the contents are identical, an agreement signal triggers the programmer to skip to the $\chi$ axis read and slew sequence. If the contents are not alike, up drive pulses are allowed to be generated from the motor control circuit 76 for stepping the $\phi$ motor driver and the $\phi$ counter in the up direction. The up direction is selected on this first automatic cycle since all the direction memory flip-flops are initially reset and the axis and counters are at zero.

For subsequent cycles, of course, the direction of axis movement could be up or down depending upon the state of the $\phi$ flip-flop in the direction memory (FIG. 6) or the comparison signal from a directional comparator (FIG. 8), if such is employed. The up pulses drive the $\phi$ mechanical system (FIG. 19) to rotate the goniometer head (and therefore the crystal specimen) attached to the top of the basal worm wheel 350 in increments of 0.0025°/pulse, starting at zero, at a rate preset by the console "slew rate" knob.

Comparator 74 (FIG. 7 or FIG. 8) continually monitors the contents of the buffer storage and φ counter, and when the count agrees with the number stored in shift register 70, an agreement signal is generated. The φ agreement signal resets the slew flip-flop to stop the drive pulses, advance the axis counter to the χ axis relay matrix connections, and set the angle read flip-flop to initiate reading of the χ angle. Occurrence of the agreement signal actually stops crystal rotation at the angle on the instruction card to a precision of 0.01°, with no percentage of error.

χ axis read and slew operation then proceeds in a similar manner to that described for the φ axis. Triggering of the burst generator results in the χ angle being read from columns 20–25 of the instruction card into the buffer storage and simultaneously being punched out onto columns 20–25 of the output card. The contents of the shift register and χ counter are compared, and, if not alike, up drive pulses are allowed to step the χ motor driver and χ counter in the up direction. As previously mentioned, the direction of axis movement on subsequent cycles will depend upon that stored in the direction memory χ flip-flop (or a directional comparator signal). The up pulses drive the χ mechanical system (FIG. 20) to incline the crystal specimen attached to the movable carriage 40 (a worm wheel segment) in increments of 0.0025°/pulse, starting at zero, at the preset slew rate. The χ axis agreement signal precisely stops the crystal at the desired inclination angle, advances the axis counter to the 2θ axis, and initiates 2θ axis read and slew.

The 2θ operation proceeds in a manner similar to that described for the φ and χ axis. The burst drive reads the 2θ angle from columns 26–31 of the instruction card into the buffer storage and simultaneously punches out the 2θ angle onto columns 26–31 of the output card. The 2θ counter is compared with the shift register content, and if in disagreement, up drive pulses are connected to the 2θ motor driver and the 2θ counter, the direction of subsequent cycles being dependent upon a memory unit or directional counter. In response to these drive pulses, the 2θ mechanical system (FIG. 21) rotates the horizontal worm wheel 402, and hence scale 14 (FIG. 3) in increments of 0.0025°/pulse, starting at zero, at one-half the slew rate used for φ and χ motion. Rotation of scale 14 simultaneously, via bisecting means, causes rotation of table 32 (FIG. 3), and hence the crystal specimen, in increments of 0.00125°/pulse. The 2θ agreement signal precisely stops scale 14 at the desired 2θ angle, inhibits initiation of another programmer read/slew cycle, advances the axis counter to the 00 state, thereby retaining system connection to the 2θ axis for the scanning phase of operation, and triggers the nickel scan flip-flop (FIG. 18) to the set condition, via the programmer "start scan" NAND gate. If a normal card is in reader 54 it contains no further information and skips out of the machine upon termination of 2θ slewing. Test card operation will be discussed later.

Triggering of the nickel scan flip-flop to the set condition initiates the specimen irradiation and intensity data accumulation phase of the automatic cycle, according to the mode of radiation detection set up on the console controls. If 2θ scan lengths and rates have been preselected, and assuming a normal card, the nickel scan flip-flop, upon being set, opens the X-ray shutter, selects the nickel filter, starts the elapsed time indicator, enables the scan and data counters to operate, resets the shift register to clear it for storage of nickel filtered intensity data, and enables the up control logic circuit (FIG. 12) to generate up drive pulses from motor control circuit 76. Since the system is connected to the 2θ axis, this pulse train is connected to the 2θ motor driver, the 2θ counter and the scan counter. Consequently, the counter detector 180 starts moving along an arcuate path in 2θ increments and the crystal simultaneously rotates in θ increments. Also, with the X-ray shutter open, the counter detector starts to measure the intensity of the reflected radiation by generating output pulses at a rate which is a function of the intensity. A count of these intensity data pulses is accumulated by applying them to data counter 172, via scaler 182. Simultaneously, the scan counter (FIG. 9) accumulates a count of the drive pulses (divided-by-four) representing the increments of movement of the 2θ axis. When 100, 200, or 400 scan steps have been counted, the scan counter generates a scan complete signal indicating conclusion of a 1°, 2°, or 4° arc of 2θ movement respectively, during which the intensity of the reflected radiation was detected via a nickel filter.

The nickel scan complete signal resets the nickel scan flip-flop (FIG. 18) to close the X-ray shutter, clear the filter aperture, stop the elapsed time indicator, disable the scan and data counters, stop generation of up drive pulses, and trigger monostable 330 to enable transfer gate 184 to transfer the number in the data counter to the buffer storage shift register. After this transfer of intensity data to the buffer, monostable 330 sets the nickel-data punch flip-flop to initiate the nickel data recording or punching phase of operation. In response, a nickel data punching signal is applied to the burst generator (FIG. 13) to trigger generation of a burst of six pulses, with time interlaced shift pulses, to strobe BCD-decimal converter 72 and thereby sequentially sample and shift the digits of the intensity data number from the buffer to the output punch 58. This action punches out the measured and stored nickel data number onto columns 32–37 of the output card. The burst complete signal resets the nickel-data punch flip-flop to end nickel data punching and initiate cobalt scan.

Upon being reset, the nickel-data punch flip-flop triggers the cobalt scan flip-flop to the set condition. The resulting programmer signal opens the X-ray shutter, selects the cobalt filter, starts the elapsed time indicator, enables the scan and data counters to operate, resets the shift register to clear it for storage of cobalt filtered intensity data, and enables the down control logic circuit (similar to FIG. 12) to generate down drive pulses from the motor control circuit. The relay matrix remains unchanged; hence, this pulse train is connected as before to the 2θ motor driver, the 2θ counter, and the scan counter. The scan and intensity data count is accumulated in counters 170 and 172, respectively, until generation of a scan complete signal indicating conclusion of the 1°, 2° or 4° arc of 2θ movement. The cobalt scan cycle, therefore, has returned the 2θ axis and 2θ counter 84 to the same angular position at which they were located at the beginning of the nickel-cobalt scan cycle, while detecting the intensity of reflected radiation via a cobalt filter.

The cobalt scan complete signal resets the cobalt scan flip-flop to close the X-ray shutter, clear the filter aperture, stop the elapsed time indicator, disable the scan and data counters, stop generation of down drive pulses, and trigger a monostable to engage transfer gate 184 to transfer the number in the data counter to the buffer storage shift register. The monostable then sets the cobalt-data punch flip-flop to initiate the cobalt data recording phase of operation. In response, a cobalt data punching signal is applied to the burst generator to trigger the generation of a burst of six strobe drive pulses for converter 72, along with time interlaced shift pulses. This action results in the stored cobalt data number being punched out onto columns 38–43 of the output card. The burst complete signal resets the cobalt data punch flip-flop to end cobalt data punching and conclude one complete operational cycle of the automatic mode.

After punching column 43 of the output card, the output punch machine automaticaly generates a skip command (by means well known in such machines) which skips the first output card out of the machine and releases a new card. Arrival of the new card under the punch head automatically starts the next operational cycle by initiating transfer of identity information from the second instruction card. The automatic mode operational cycles automatically continue until depletion of the stack of instruction cards loaded in the reader 54.

If the "time" and "no scan" switches on the console have been pre-selected instead of 2θ scan, the scan flip-flop of FIG. 18, upon being triggered to the set condition by the 2θ slew agreement signal, opens the X-ray shutter, selects the nickel filter, starts the elapsed time indicator, enables the data counter to operate, resets the shift register to clear it for storage of stationary mode intensity data, and connects the system to an external timer, in lieu of the direction control logic and scan counter. Consequently, the data counter accumulates data by strictly a time scan, with the 2θ axis, counter detector 180 and crystal held stationary, and the duration of the open shutter condition controlled by the external timer. The system continues to accumulate the intensity data count until a scan complete signal is generated by the external timer.

The stationary mode scan complete signal resets the scan flip-flop (FIG. 18) to close the X-ray shutter, stop the elapsed time indicator, disable the data counter, and trigger a monostable to enable transfer gate 184 to transfer the number in the data counter to the buffer storage shift register. The monostable then sets the data punch flip-flop to initiate the stationary or time scan data recording phase of operation. In response, data punching signals are applied to terminals 244c and 272b of the burst generator (FIG. 13) to trigger the generation of a burst of six strobe drive pulses for converter 72, along with time interlaced shift pulses. This action results in the stored nickel time scan data number being punched out onto columns 32–37 of the output card. The burst complete signal resets the data punch flip-flop to end nickel time scan data punching and initiate cobalt time scan. The time scan and punch operation is then repeated with the cobalt filter in place.

The output card of this system provides a permanent record of the intensity data accurately correlated with the diffraction angle 2θ and crystal position angles φ and χ for a given reciprocal lattice point of the crystal specimen. The stack of cards loaded into the reader 54 comprises a predetermined set of reciprocal lattice point coordinates for which intensity measurements are desired. Hence, the automatic mode system is operative in response to the set of input instruction cards to control an X-ray diffractometer to accurately position a crystal in three planes, take intensity data for a given reciprocal lattice point of the crystal, and move on for each of successive sets of given lattice point position settings (2θ, φ and χ), thereby providing a systematic collection of accurate crystallographic data with a minimum of time and effort. The system further provides automatic control of the irradiation of the crystal and monochromitization of the reflection therefrom by successive selection of each of a pair of balanced filters. The system does not require a complex computer for operation, but produces permanent, positively correlated, accurate records of angle and intensity data, for each reflection obtained from a specimen crystal, in the form of a standard key-punched card compatible for direct input to a computer for further processing.

*Semi-automatic mode*

To provide flexible operational capability, the present digital system also includes a semi-automatic mode of operation to enable an operator to search for reciprocal lattice points with a minimum of time and effort. Such a capability is required for the recording of initial readings during unit cell parameter determination. In this mode, the three axes can be moved independently at will by use of the diffractometer base controls. In the semi-automatic mode, the input reader 54 is not used (it is free to be used for any other purpose) and, in lieu thereof, the base controls 56 are employed for "feeding" push-button instructions into the system.

In setting up the semi-automatic mode of operation, the operator depresses the "manual" push button on the console to switch the system from the "standby" mode to the semi-automatic mode. The operator then loads a stack of blank cards into the output punch 58 and feeds the first card under the punch head. Next, by use of the punch machine keyboard, the operator manually punches the desired information into the identity field (columns 1–13) of the card, and sets up the machine (by standard methods) to automatically copy the identity field from one card to the next. The desired axes zero positions are set and the axes counters are zeroed as described for the automatic mode. Also the desired scan length (or "time"), scan rate (or "no scan"), and slew rate are selected from the console automatic system set controls. The "zero set" or "error set" test mode buttons are not used in the semi-automatic mode of operation.

Referring again to FIG. 21, the diffractometer base controls 56, arranged on top of panel 414, will now be described in further detail. The "Filter Ni" and "Filter Co" selectors are maintained contact switches. Depressing a filter selector will light the selector button lamp and energize a solenoid in filter control unit 168 (FIG. 3) to select the corresponding filter. Depressing the selector button again will de-energize the solenoid and turn-off the indicator lamp. "Filter None" is an indicator only. The "Shutter Open" switch-indicator is depressed to open the shutter and depressed again to close the shutter. "Shutter Closed" is an indicator only. The slew rate knob is speed control potentiometer 188 (FIG. 10) of the semi-automatic mode clock. This potentiometer also has a switch position at the "Low" speed end to provide a special low slew rate of 3.75 c.p.s. from the line derived frequency source shown in FIG. 11. "AUTO" and "MAN" are mode indicators.

The buttons marked "φ" and "χ" are maintained contact switches, while the button marked "2θ" is an indicator only. The "φ" and "χ" buttons are relay matrix control switches connected to input terminals 314 of bus lines #1 and #2 of the matrix (FIG. 16) to allow manual control of axis selection. Depressing the "φ" button-indicator connects a "1" signal level to both bus lines, thereby connecting the system to the φ axis (Table 2). Depressing this button again removes the connection. In like manner, the "χ" button is used to connect a "1" to bus #1, thereby selecting the χ axis for movement. If the "φ" and "χ" buttons are both "off," a "0" is applied to both bus lines to select the 2θ axis. The "Up" and "Down" switches are connected to terminals 238 of the up and down control logic circuits (FIG. 12); these switches are momentary contact pushbuttons and cause up or down drive pulses to be generated only for the period a button is manually held in the depressed condition. The "Read" pushbutton, when depressed, starts an angle and data recording cycle in the semi-automatic mode. This switch-indicator is normally lit; upon being depressed it is extinguished, thereby indicating internal control of the diffractometer. At the end of a semi-automatic mode operational cycle, the "Read" button is again lit to indicate a new cycle is ready to start.

Base controls 56 enable the operator to have complete "finger-tip" control over axis slewing and crystal irradiation and mode of detection in search of reflections indicative of the desired reciprocal lattice points. To start the search for reflections, the operator opens the shutter and selects either filter or no filter at all, by means of the pushbuttons. If it is desired to slew the φ axis in the up direction, the operator presses the "φ" button and then presses and holds the "up" button to move the selected axis, using the slew rate knob as a "throttle" for controlling the speed of the axis. To achieve highly accurate positioning without having to "stab" at the up or down button, the operator uses the very slow slew rate (3.75 c.p.s.). When the desired axis position is reached, the operator releases his hold on the up button. The operator may then go on in like manner to position the $\chi$ and $2\theta$ axes. The $2\theta$ axis should always be selected last to assure proper operation in the subsequent phase. If the axes gear systems are not declutched in the slewing process, the axes counters will continually monitor the position of the axes.

When a desired reflection is reached, as determined from the number displayed by scaler 182, the operator depresses the "Read" button. The operation from that point to the end of the cycle is completely automatic. The three axes are punched in the output card in the usual format; specimen irradiation and data accumulation according to the mode of radiation detection pre-selected on the console occurs; and, intensity data is punched out on the card as in the automatic mode. Once the data has been punched on the card, it skips out, and a new card is inserted ready for a new cycle.

Figure 23:
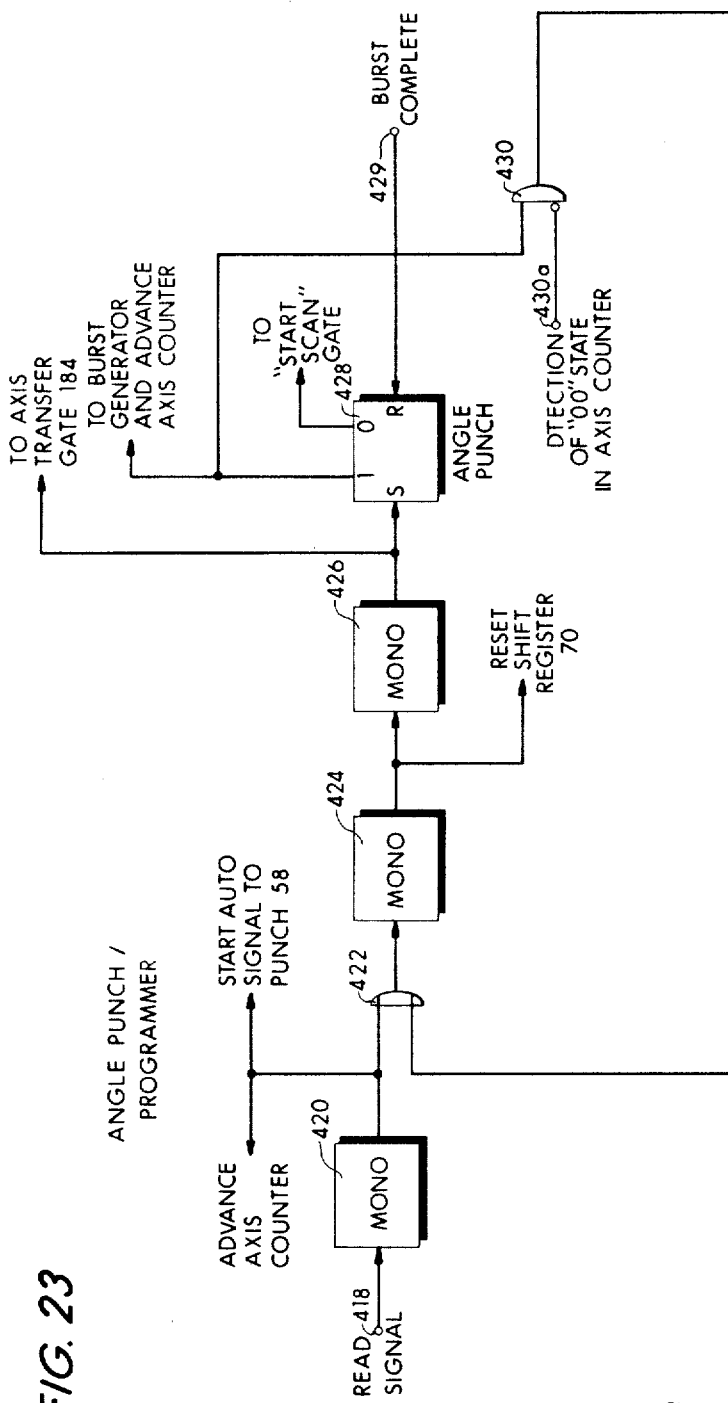
FIG. 23 is a block diagram of the semi-automatic mode "angle punch" section of the programmer employed in the system of FIG. 5.

The "angle punch" section of the programmer 62, which is triggered by the "Read" switch on the base controls, is shown in FIG. 23. The positive transition occurring when the "Read" pushbutton is depressed is applied to input terminal 418 to trigger a monostable 420. The leading edge of the resulting output pulse from the monostable is applied to input terminal 302c (FIG. 16) to advance the axis counter to connect the system to the $\phi$ axis, and to signal the output punch 58 to its automatic mode. The trailing edge of this output pulse is applied via OR gate 422 to trigger a monostable 424 to reset shift register 70. The trailing edge of the output pulse from monostable 424 triggers a monostable 426, the output of which enables gate 184 (FIG. 5) to transfer the number in the $\phi$ counter to the buffer storage.

The trailing edge of the output pulse from monostable 426 triggers angle punch flip-flop 428 to the set condition. The resulting negative transition at the "1" terminal of this flip-flop is applied to input terminal 244b of the burst generator (FIG. 13) to initiate a burst of six drive pulses, along with time interlaced shift pulses, and to input 302d of the axis counter (FIG. 16) to advance system connections to the $\chi$ axis. The negative signal level at terminal "1" is applied to terminal 272a of the burst generator to enable an AND gate to allow the application of the burst of six strobe drive pulses to converter 72. The $\phi$ angle is punched out on the card in punch 58, and the burst complete signal at terminal 429 resets the angle punch flip-flop. The resulting positive transition at the "1" terminal of flip-flop 428 is applied via AND gate 430 and OR gate 422 to again trigger monostable 424. The operation continues for successive transfer and punch out of the $\chi$ and $2\theta$ angles.

The advance signal to the axis counter after $2\theta$ axis transfer, however, places the axis counter in the 00 state. An AND gate recognizes this state and applies an inhibit signal to input terminal 430a of AND gate 430 to prevent further advance of the axis counter. The resulting output signals from the axis counter satisfy the start scan NAND gate (FIG. 18) so that the positive transition at the "0" terminal of the angle punch flip-flop, upon reset, triggers the nickel scan flip-flop; the "0" terminal being connected to input terminal 316e of NAND gate 316. The subsequent scan and data recording sequence of FIG. 18 is identical to that for the automatic mode with normal input card.

The described semi-automatic mode of operation, therefore, provides the operator with the flexibility of being able to conveniently and accurately control crystal positioning in three planes, along with the time and effort saving feature of automatic data taking and recording.

*Test modes*

The system also includes two self-test modes for detecting either movement of the crystal specimen or positioning error. These test modes are operable only in the automatic mode and, upon detection of the preselected error condition, generate a signal to shut down the system and light the console alarm indicator.

The first error detection test, called the excess zero mode, assumes that the intensity of the reflections will drop off sharply should error or crystal movement occur. This assumption, coupled with the constant six digit word length for output intensity data, means that occurrence of error or movement would cause the number of zeroes in any output data to increase. Hence, in the excess zero test mode, each set of data is examined for the number of zeroes it contains. If more than a selected number of the six digits are zero, the system counts that set as a bad set. When a consecutive number of bad sets occur, the alarm lamp lights and the system ceases to operate. This scheme of detecting a consecutive number of bad sets prevents an accidental even number from falsely triggering the alarm. The excess zero mode has been found to be particularly useful in the analysis of protein specimens.

Referring again to FIG. 5 and the system set controls in FIG. 22, the excess zero mode circuit comprises a counter 432, connected for counting the number of pulses on the zero line between converter 72 and output punch 58 during each burst of six strobe pulses, and a counter 434, connected for counting the number of consecutive bad sets detected by zero counter 432. The console "zero set" switches select whether a count of three or four zeroes in the data field shall constitute a minimum for generation of an "error" output signal from zero counter 432. The console "error set" switches select whether a count of five or ten consecutive "errors" shall be the criterion for generation of an alarm signal from error counter 434. The excess zero mode may be defeated by selecting neither the "5 error" nor the "10 error" switches.

In operation, assuming the console is set for nickel and cobalt data punching and three zeroes and five errors, consider that the burst of six strobe drive pulses for nickel data punching generates three or more pulses on the zero output line from the BCD-decimal counter 72. Upon counting to three, zero counter 432 triggers error counter 434 to indicate one bad reading has occurred. The burst complete signal resets the counter 432 to zero. Then, during punching of cobalt data, if three or more pulses again occur on the zero output line of counter 72, the error counter will count to two. If excess zero errors are detected for the next nickel-cobalt punching cycle and the subsequent nickel punching operation, the error counter will have counted to five. In response to a count of five the error counter generates a signal to light the console "alarm" and "data punch" indicators. This signal is also applied to input terminal 216 of the multiple frequency source FIG. 11 to stop this clock and thereby shut down the system.

If a burst of six strobe pulses generates two or less pulses on the counter 72 zero output line before error counter 434 counts to five, the condition of the zero counter will result in the burst complete signal also resetting the error counter to zero.

The second error detection scheme, called the test card mode, requires that one or more test cards be inserted in the stack of input cards. These cards contain the usual angular instructions, but also include intensity data previously taken at those angle settings. This data is read into the buffer storage and compared against the data currently being taken. Agreement between the two causes the system to continue on to another reading. Disagreement causes the system to stop and signal the alarm indicator.

A "one" in column 13 of an input card indicates it is a test card. In operation, referring to the scan and data recording section of the programmer shown in FIG. 18, this "one" in column 13 generates a test card signal which is applied to programmer input terminal 436 to enable AND gates 438 and 440. The test card signal also causes the card to be held in position in the reader upon termination of $2\theta$ slewing; i.e., it does not skip out as in the case of a normal card signal. When the nickel scan flip-flop 318 is set at the end of $2\theta$ slewing, the resulting output pulse from monostable 322 resets shift register 70 and is allowed through gate 438 to fire the burst generator. This action reads the data number from columns 32–37 of the input card into the buffer storage shift register 70.

More specifically, referring to FIG. 13, the output pulse from monostable 322 is applied to input terminal 442a of the burst generator OR gate 442. The OR gate output transition triggers flip-flop 444 to the set condition, the leading edge of the output pulse of which triggers flip-flop 246 to the set condition to generate a burst of six pulses and time interlaced shift pulses. The set signal output level of flip-flop 444 is also applied to inhibit gate 66 (FIG. 5), thereby preventing simultaneous punching, and via OR gate 268 to enable AND gate 266 to allow the burst of six drive pulses to be applied to the reader space interposer. The burst complete signal resets flip-flop 444.

Returning to FIG. 18, upon reset of nickel scan flip-flop by the scan complete signal, the resulting positive transition from the flip-flop "1" output terminal is allowed via AND gate 440 to trigger the data error flip-flop 446 to the set condition. The positive transition at the "1" output terminal of the data error flip-flop when triggered to set is applied through AND gate 448 to trigger a monostable 450 or through AND gate 452 as an alarm signal. AND gates 448 and 452 are controlled by a one digit comparator 454 (FIG. 5) which is connected to compare one digit position of the data counter 172 with a corresponding digit position of shift register 70.

The one digit comparator may comprise four inverted exclusive OR gates, having parallel mating inputs from one digit stage (four bit stages) of the data counter and a corresponding digit stage of the shift register, and a single AND gate for collecting the four OR gate outputs, similar to the circuit for digit comparison AND gate 148 and its OR gate inputs shown in FIG. 7. Assume the hundredth digit position in the shift register and data counter is compared. If there is not agreement for each of the four mating bit stages of the hundredth digits in the counter and register, a disagree signal level is applied to terminal 452a (FIG. 18) to enable AND gate 452. Consequently, an alarm signal is allowed to light the "alarm" and "Ni Data Error" indicators on the console and inhibit the multiple frequency source gate 208 (FIG. 11) to cease operation.

If the one digit comparator generates an agreement signal at input terminal 448a, AND gate 448 is enabled, allowing monostable 450 to be triggered. The triggered monostable applies a reset pulse to shift register 70 and triggers monostable 330 via OR gate 328 to proceed with nickel data transfer and punching.

The same procedure follows upon triggering of the cobalt scan flip-flop to the set condition, except that: The burst generator is fired by a signal applied to input terminal 442b (FIG. 13); cobalt data is read into the buffer from columns 38–43 of the reader mounted card; and, if an alarm signal is generated, it lights the "alarm" and "Co Data Error" console indicators.

Figure 24:
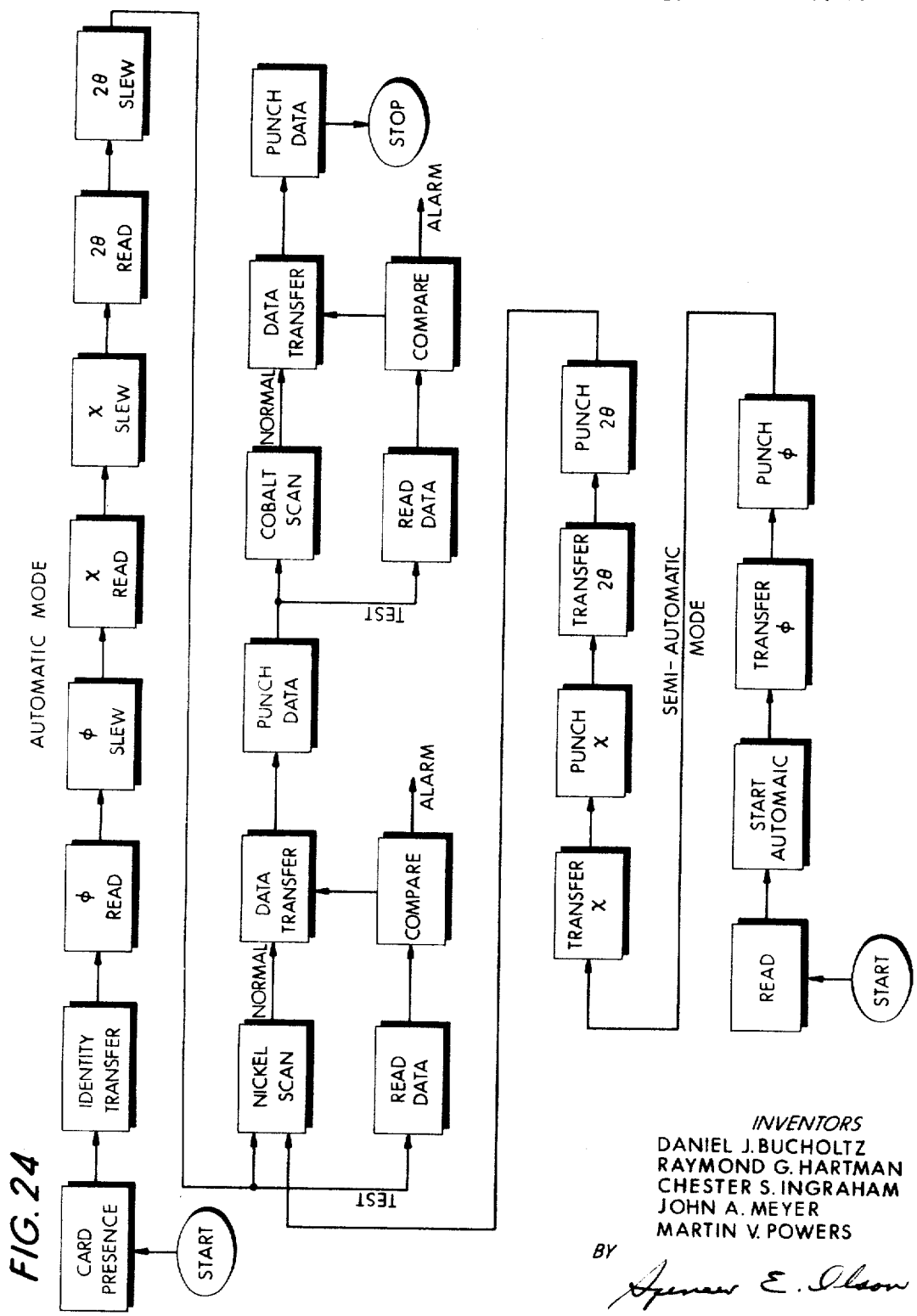
FIG. 24 is a process diagram illustrating the sequence of operation of the invention.

The operational capability of the above-described X-ray diffractometer control system may now be summarized with reference to the process diagram of FIG. 24. In the automatic mode, the operator places a set of instruction cards in the reader and blank cards in the output punch. The cards are manually advanced to the punching and reading stations. This "card presence" initiates automatic operation. Identity information is transferred from the first twelve columns on the input card, and column 13 signals Test Card or Normal Card operation. The next eighteen columns contain the $\phi$, $\chi$ and $2\theta$ angles at which readings are to be taken. A burst of six drive pulses is applied to read the $\phi$ angle into the buffer storage and simultaneously punch it onto the output card. When the $\phi$ angle is stored (burst complete), drive pulses are applied to slew the $\phi$ motor in a controlled direction until the directional count of the $\phi$ axis steps agrees with the contents of the buffer storage. Next follows $\chi$ read and slew to agreement and $2\theta$ read and slew to agreement, with angle punching occurring simultaneously with angle reading.

Subsequent steps in the operation depend upon whether a normal or test card is being read. If a normal card is in the reader and the nickel cobalt scan has been preselected, the $2\theta$ scan is commenced. During scan, intensity data is collected. Upon completion of nickel scan, the data is transferred to the buffer storage and from there punched onto the output card. A cobalt filter is inserted in front of the detector and the scan data transfer, and punch out process is repeated. At the conclusion of data recording, the cards are ejected an a new set inserted. The system then automatically moves on to the next reciprocal lattice point position.

If a test card is in the reader, nickel data is read from the input card during nickel scan, and at the end of nickel scan is compared with the contents of the data counter. Agreement permits the system to transfer and punch the collected data and then proceed to the cobalt scan. Disagreement causes the system to stop and an alarm signal to be generated. A similar self-test process follows for cobalt scan.

In the semi-automatic mode, the operator manually punches identity data on a card. The operator can then move any axis in either direction until a desired reflection is observed. The operator then depresses the read button (here the process diagram starts) and automatic operation starts. The system transfers the $\phi$ counter content to the buffer storage and punches the $\phi$ angle. It then proceeds in like manner for the $\chi$ and $2\theta$ angles. Cobalt and nickel scan, data, and punch out then proceed as for the automatic mode. The punched card is then ejected and another inserted. The system is now ready for another cycle.

It is apparent, therefore, that the present invention provides a digital control system for an X-ray diffractometer which can be constructed and operated at moderate cost and provides flexible operational capabilities to enable the systematic collection of highly accurate crystallographic data with a minimum of time and effort. The system is capable of sequentially slewing a crystal in three planes, one of which has an imaginary slew axis, by means of a non-ambiguous open loop servo system. The choice of an open loop servo system and sequential angle slewing provides significant cost advantages over shaft encoder feedback techniques and simultaneous angle slewing. A further benefit derived from the open loop system is a flexible zero point (physical movement of axis and zeroing of angle counters).

All motion of the crystal is generated in small angular increments designed to minimize vibration and enable precise positioning of the crystal. System gearing provides a step size of 0.0025°, a value arrived at by trading off desired slewing speeds and danger of sample movement. Protein crystallography places stringent requirements on the amount of vibration transmitted to the specimen.

The automatic mode does not require attention from a human operator once set in operation and includes self-test capabilities. After positioning the crystal specimen in three planes and taking a set of intensity data for a given set of angle coordinates, the system is capable of precisely moving on for each of a succesive set of angle coordinates. The output cards are fully compatible in the IBM 1620 computer for use in plotting Fourier maps, etc.

While particular embodiments of the invention have been shown, it is to be understood that applicants do not wish to be limited thereto since many modifications can now be made by ones skilled in the art. For example, paper or magnetic tape could be used as an input/output medium instead of key-punched cards. Also the system could be connected directly to a computer. The circuitry used in the system is capable of much higher data rates than those described; a high data rate would reduce computer access time to a minimum. The applicants, therefore, contemplate by the appended claims to cover all such modifications as fall within the true spirit and scope of their invention.

What is claimed is:

1. A digital control system for an X-ray diffractometer including means for positioning a specimen in a given number of planes, said system comprising: a source of multidirectional drive pulses, a transducer associated with each of said planes for positioning said specimen in the respective plane in response to actuation by drive pulses from said source, means for receiving specimen positioning instructions, means responsive to said instructions for selectively connecting said source of drive pulses to actuate one of said transducers, each of said transducers being operative in response to actuation by drive pulses representing a given direction to position said specimen in said given direction in increments of motion corresponding to said drive pulses, means for continually counting the number and controlling the direction of said increments of motion in each of said planes, means automatically responsive to a first command signal for recording in sequence the respective coordinates of the new position of said specimen in each of said planes, automatic means responsive to a second command signal for concurrently controlling the time of irradiation of said specimen, the mode of radiation detection and the accumulation of radiation intensity data, and means for recording said intensity data in accurate correlation with the recorded specimen position coordinates.

2. A digital control system in accordance with claim 1 wherein said means for counting the number of increments of motion in each of said planes comprises a counter associated with each of said planes and means responsive to said instructions for selectively connecting said drive pulse source to the input of one of said counters.

3. A digital control system in accordance with claim 2 wherein said means for controlling the direction of said increments of motion in each of said planes comprises a direction memory device for each of said planes each providing a multistate storage function indicating the direction of the last increment of motion of said specimen in the respective plane, and direction logic means selectively connected to one of said memory devices in response to said instructions for generating pulses from said drive pulse source representing a direction corresponding to the state of the selected memory unit or an overriding command and for signalling the selected counter to count drive pulses in that direction.

4. A digital control system in accordance with claim 2 wherein said means for concurrently controlling the time of irradiation of said specimen, the mode of radiation detection and the accumulation of radiation intensity data comprises: a shutter for the source of X-rays of said diffractometer, means for controlling the opening and closing of said shutter, a plurality of filters for energy reflected from said specimen, means for selectively controlling the insertion and removal of each of said filters in the path of energy reflected from said specimen, a data counter for counting the pulse output of the radiation detection means of said diffractometer, switching means operative to preselect either a moving or a stationary specimen mode of radiation detection, an auxiliary counter connected to the input of one of said counters associated with a plane and operative to count the number of increments of motion in said associated plane up to a selectable maximum and to generate a signal indicative of said selected maximum-count being reached, a timer for generating a signal indicative of a selectable time period, digital storage means coupled to the output of said data counter, and logic means automatically responsive to the conclusion of the specimen positioning and coordinate recording operations to simultaneously signal said shutter control means to open said shutter, to enable said data counter to operate, and to initiate the mode of radiation detection selected by said switching means, initiation of the stationary specimen mode being operative to signal said filter control means to insert one of said filters in the path of energy reflected from said specimen and causing connection of said control system to said timer, the signal from said timer being operative to close said shutter, to disable said data counter and to signal transfer of the contents of said data counter to said digital storage means said logic means being automatically responsive to the conclusion of the recording of the contents of said storage means to initiate a repetition of the radiation detection operation with another one of said filters, and initiation of the moving specimen mode being operative to signal said filter control means to insert one of said filters in the path of energy reflected from said specimen, to enable said auxiliary counter to operate, and to signal said means for changing the position of said specimen to generate motion of said specimen in said associated plane, the signal from said auxiliary counter being operative to close said shutter, to remove the inserted filter, to disable said auxiliary and data counters, to stop generation of specimen motion, and to signal transfer of the contents of said data counter to said digital storage means, said logic means being automatically responsive to the conclusion of the recording of the contents of said storage means to initiate a repetition of the radiation detection operation with another one of said filters.

5. A digital control system in accordance with claim 4 wherein said control system includes output means in which the respective coordinate of the new position of said specimen in each of said planes is recorded in sequence, and wherein said means for recording said intensity data comprises means for transferring the contents of said digital storage means into said output means, and means responsive to the end of transfer of the contents of said data counter to said storage means to actuate said last-mentioned transfer means to transfer the contents of said storage means into said output means in immediate sequence following said recorded specimen position coordinates.

6. A digital control system for an X-ray diffractometer including goniometer apparatus for slewing a crystal specimen in three planes, said control system comprising: first and second sources of rate variable drive pulses, three gear systems each associated with a respective one of said slewing planes, three motors each having stator windings and a rotor coupled to a respective one of said gear systems, three motor drives each connected to stator winding terminals of a respective one of said motors and each having first and second input terminals, means for receiving specimen slewing instructions, means responsive to said instructions for selectively connecting said first drive pulse source to the first input terminal of one of said motor drivers and said second drive pulse source to the second input terminal of one of said motor drivers, each of said motor drivers being operative, in responsive to the application of pulses of a given rate to the first input terminal thereof, to drive the rotor of said motor in clockwise increments of rotation at said given rate to thereby cause slewing of said crystal in corresponding angular increments in a first direction and, in response to the application of pulses of a given rate to the second input terminal thereof, to drive the rotor of said motor in counterclockwise increments of rotation at said given rate to thereby cause slewing of said crystal in corresponding angular increments in a second direction, means for continually counting the number and controlling the direction of said incremets of angular motion in each of said planes, means automatically responsive to a first command signal for recording in sequence the respective slew angle of the new position of said crystal in each of said planes, automatic means responsive to a second command signal for concurrently controlling the time of irradiation of said crystal, the mode of radiation detection and the accumulation of radiation intensity data, and means for recording said intensity data in accurate correlation with the recorded crystal position slew angles.

7. A digital control system in accordance with claim 6 wherein each of said motors is a four-phase permanent magnet type stepper motor, each of said motor drivers is a four-phase logic circuit, and wherein each of said gear systems comprises a gearhead arranged to be driven by the rotor of said motor, first and second meshing gears one of which is a spring loaded anti-backlash gear, a first drive shaft rigidly connecting said gearhead to said first gear, a second drive shaft rigidly attached to said second gear and disposed parallel to said first drive shaft, a worm on said second drive shaft, a worm wheel meshed with said worm and means connected to said worm wheel for supporting said crystal on the axis of rotation of said worm wheel, each of said motor and gear systems being arranged to reduce the size of said increments of rotation transmitted to said worm wheel, the rate of said drive pulses and the size of said worm wheel increments of rotation being selected to provide a high degree of precision and less than the maximum acceptable level of vibration of said crystal.

8. A digital control system in accordance with claim 7 wherein each of said motor and gear systems includes a housing for supporting the mechanical assembly comprising said motor, said first and second shafts, said first and second gears and said worm, said housing being pivotably supported on said diffractometer to pivot about an axis spaced from and parallel to said first and second drive shafts to enable said worm to be declutched from said worm wheel, and spring means normally urging said worm into engagement with said worm wheel.

9. A digital control system in accordance with claim 6 wherein said means for counting the number of said increments of angular motion in each of said planes comprises first, second and third forward-backward digital counters each associated with a respective one of said slewing planes, and means responsive to said instructions for selectively connecting said first and second drive pulse sources to one of said counters.

10. A digital control system in accordance with claim 9 wherein said means for controlling the direction of said increments of angular motion in each of said planes comprises three direction memory devices each providing a two-state storage function indicating the direction of the last increment of rotation of the rotor of a respective one of said motors, and direction logic means selectively connected to one of said memory units in response to said instructions for generating pulses from said first or second drive pulse sources in response to the state of the selected memory unit or an overriding command and for signalling the selected digital counter to count drive pulses in a direction corresponding to the drive pulse source selected.

11. A digital control system in accordance with claim 10 wherein said means for receiving specimen slewing instructions comprises a card reader responsive to a command signal for transferring information from a key-punched instruction card into electric signals, means for converting the output signal from said card reader to a digital code, means for storing said digital code, means for comparing said stored digital code with the contents of one of said counters, means responsive to said instructions for selectively connecting one of said counters to said comparison means, and means responsive to disagreement between said digital code and the content of the selected one of said counters to signal said direction logic means to generate drive pulses and responsive to agreement to signal said direction logic to stop generation of drive pulses.

12. A digital control system in accordance with claim 11 wherein said means responsive to said instructions for selectively connecting said drive pulse sources to the terminals of one of said motor drivers and to the input terminal of one of said first, second or third counters and for selectively connecting one of said forward-backward counters to said comparison means comprises a relay matrix, each relay of said matrix having a common terminal connected to one or both of said drive pulse sources or an input terminal of said comparison means, and first, second and third angle terminals each connected to respective ones of said motors or counters, and a scale-of-four binary counter connected to said relay matrix to control the energization thereof and operative to connect the common terminal of each of said relays to one of the angle terminals of a respective relay, said scale-of-four counter being operative in response to said instructions to advance from a first to a second state and to connect the common terminals of said relays to said first angle terminal, said scale-of-four counter being operative in response to a signal signifying agreement between the contents of said first digital counter and the stored digital code representing the first slew angle to advance to a third state and connect the common terminals of said relays to said second angle terminal, said scale-of-four counter being operative in response to a signal signifying agreement between th contents of said second digital counter and the stored digital code representing the second slew angle to advance to a fourth state and connect the common terminals of said relays to said third angle terminal, and said scale-of-four counter being operative in response to a signal signifying agreement between the contents of said third digital counter and the stored digital code respresenting the third slew angle to return to the first state while maintaining the connection of the common terminals of said relays to said third angle terminal.

13. A digital control system in accordance with claim 11 wherein said means for recording in sequence the respective slew angle of the new position of said crystal in each of said planes comprises an output card punch machine, and gating means connected between the output of said card reader and the input of said card punch for transferring the output signals from said card reader to actuate said card punch machine in response to said instructions to sequentially record said slewing instructions on a key-punched output card in the order received from said card reader.

14. A digital control system in accordance with claim 10 wherein said means for concurrently controlling the time of irradiation of said crystal, the mode of radiation detection and the accumulation of intensity data comprises a shutter for the source of X-rays of said diffractometer, first electro-mechanical means for controlling said shutter, first and second filters for reflections from said crystal, second electro-mechanical means for controlling said first and second filters, a fourth digital counter operative to count the pulse output of the radiation detection means of said diffractometer, switching means for preselecting a moving detector-moving crystal mode of radiation detection or a stationary mode, a fifth digital counter having its input connected to the input terminal of said third counter for counting the number of increments of angular motion in the respective one of said planes up to a selectable maximum and generating a signal indicative of reaching said selected maximum count, an external timer for generating a signal indicative of a selectable maximum time period, and a bistable device triggered by the end of the last slewing operation to simultaneously signal said first electro-mechanical means to open said shutter, enable said fourth counter to operate, and initiate the mode of radiation detection selected by said switching means, initiation of the stationary mode causing signalling of said second electro-mechanical means to dispose said first filter in the reflection path from said crystal and connecting said control system to said external timer, the signal from said timer resetting said bistable device to thereby close said shutter, disable said fourth counter and signal transfer of the contents of said fourth counter to said digital code storage means, conclusion of recording of the contents of said storage means being operative to trigger said bistable again to repeat the radiation detection operation using said second filter, and initiation of the moving detector-moving crystal mode causing signalling of said second electro-mechanical means to dispose said first filter in the reflection path, enabling operation of said fifth counter, signalling said direction logic means to generate rate variable drive pulses from said first drive pulse source for rotating said crystal in the plane associated with said third counter, the signal from said fifth counter resetting said bistable device to thereby close said shutter, remove said first filter, disable said fourth and fifth counters, stop generation of said drive pulses, and signal transfer of the contents of said fourth counter to said digital code storage means, conclusion of recording of the contents of said storage means being operative to trigger said bistable again to repeat the radiation detection operation using said second filter and signalling generation of drive pulses from said second drive pulse source.

15. A digital control system in accordance with claim 14 wherein said means for recording said intensity data comprises means for converting the contents of said digital code storage means into signals suitable for actuating said output cards punch machine and a pulse generator responsive to the end of transfer of the contents of said fourth counter to said storage means to drive said last-mentioned converting means whereby it transfers the contents of said storage means to said card punch, thereby actuating the recording of said intensity data on the same key-punched output card on which said slewing instructions are recorded.

16. A digital system in accordance with claim 9 wherein said means for receiving specimen slewing instructions comprises a card reader responsive to command for transferring information from a key-punched instruction card into electrical signals, means for converting the output signals from said card reader to a digital code, means for storing said digital code, a directional comparator for comparing said stored digital code with the contents of one of said counters, means responsive to said instructions for selectively connecting one of said counters to said comparator, and means responsive to disagreement between said digital code and the content of the selected one of said counters to enable said first or second drive pulse source to generate pulses and responsive to agreement to disable said drive pulse sources.

17. A digital system in accordance with claim 16 wherein said directional comparator for controlling the direction of said increments of angular motion in each of said planes includes first and second output lines, signals on said first or second output lines respectively indicating the counter is high or low with respect to said stored digital code, and direction logic means connected to the first and second output lines of said comparator for enabling said first or second drive pulse source to generate pulses in response to presence of a signal in a respective one of said output lines and for signalling the selected digital counter to count drive pulses in a direction corresponding to the drive pulse source selected.

18. A digital control system in accordance with claim 16 wherein said means responsive to said instructions for selectively connecting said drive pulse sources to the terminals of one of said motor drivers and to the input terminal of one of said first, second or third counters and for selectively connecting one of said forward-backward counters to said comparison means comprises a relay matrix, each relay of said matrix having a common terminal connected to one or both of said drive pulse sources or an input terminal of said comparison means, and first, second and third angle terminals each connected to respective ones of said motors or counters, and a scale-of-four binary counter connected to said relay matrix to control the energization thereof and operative to connect the common terminal of each of said relays to one of the angle terminals of a respective relay, said scale-of-four counter being operative in response to said instructions to advance from a first to a second state and to connect the common terminals of said relays to said first angle terminal, said scale-of-four counter being operative in response to a signal signifying agreement between the contents of said first digital counter and the stored digital code representing the first slew angle to advance to a third state and connect the common terminals of said relays to said second angle terminal, said scale-of-four counter being operative in response to a signal signifying agreement between the contents of said second digital counter and the stored digital code representing the second slew angle to advance to a fourth state and cannot the common terminals of said relays to said third angle terminal, and said scale-of-four counter being operative in response to a signal signifying agreement between the contents of said third digital counter and the stored digital code representing the third slew angle to reutrn to the first state while maintaining the connection of the common terminals of said relays to said third angle terminal.

19. An automatic digital control system for an X-ray diffractometer including goniometer apparatus for slewing a single crystal specimen in a given number of planes comprising, an input record medium having recorded thereon a set of lattice or reciprocal lattice point coordinates each element of which comprises the slew angle coordinates for a given lattice or reciprocal lattice point of said crystal specimen, record reading means responsive to a command signal for reading a first element of said set and generating corresponding output signals, an output record medium, recording means operative in response to signals from said record reading means to record in a first element of said output record medium the slew angle coordinates of the first input element read in the sequence, means responsive to the signals from said reading means for precisely slewing said crystal specimen in small angular increments sequentially in each of said given number of planes to the slew angle coordinates of said first input element in the order read, means for controlling the direction of said increments of angular motion in each of said planes, means for continually and directionally counting said increments of angular motion in each of said planes, means responsive to the end of the last slewing operation for concurrently controlling the time of irradiation of said crystal, the mode of radiation detection and the accumulation of radiation intensity data, means operative in response to the end of accumulation of radiation intensity data to transfer said accumulated data to said recording means, said recording means being operative in responsive to the receipt of said data to record said accumulated intensity data in said first element of said output record medium, and means responsive to the end of data recording in said first output element for signaling said reading means to read a second element of said input set, said automatic control system thereby being operative in response to the set of lattice or reciprocal lattice point coordinates in said input record medium to position said crystal specimen in said given number of planes, record intensity data accurately correlated with the crystal specimen position coordinates, and move on for each of the succession of elements of said set.

20. A digital control system in accordance with claim 19 wherein said data transfer means is connected to said recording means by a number of signal paths each corresponding to a decimal digit, each of said intensity data recordings comprises a set of decimal digits, and said data is transferred to said recording means as a succession of pulses on the signal paths corresponding to the set of digits to be recorded, and further including means connected to a selected one of said signal paths for counting the number of pulses occurring in said selected path during the transfer of a single set of data digits and for generating an output signal upon exceeding a selected maximum count, and means for counting the number of consecutive data sets for which said last-mentioned counting means produces an output signal and for generating an error signal upon exceeding a selected maximum count.

21. A digital control system in accordance with claim 19 wherein each element of said set further includes intensity data, said slewing means includes means for converting the output signals from said reading means to a digital code and a shift register for storing said digital code, said means for accumulation of radiation intensity data comprises a digital counter, said means for transferring the accumulated intensity data includes said shift register the digit stages of which are connected in parallel with the digit stages of said counter, and said control system further includes means for comparing the contents of at least one digit stage of said shift register with a corresponding digit stage of said counter during the period said shift register is storing intensity data read from an element of said input set and for generating an alarm signal upon recognizing a disagreement.

22. A semi-automatic digital control system for an X-ray diffractometer including goniometer apparatus for slewing a single crystal specimen in a given number of planes comprising, a source of multidirectional drive pulses, a transducer associated with each of said planes for slewing said crystal in the respective plane in response to actuation by drive pulses from said source, a switch type control circuit for enabling direct input of specimen slewing instructions by an operator, means responsive to said instructions for selectively connecting said source of drive pulses to actuate one of said transducers, each of said transducers being operative in response to actuation by drive pulses representing a given direction to position said specimen in said given direction in angular increments of motion corresponding to said drive pulses, means enabling the operator to control the direction and speed of said increments of angular motion in each of said selected planes, a multidirectional counter associated with each of said planes, means responsive to said instructions for selectively connecting said drive pulse source to the input of one of said counters, recording means, sequentially transferring the contents of said multidirectional counters to said recording means, an output record medium, said recording means being operative in response to the receipt of the contents of said counters to record on said output record medium, in sequence, the contents of said counters and thereby permanently record the slew angles of the new position of the crystal, means responsive to the end of angle recording for concurrently controlling the time of irradiation of said crystal, the mode of radiation detection and the accumulation of radiation intensity data, and means for recording said intensity data in accurate correlation with the crystal position position slew angles.

References Cited

"Computer-Controlled Diffractometer" by H. Cole, Y. Okaya and F. W. Chambers, The Review of Scientific Instruments, vol. 34, No. 8 (pages 872–876).

ROBERT C. BAILEY, *Primary Examiner.*

O. E. TODD, *Assistant Examiner.*

UNITED STATES PATENT OFFICE
CERTIFICATE OF CORRECTION

Patent No. 3,345,613                                October 3, 1967

Daniel J. Bucholtz et al.

It is hereby certified that error appears in the above numbered patent requiring correction and that the said Letters Patent should read as corrected below.

Column 44, line 44, for the claim reference numeral "10" read -- 13 --; column 46, line 13, for "cannot" read -- connect --; line 18, for "reutrn" read -- return --; column 48, line 10, after "recording means," insert -- means automatically responsive to operator command for --; line 22, strike out "position".

Signed and sealed this 7th day of January 1969.

(SEAL)
Attest:

Edward M. Fletcher, Jr.                          EDWARD J. BRENNER
Attesting Officer                                Commissioner of Patents